(12) United States Patent
Oh et al.

(10) Patent No.: US 10,847,152 B2
(45) Date of Patent: Nov. 24, 2020

(54) METHOD FOR OPERATING SPEECH RECOGNITION SERVICE, ELECTRONIC DEVICE AND SYSTEM SUPPORTING THE SAME

(71) Applicant: Samsung Electronics Co., Ltd., Suwon-si (KR)

(72) Inventors: Byong Mok Oh, Seongnam-si (KR); Han Jun Ku, Suwon-si (KR); Kyoung Gu Woo, Seoul (KR); Sang Hoon Lee, Yongin-si (KR); In Jong Rhee, Seongnam-si (KR); Seok Yeong Jung, Yongin-si (KR); Kyung Tae Kim, Hwaseong-si (KR); Ji Hyun Kim, Suwon-si (KR); Dong Ho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 15/938,549

(22) Filed: Mar. 28, 2018

(65) Prior Publication Data
US 2018/0286401 A1    Oct. 4, 2018

(30) Foreign Application Priority Data

Mar. 28, 2017  (KR) .................. 10-2017-0039589
Jun. 7, 2017   (KR) .................. 10-2017-0071017

(51) Int. Cl.
*G10L 15/22*    (2006.01)
*G10L 15/06*    (2013.01)

(52) U.S. Cl.
CPC ............ *G10L 15/22* (2013.01); *G10L 15/063* (2013.01); *G10L 2015/226* (2013.01)

(58) Field of Classification Search
CPC .... G10L 15/22; G10L 2015/223; G10L 15/30
(Continued)

(56) References Cited

U.S. PATENT DOCUMENTS 7,085,716 B1 *  8/2006  Even ................. G10L 15/22
                                            704/235
7,920,682 B2    4/2011  Byrne et al.
(Continued)

FOREIGN PATENT DOCUMENTS

EP          1 761 015 A1    3/2007
KR    10-2009-0001716 A     1/2009
(Continued)

*Primary Examiner* — Jakieda R Jackson
(74) *Attorney, Agent, or Firm* — Jefferson IP Law, LLP

(57) ABSTRACT

An electronic device is provided. The electronic device includes a communication module, a microphone receiving a voice input according to user speech, a memory storing information about an operation of the speech recognition service, a display, and a processor electrically connected with the communication module, the microphone, the memory, and the display. The processor is configured to calculate a specified numerical value associated with the operation of the speech recognition service, to transmit information about the numerical value to a first external device processing the voice input, and to transmit a request for a function, which corresponds to the calculated numerical value, of at least one function associated with the speech recognition service stepwisely provided from the first external device depending on a numerical value, to the first external device to refine a function of the speech recognition service supported by the electronic device.

20 Claims, 46 Drawing Sheets

(58) Field of Classification Search
USPC .......................................... 704/270.1, 9, 275
See application file for complete search history.

(56) References Cited

U.S. PATENT DOCUMENTS

| | | | |
|---|---|---|---|
| 7,949,536 B2 | 5/2011 | Mowatt et al. | |
| 8,190,627 B2 | 5/2012 | Platt et al. | |
| 8,812,534 B2 | 8/2014 | Platt et al. | |
| 8,818,808 B2 | 8/2014 | Hakkani-Tur et al. | |
| 8,880,402 B2 | 11/2014 | Wasson et al. | |
| 9,159,318 B2 | 10/2015 | Hakkani-Tur et al. | |
| 9,666,182 B2 | 5/2017 | Hakkani-Tur et al. | |
| 9,729,690 B2 | 8/2017 | Byrne et al. | |
| 10,002,613 B2* | 6/2018 | Rubin | G10L 25/51 |
| 10,089,072 B2* | 10/2018 | Piersol | G06F 3/167 |
| 2004/0179659 A1 | 9/2004 | Byrne et al. | |
| 2006/0190253 A1 | 8/2006 | Hakkani-Tur et al. | |
| 2008/0059186 A1 | 3/2008 | Mowatt et al. | |
| 2008/0103781 A1 | 5/2008 | Wasson et al. | |
| 2008/0114603 A1* | 5/2008 | Desrochers | G10L 15/22 704/275 |
| 2009/0006343 A1 | 1/2009 | Platt et al. | |
| 2009/0164218 A1* | 6/2009 | Ma | G10L 15/02 704/254 |
| 2009/0210226 A1* | 8/2009 | Ma | G10L 15/26 704/236 |
| 2011/0246203 A1 | 10/2011 | Byrne et al. | |
| 2012/0089392 A1 | 4/2012 | Larco et al. | |
| 2012/0149001 A1* | 6/2012 | Dohring | G09B 7/06 434/365 |
| 2012/0239653 A1 | 9/2012 | Platt et al. | |
| 2013/0289994 A1* | 10/2013 | Newman | G10L 15/22 704/254 |
| 2014/0274203 A1* | 9/2014 | Ganong | H04W 52/0251 455/556.1 |
| 2014/0358535 A1 | 12/2014 | Lee et al. | |
| 2015/0046159 A1 | 2/2015 | Hakkani-Tur et al. | |
| 2015/0154564 A1* | 6/2015 | Moon | G06Q 10/1053 705/321 |
| 2015/0170649 A1* | 6/2015 | Ashikawa | G10L 15/22 704/235 |
| 2015/0174486 A1* | 6/2015 | Brunn | A63F 13/814 463/42 |
| 2016/0027434 A1 | 1/2016 | Hakkani-Tur et al. | |
| 2016/0379632 A1* | 12/2016 | Hoffmeister | G10L 15/18 704/253 |
| 2017/0046794 A1* | 2/2017 | Shukla | G06Q 50/01 |
| 2017/0154628 A1* | 6/2017 | Mohajer | G06Q 30/0283 |
| 2017/0347283 A1* | 11/2017 | Kodaypak | H04W 4/70 |
| 2018/0069954 A1 | 3/2018 | Byrne et al. | |

FOREIGN PATENT DOCUMENTS

| | | |
|---|---|---|
| KR | 10-2014-0139982 A | 12/2014 |
| KR | 10-2015-0116389 A | 10/2015 |
| KR | 10-2016-0006586 A | 1/2016 |
| WO | 03/017629 A1 | 2/2003 |

* cited by examiner

METHOD FOR OPERATING SPEECH RECOGNITION SERVICE, ELECTRONIC DEVICE AND SYSTEM SUPPORTING THE SAME

CROSS-REFERENCE TO RELATED APPLICATION(S)

This application is based on and claims priority under 35 U.S.C. § 119(a) of a Korean patent application number 10-2017-0039589, filed on Mar. 28, 2017, in the Korean Intellectual Property Office, and of a Korean patent application number 10-2017-0071017, filed on Jun. 7, 2017, in the Korean Intellectual Property Office, the disclosure of each of which is incorporated by reference herein its entirety.

TECHNICAL FIELD

The disclosure relates to a function refinement technology of a speech recognition service.

BACKGROUND

For the purpose of interaction with a user, recent electronic devices have proposed various input methods. For example, an electronic device may support a voice input method that receives voice data according to user speech, based on the execution of a specified application. Furthermore, the electronic device may recognize the received voice data to derive a user's speech intent and may support a speech recognition service performing an operation corresponding to the derived speech intent.

The speech recognition service may be implemented based on an artificial intelligence system using a machine learning algorithm. The artificial intelligence system refers to a system that trains and determines by itself and improves a recognition rate as it is used, as a computer system in which human intelligence is implemented. The artificial intelligence technology may include a machine learning (e.g., deep learning) technology using an algorithm that classifies/learns the characteristics of input data by itself or elemental technologies (e.g., a language understanding technology that recognizes the language/character of a human, a reasoning/predicting technology that determines information to logically infer and predict the determined information, or the like) that simulate the functions such as the recognition of the human brain, the judgment of the human brain, and the like by using the machine learning algorithm.

The above information is presented as background information only to assist with an understanding of the disclosure. No determination has been made, and no assertion is made, as to whether any of the above might be applicable as prior art with regard to the disclosure.

SUMMARY

In the operation of a speech recognition service, pieces of information associated with a user and an electronic device may be used as an important resource for clearly recognizing voice data or for deriving user utterance intent. As such, for the purpose of operating the reliable speech recognition service, the pieces of information need to be collected appropriately and continuously. However, in the initial operation of the speech recognition service, since the amount of information about a user or an electronic device is very small, the speech recognition rate may be low or an error may occur frequently. This may reduce the operating efficiency or reliability of the speech recognition service.

Aspects of the disclosure are to address at least the above-mentioned problems and/or disadvantages and to provide at least the advantages described below. Accordingly, an aspect of the disclosure is to provide a speech recognition service operating method that updates a speech recognition service through interaction with a user.

Another aspect of the disclosure is to provide an apparatus and method for refined speech recognition service function, an electronic device and system supporting the same.

In accordance with an aspect of the disclosure, a method for an electronic device supporting a speech apparatus is provided. The method includes a communication module communicating with at least one external device, a microphone receiving a voice input according to user speech, a memory storing information about an operation of the speech recognition service, a display outputting a screen associated with the operation of the speech recognition service, and a processor electrically connected with the communication module, the microphone, the memory, and the display.

In accordance with another aspect of the disclosure, the processor is configured to calculate a specified numerical value associated with the operation of the speech recognition service, to transmit information about the numerical value to a first external device processing the voice input, and to transmit a request for a function, which corresponds to the calculated numerical value, of at least one function associated with the speech recognition service stepwisely provided from the first external device depending on a numerical value, to the first external device to refine a function of the speech recognition service supported by the electronic device.

According to various embodiments, the reliable service may be provided to a user by refining the function of the speech recognition service based on the experience point (or growth points) of the artificial intelligence assistant supporting the operation of a speech recognition service.

According to various embodiments, the experience scenario organically associated with a user may be provided to an artificial intelligence assistant, and thus various infotainment environments may be provided upon operating a speech recognition service.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9I is a view illustrating an output example of various interfaces of a user terminal associated with second user variation suggestion, according to an embodiment of the disclosure;

Throughout the drawings, it should be noted that like reference numbers are used to depict the same or similar elements, features, and structures.

DETAILED DESCRIPTION

Figure 1A:
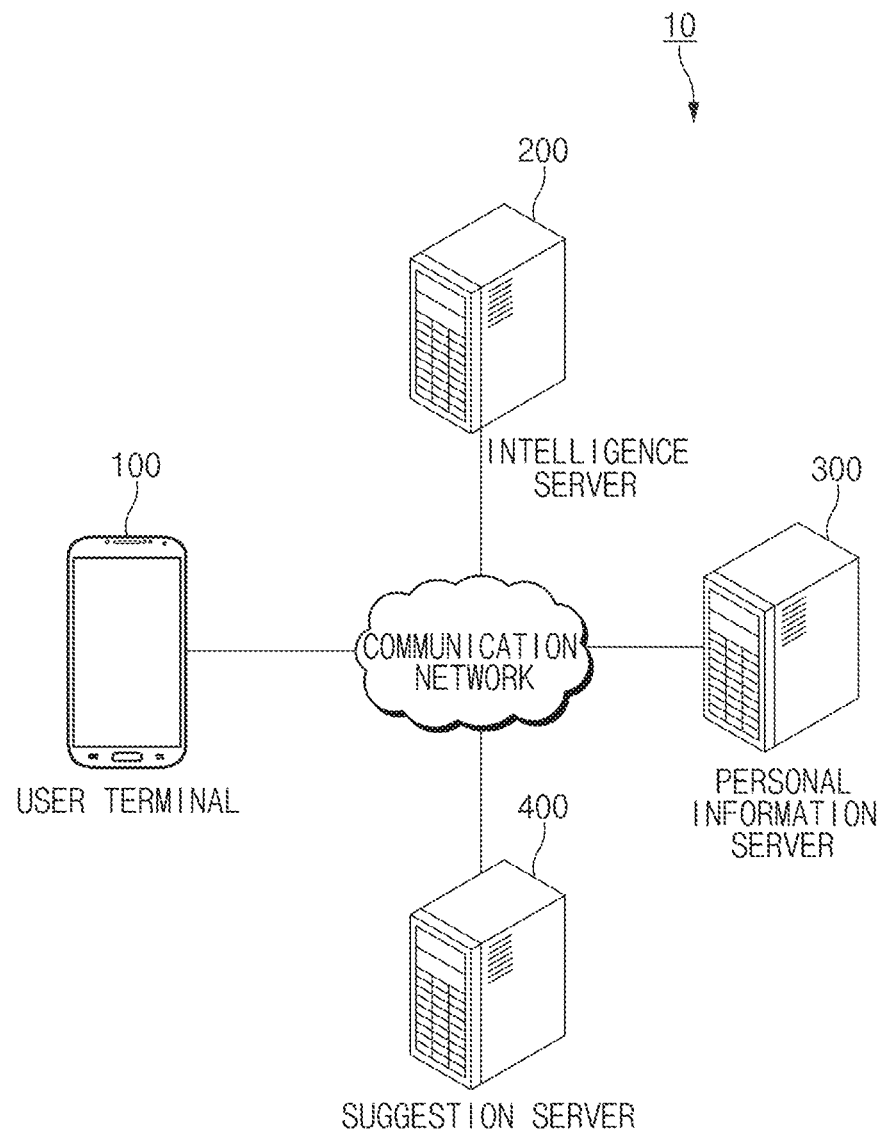
FIG. 1A is a block diagram illustrating an integrated intelligent system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, with those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the disclosure, but are not intended to limit the elements. For instance, "a first user device" and "a second user device" may indicate different users regardless of order or importance. For example, a first component may be referred to as a second component and vice versa without departing from the scope of the disclosure.

In an embodiment of the disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the disclosure are used to describe certain embodiments of the disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the specification are not intended to be interpreted as excluding embodiments of the disclosure.

An electronic device according to various embodiments of the disclosure may include at least one of a smailphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to an embodiment of the disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the disclosure may be a flexible device. An electronic device according to an embodiment of the disclosure is not limited to the above-mentioned devices, and may include new electronic devices with the development of new technology.

Hereinafter, an electronic device according to various embodiments of the disclosure will be described in more detail with reference to the accompanying drawings. The term "user" used herein may refer to a person who uses an electronic device or may refer to a device (e.g., an artificial intelligence electronic device) that uses an electronic device.

Prior to describing various embodiments of the disclosure, an integrated intelligent system to which various embodiments of the disclosure is capable of being applied will be described with reference to FIGS. 1A to 1E.

FIG. 1A is a block diagram illustrating an integrated intelligent system, according to an embodiment of the disclosure.

Referring to FIG. 1A, an integrated intelligent system 10 may include a user terminal 100, an intelligence server 200, a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate other app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connected with Internet, such as a mobile phone, a smartphone, PDA, a notebook computer, and the like may be the user terminal 100. According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a path rule based on the text data. The path rule may include information about an action (or an operation) for performing the function of an app or information about a parameter necessary to perform the action. In addition, the path rule may include the sequence of actions of the app (or the sequence of states). The user terminal 100 may receive the path rule, may select an app depending on the path rule, and may execute an action included in the path rule in the selected app. For example, the user terminal 100 may execute the action and may display a screen corresponding to a state of the user terminal 100, which executes the action, in a display. For another example, the user terminal 100 may execute the action and may not display the result obtained by executing the action in the display. For example, the user terminal 100 may execute a plurality of actions and may display only the result of a part of the plurality of actions in the display. For example, the user terminal 100 may display only the result, which is obtained by executing the last action among a plurality of actions, in the display. For another example, the user terminal 100 may display the result obtained by executing the action in the display, in response to the user input.

A personal information server 300 may include user information or a database in which information about a user terminal 100 is stored. For example, the personal information server 300 may receive the user information (e.g., context information, name information, age information, gender information, address information, occupation information, health information, financial information, user preference information or the like) from the user terminal 100 to store the user information in the database. Alternatively, the personal information server 300 may receive usage information (e.g., app installation information, app execution information, call information, battery information, location information, or communication information) of the user terminal 100 from the user terminal 100 to store the usage information in the database. In an embodiment, in the case where the personal information server 300 verifies information received from the user terminal 100 or information pre-stored in the database, the personal information server 300 may update the database.

An intelligence server 200 may be used to receive the user information or information of the user terminal 100 from the personal information server 300 over the communication network and to generate a path rule associated with the user input. According to an embodiment, the user terminal 100 may receive the user information from the personal information server 300 over the communication network, and may use the user information as information for managing the database.

The suggestion server 400 may include a database storing information ab out a function in a terminal, introduction of an application, or a function to be provided. For example, the suggestion server 400 may include a database associated with a fun ction that a user utilizes by receiving the user information of the user terminal 100 from the personal information server 300. The user terminal 100 may receive information about the function to be provided from the suggestion server 400 over the communication network and may provide the received information to the user.

Figure 1B:
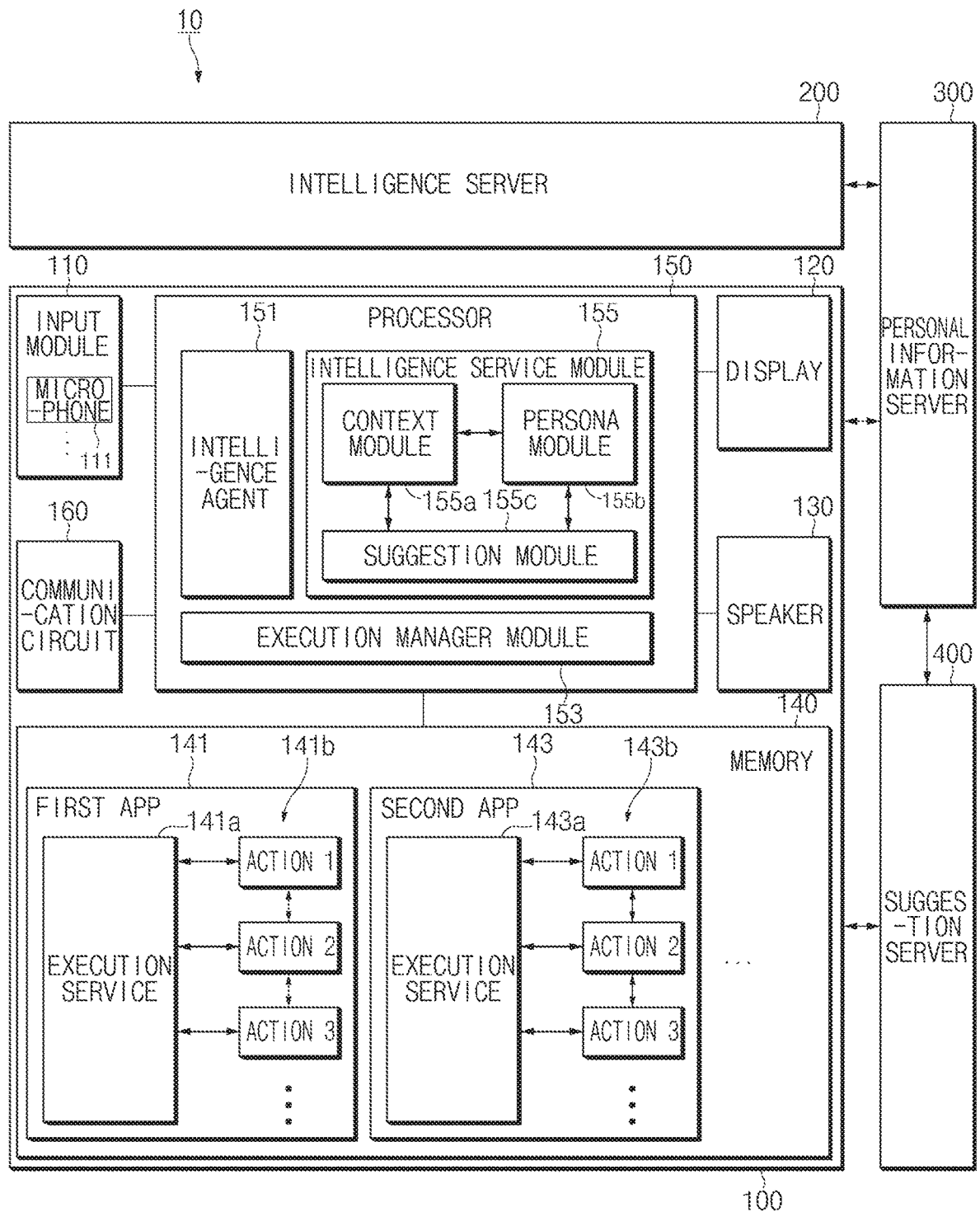
FIG. 1B is a block diagram illustrating a user terminal of an integrated intelligent system, according to an embodiment of the disclosure.

FIG. 1B is a block diagram illustrating a user terminal of an integrated intelligent system, according to an embodiment of the disclosure.

Referring to FIG. 1B, the user terminal 100 may include an input module 110, a display 120, a speaker 130, a memory 140, a processor 150, or a communication circuit 160. Some elements (e.g., 110, 120, 130, 140, or 160) of the user terminal 100 may be electrically connected to the processor 150. The user terminal 100 may further include a housing, and elements of the user terminal 100 may be seated in the housing or may be positioned on the housing. In various embodiments, the user terminal 100 may be referred to as an "electronic device (or user device)". In addition, the user terminal 100 may not include at least one of the above-described elements or may further include any other element(s). For example, the user terminal 100 may include elements of an electronic device 901 illustrated in FIG. 9 or may include elements of an electronic device 1001 illustrated in FIG. 10.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100). According to an embodiment, the input module 110 may include a microphone 111 that is capable of receiving the speech of the user as a voice signal. For example, the input module 110 may include a speech input system and may receive the speech of the user as the voice signal through the speech input system. In an embodiment, the microphone 111 may be controlled to be always driven (e.g., always on) to receive an input according to a user's speech or may be driven in the case where a user manipulation is applied to a hardware key (e.g., 112 in FIG. 1C) provided to one area of the user terminal 100.

According to an embodiment, the display 120 may display an image, a video, and/or an execution screen of an application. For example, the display 120 may display a graphic user interface (GUI) of an app. In an embodiment, at least part of the display 120 may be exposed through one area of the housing.

According to an embodiment, the speaker 130 may output a sound signal. For example, the speaker 130 may output the sound signal generated in the user terminal 100 or the sound signal received from an external device to the outside.

According to an embodiment, the memory 140 may store a plurality of apps 141 and 143. The plurality of apps 141 and 143 stored in the memory 140 may be selected, launched, and executed depending on the user input. The plurality of apps 141 and 143 may include an application (e.g., a photo app, a music app, a calendar app, a message app, a call app, or the like) supporting the function execution of the user terminal 100 and an intelligence app that supports the operation of the speech recognition service.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141*a* and 143*a* performing a function or a plurality of actions (or unit actions) 141*b* and 143*b*. The execution services 141*a* and 143*a* may be generated by the execution manager module 153 of the processor 150 and then may execute the plurality of actions 141*b* and 143*b*.

According to an embodiment, when the actions 141*b* and 143*b* of the apps 141 and 143 are executed, an execution state screen according to the execution of the actions 141*b* and 143*b* may be displayed in the display 120. For example, the execution state screen may be a screen in a state where the actions 141*b* and 143*b* are completed. For another example, the execution state screen may be a screen in a state where the execution of the actions 141*b* and 143*b* is in partial landing (e.g., in the case where a parameter necessary for the actions 141*b* and 143*b* are not input).

According to an embodiment, the execution services 141*a* and 143*a* may execute the actions 141*b* and 143*b* depending on a path rule. For example, the execution services 141*a* and 143*a* may be activated by the execution manager module 153, may receive an execution request from the execution manager module 153 depending on the path rule, and may execute the actions 141*b* and 143*b* of the apps 141 and 143 depending on the execution request. If the execution of the actions 141*b* and 143*b* is completed, the execution services 141*a* and 143*a* may transmit completion information to the execution manager module 153.

According to an embodiment, in the case where the plurality of the actions 141*b* and 143*b* are respectively executed in the apps 141 and 143, the plurality of the actions 141*b* and 143*b* may be sequentially executed. If the execution of one action (action 1) is completed, the execution services 141*a* and 143*a* may open the next action (action 2) and may transmit completion information to the execution manager module 153. Here, it is understood that opening an arbitrary action is to change a state of the arbitrary action to an executable state or to prepare the execution of the arbitrary action. In other words, if the arbitrary action is not opened, the corresponding action may be not executed. If the completion information is received, the execution manager module 153 may transmit an execution request for the next actions 141*b* and 143*b* to an execution service (e.g., action 2). According to an embodiment, in the case where the plurality of apps 141 and 143 are executed, the plurality of apps 141 and 143 may be sequentially executed. For example, if receiving the completion information after the execution of the last action of the first app 141 is executed, the execution manager module 153 may transmit the execution request of the first action of the second app 143 to the execution service 143*a*.

According to an embodiment, in the case where the plurality of the actions 141*b* and 143*b* are executed in the apps 141 and 143, a result screen according to the execution of each of the executed plurality of the actions 141*b* and 143*b* may be displayed in the display 120. According to an embodiment, only a part of a plurality of result screens according to the executed plurality of the actions 141b and 143b may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be operated by a specific input (e.g., an input through a hardware key, an input through a touch screen, or a specific voice input) input through the input module 110.

According to an embodiment, the processor 150 may control overall actions of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the disclosure may be implemented by hardware or by software. In various embodiments of the disclosure, it is understood that the action executed by the intelligence agent 151, the execution manager module 153, or the intelligence service module 155 is an action executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200. According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, an intelligence agent 151 may include a wakeup recognition module recognizing a call of a user. The wakeup recognition module may recognize a wakeup instruction of the user through the speech recognition module. In the case where the wakeup recognition module receives the wakeup instruction, the wakeup recognition module may activate the intelligence agent 151 to receive the user input. According to an embodiment, the wakeup recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed. In various embodiments, the wakeup recognition module may be included in an automatic speech recognition module 210 of FIG. 1D of the intelligence server 200.

According to an embodiment, the intelligence agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligence server 200 to receive the changed text data. As such, the intelligence agent 151 may display the text data in the display 120.

According to an embodiment, the intelligence agent 151 may receive a path rule from the intelligence server 200. According to an embodiment, the intelligence agent 151 may transmit the path rule to the execution manager module 153.

According to an embodiment, the intelligence agent 151 may transmit the execution result log according to the path rule received from the intelligence server 200 to the intelligence service module 155, and the transmitted execution result log may be accumulated and managed in preference information of the user of a persona module 155b.

According to an embodiment, the execution manager module 153 may receive the path rule from the intelligence agent 151 to execute the apps 141 and 143 and may allow the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

According to an embodiment, the execution manager module 153 may transmit or receive the instruction information for executing the actions 141b and 143b of the apps 141 and 143 between the intelligence agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter necessary for the actions 141b and 143b are not input), the execution manager module 153 may transmit information about the partial landing to the intelligence agent 151. The intelligence agent 151 may make a request for an input of necessary information (e.g., parameter information) to the user by using the received information. For another example, in the case where the execution state of the actions 141b and 143b are in an operating state, the utterance may be received from the user, and the execution manager module 153 may transmit information about the apps 141 and 143 being executed and the execution states of the apps 141 and 143 to the intelligence agent 151. The intelligence agent 151 may receive parameter information of the utterance of the user through the intelligence server 200 and may transmit the received parameter information to the execution manager module 153. The execution manager module 153 may change a parameter of each of the actions 141b and 143b to a new parameter by using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies the app 141 executing a part of the action 141b but does not specify the app 143 executing any other action 143b, the execution manager module 153 may receive a plurality of different path rules in which the same app 141 (e.g., a gallery app) executing the part of the action 141b is executed and in which different apps 143 (e.g., a message app or a Telegram app) executing the other action 143b. For example, the execution manager module 153 may execute the same actions 141b and 143b (e.g., the same successive actions 141b and 143b) of the plurality of path rules. In the case where the execution manager module 153 executes the same action, the execution manager module 153 may display a state screen for selecting the different apps 141 and 143 included in the plurality of path rules in the display 120.

According to an embodiment, the intelligence service module 155 may include a context module 155a, a persona module 155b, or a suggestion module 155c.

The context module 155a may collect current states of the apps 141 and 143 from the apps 141 and 143. For example, the context module 155a may receive context information indicating the current states of the apps 141 and 143 to collect the current states of the apps 141 and 143.

The persona module 155b may manage personal information of the user utilizing the user terminal 100. For example, the persona module 155b may collect the usage information and the execution result of the user terminal 100 to manage personal information of the user.

The suggestion module 155c may predict the intent of the user to recommend an instruction to the user. For example, the suggestion module 155c may recommend an instruction to the user in consideration of the current state (e.g., a time, a place, context, or an app) of the user.

A communication circuit 160 (or communication module) according to an embodiment may establish wired communication or wireless communication according to the defined protocol with at least one external device (e.g., intelligence server 200, the personal information server 300 or a suggestion server 400) of an integrated intelligent system 10. The communication circuit 160 may transmit or receive at least one information associated with the operation of the speech recognition service based on the wired communication or the wireless communication.

Figure 1C:
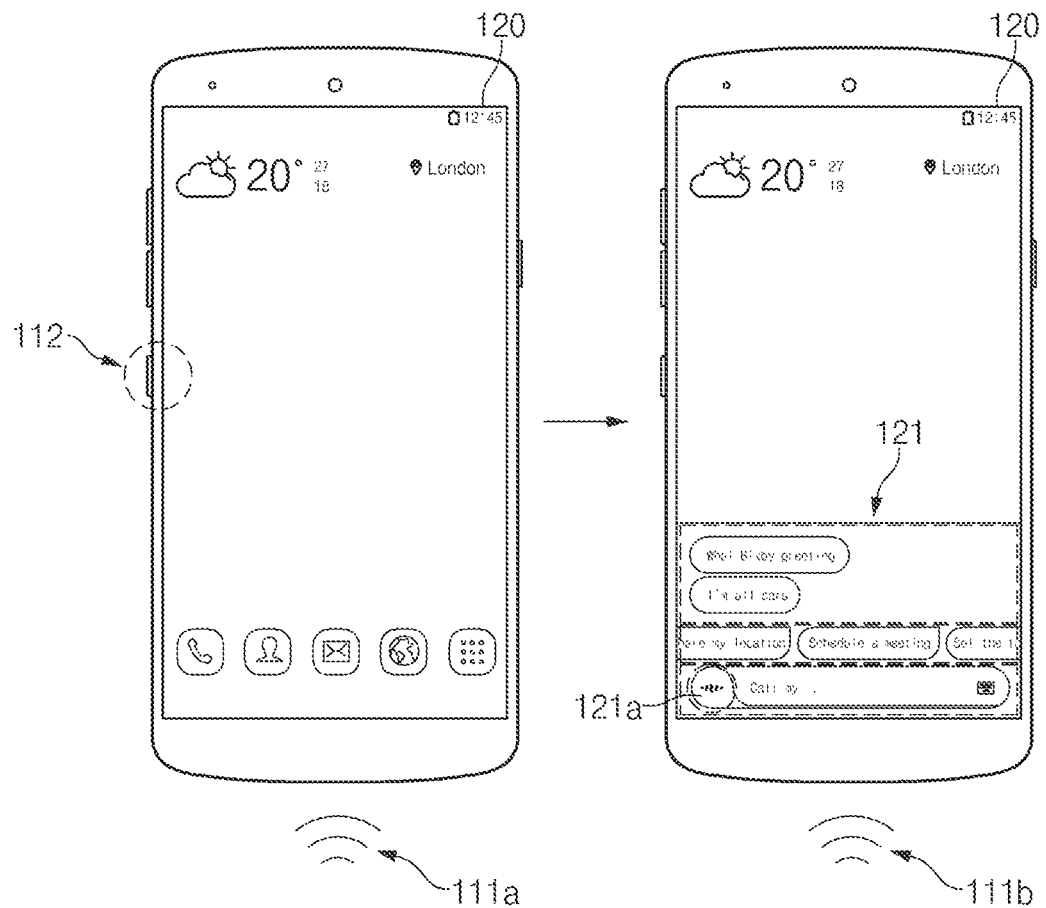
FIG. 1C is a view for describing how an intelligence app of a user terminal is executed, according to an embodiment of the disclosure.

FIG. 1C is a view for describing how an intelligence app of a user terminal is executed, according to an embodiment of the disclosure.

FIG. 1C illustrates that the user terminal 100 receives a user input to execute an intelligence app (e.g., a speech recognition app) operating in conjunction with the intelligence agent 151.

According to an embodiment, the user terminal 100 may execute the intelligence app for recognizing a voice through a hardware key 112. For example, in the case where the user terminal 100 receives the user input through the hardware key 112, the user terminal 100 may display a UI 121 of the intelligence app in the display 120. For example, a user may touch a speech recognition button 121a of the UI 121 of the intelligence app for the purpose of entering a voice 111b in a state where the UI 121 of the intelligence app is displayed in the display 120. For another example, while continuously pressing the hardware key 112 to enter the voice 111b, the user may enter the voice 111b.

According to an embodiment, the user terminal 100 may execute the intelligence app for recognizing a voice through the microphone 111. For example, in the case where a specified voice 111a (e.g., wake up!) is entered through the microphone 111, the user terminal 100 may display a UI 121 of the intelligence app in the display 120. In this regard, the above-described wakeup recognition module may activate the intelligence agent (151 of FIG. 1B) in association with the specified voice input, and the activation of the intelligence agent 151 may accompany the execution of the interlocked intelligence app. Furthermore, the execution of the intelligence app may accompany the activation of an artificial intelligence assistant (e.g., Bixby) interacting (e.g., dialogue) with a user, based on a specified interface (e.g., dialogue interface).

Figure 1D:
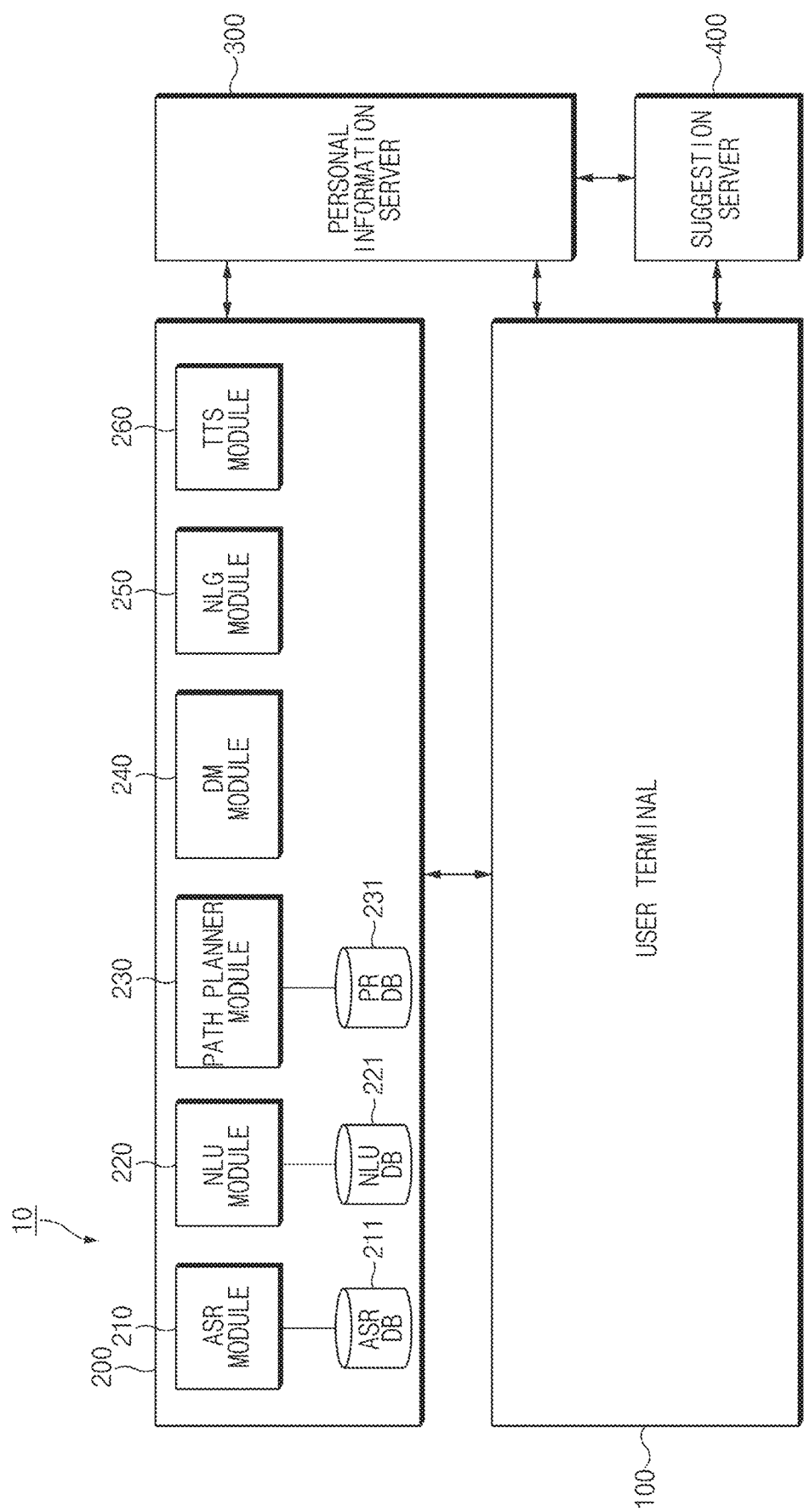
FIG. 1D is a block diagram illustrating an intelligence server of an integrated intelligent system, according to an embodiment of the disclosure.

FIG. 1D is a block diagram illustrating an intelligence server of an integrated intelligent system, according to an embodiment of the disclosure.

Referring to FIG. 1D, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. The element 210, 220, 230, 240, 250, or 260 of the above-described intelligence server 200 may be implemented individually, or at least some of the elements may be integrated. In an embodiment, intelligence server 200 may include a controller (or a processor), which generally controls the function operation of the element 210, 220, 230, 240, 250, or 260, and a communication interface (or a communication module) supporting communication network access. Moreover, the intelligence server 200 may include a storage device (or a memory) including the element 210, 220, 230, 240, 250, or 260.

The NLU module 220 or the path planner module 230 of the intelligence server 200 may generate a path rule.

According to an embodiment, the ASR module 210 may convert the user input received from the user terminal 100 to text data. For example, the ASR module 210 may include a speech recognition module. The speech recognition module may include an acoustic model and a language model. For example, the acoustic model may include information associated with a speech, and the language model may include unit phoneme information and information about a combination of unit phoneme information. The speech recognition module may change user speech to text data by using the information associated with speech and unit phoneme information. For example, the information about the acoustic model and the language model may be stored in an automatic speech recognition database (ASR DB) 211. In an embodiment, the ASR module 210 may generate a speaker-dependent recognition model based on a user input that is received first and may store the generated model in the database 211. According to an embodiment, the ASR module 210 may determine whether a user is a speaker registered in the model, with respect to a user input based on a speaker recognition model.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set for the purpose of determining the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app by using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules by using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes an action based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the natural language generating module NLG 250 may change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

According to an embodiment, in the case where at least one element (e.g., the ASR module 210, the NLU module 220, or the like) performs the allocated function or interacts with the user terminal 100 (or a user), the above-described intelligence server 200 may update the at least one element. For example, the intelligence server 200 may update a model or a database associated with the function execution of the at least one element. The intelligence server 200 may transmit update information about the at least one element to the user terminal 100.

Figure 1E:
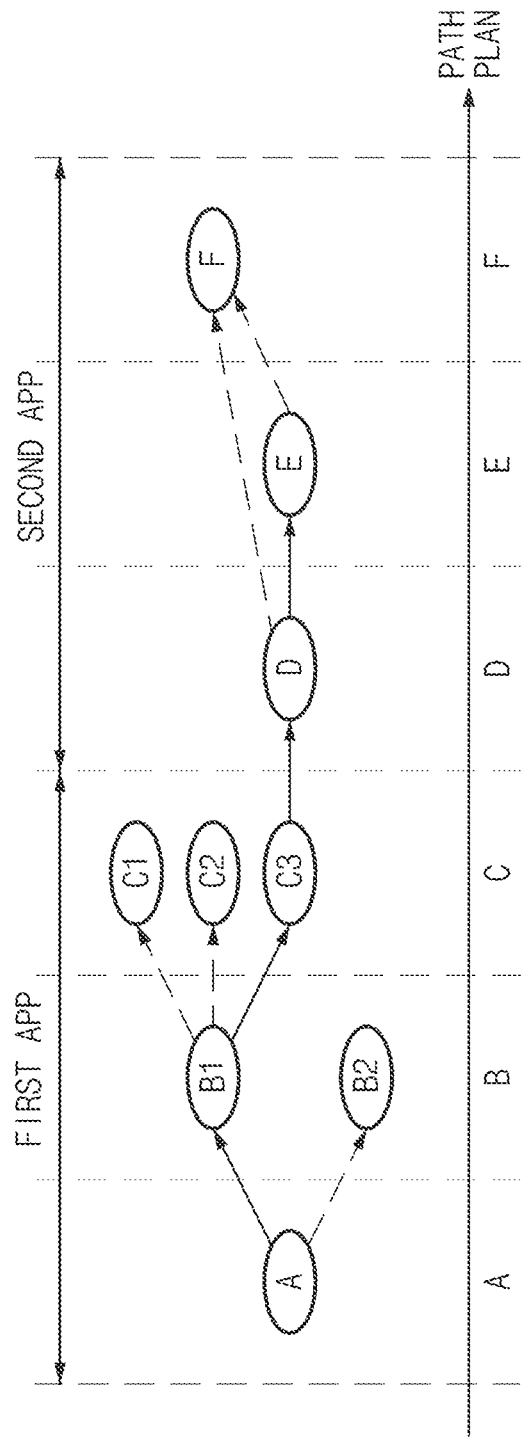
FIG. 1E is a view illustrating a method in which a natural language understanding (NLU) module generates a path rule, according to an embodiment of the disclosure.

FIG. 1E is a view illustrating a method in which a NLU module generates a path rule, according to an embodiment of the disclosure.

Referring to FIG. 1E, according to an embodiment, the NLU module 220 may divide the function of an app into unit actions (e.g., A to F) and may store the divided unit actions in the PR DB 231. For example, the NLU module 220 may store a path rule set, which includes a plurality of path rules A-B1-C1, A-B1-C2, A-B1-C3-D-F, and A-B1-C3-D-E-F divided into unit actions, in the PR DB 231.

According to an embodiment, the PR DB 231 of the path planner module 230 may store the path rule set for performing the function of an app. The path rule set may include a plurality of path rules each of which includes a plurality of actions. An action executed depending on a parameter input to each of the plurality of actions may be sequentially arranged in the plurality of path rules. According to an embodiment, the plurality of path rules implemented in a form of ontology or a graph model may be stored in the PR DB 231.

According to an embodiment, the NLU module 220 may select an optimal path rule A-B1-C3-D-F of the plurality of path rules A-B1-C1, A-B1-C2, A-B1-C3-D-F, and A-B1-C3-D-E-F corresponding to the intent of a user input and the parameter.

According to an embodiment, in the case where there is no path rule completely matched to the user input, the NLU module 220 may transmit a plurality of rules to the user terminal 100. For example, the NLU module 220 may select a path rule (e.g., A-B1) partly corresponding to the user input. The NLU module 220 may select one or more path rules (e.g., A-B1-C1, A-B1-C2, A-B1-C3-D-F, and A-B1-C3-D-E-F) including the path rule (e.g., A-B1) partly corresponding to the user input and may transmit the one or more path rules to the user terminal 100.

According to an embodiment, the NLU module 220 may select one of a plurality of path rules based on an input added by the user terminal 100 and may transmit the selected one path rule to the user terminal 100. For example, the NLU module 220 may select one path rule (e.g., A-B1-C3-D-F) of the plurality of path rules (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one path rule to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one path rule (e.g., A-B1-C3-D-F) of the plurality of path rules (e.g., A-B1-C1, A-B1-C2, A-B1-C3-D-F, and A-B1-C3-D-E-F) based on the transmitted intent or the transmitted parameter.

As such, the user terminal 100 may complete the actions of the apps 141 and 143 based on the selected one path rule.

According to an embodiment, in the case where a user input in which information is insufficient is received by the intelligence server 200, the NLU module 220 may generate a path rule partly corresponding to the received user input. For example, the NLU module 220 may transmit the partly corresponding path rule to the intelligence agent 151. The intelligence agent 151 may transmit the partly corresponding path rule to the execution manager module 153, and the execution manager module 153 may execute the first app 141 depending on the path rule. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a path rule to be added, based on the intent of the user input additionally entered and parameter information and may transmit the path rule to be added, to the intelligence agent 151. The intelligence agent 151 may transmit the path rule to the execution manager module 153 and may execute the second app 143.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a path rule corresponding to the user input in which a part of an action is missed, by using the user information. As such, even though the user input in which a portion of information is missed is received by the intelligence server 200, the NLU module 220 may make a request for the missed information to receive an additional input or may determine a path rule corresponding to the user input by using user information.

As described above through FIG. 1A to 1E, the integrated intelligent system 10 of FIG. 1A may accompany a series of processes for providing a speech recognition-based service. For example, the user terminal 100 of FIG. 1A may receive a user's speech as a user input to transmit the user input to the intelligence server 200 of FIG. 1A, and the intelligence server 200 may generate a path rule based on the user input. The user terminal 100 may receive the generated path rule from the intelligence server 200 and may execute the function of a specific app depending on the path rule. In an embodiment, in an operation of performing the above-described process, the user terminal 100 may calculate a numerical value (e.g., experience point) associated with an artificial intelligence assistant (e.g., Bixby) supporting a speech recognition service, based on update information about at least one element (e.g., the ASR module 210 of FIG. 1D or the NLU module 220 of FIG. 1D) of the intelligence server 200 or database update information of the personal information server 300 of FIG. 1A. For example, the intelligence agent 151 of FIG. 1B of the user terminal 100 may assign the predetermined point to at least one of the ASR module 210, the NLU module 220, and the personal information server 300 based on the update information and may collect the assigned point to calculate the experience point of the artificial intelligence assistant. In various embodiments, the intelligence agent 151 may assign a point to a specified activity (e.g., activity associated with a speech recognition service or the operation of an intelligence app) that a user performs on the user terminal 100, and may further refer to the activity point to calculate the experience point of the artificial intelligence assistant. In various embodiments, the calculation of the experience point of the user terminal 100 may be performed by a scoring manager module included in the intelligence server 200 by software or hardware, and the user terminal 100 may receive information about the experience point from the scoring manager module.

In an embodiment, the user terminal 100 may request the function of a speech recognition service corresponding to the experience point, based on the calculated experience point. In this regard, the intelligence server 200 may classify a speech recognition service function to be provided to the user terminal 100, into a plurality of functions and may provide the user terminal 100 with a service function corresponding to the experience point of the artificial intelligence assistant. Hereinafter, various embodiments associated with the calculation of the experience point of the artificial intelligence assistant and the refinement of the speech recognition service function of the user terminal 100 will be described.

Figure 2A:
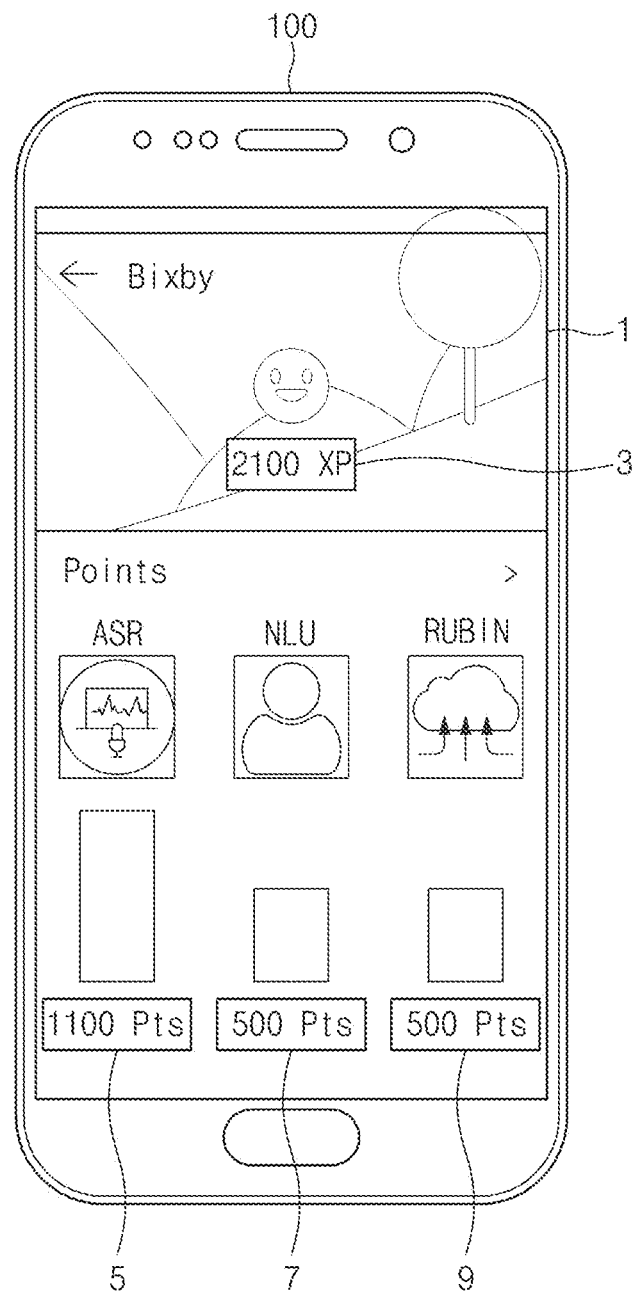
FIG. 2A is a view illustrating an interface associated with a speech recognition service, according to an embodiment of the disclosure.
Figure 2B:
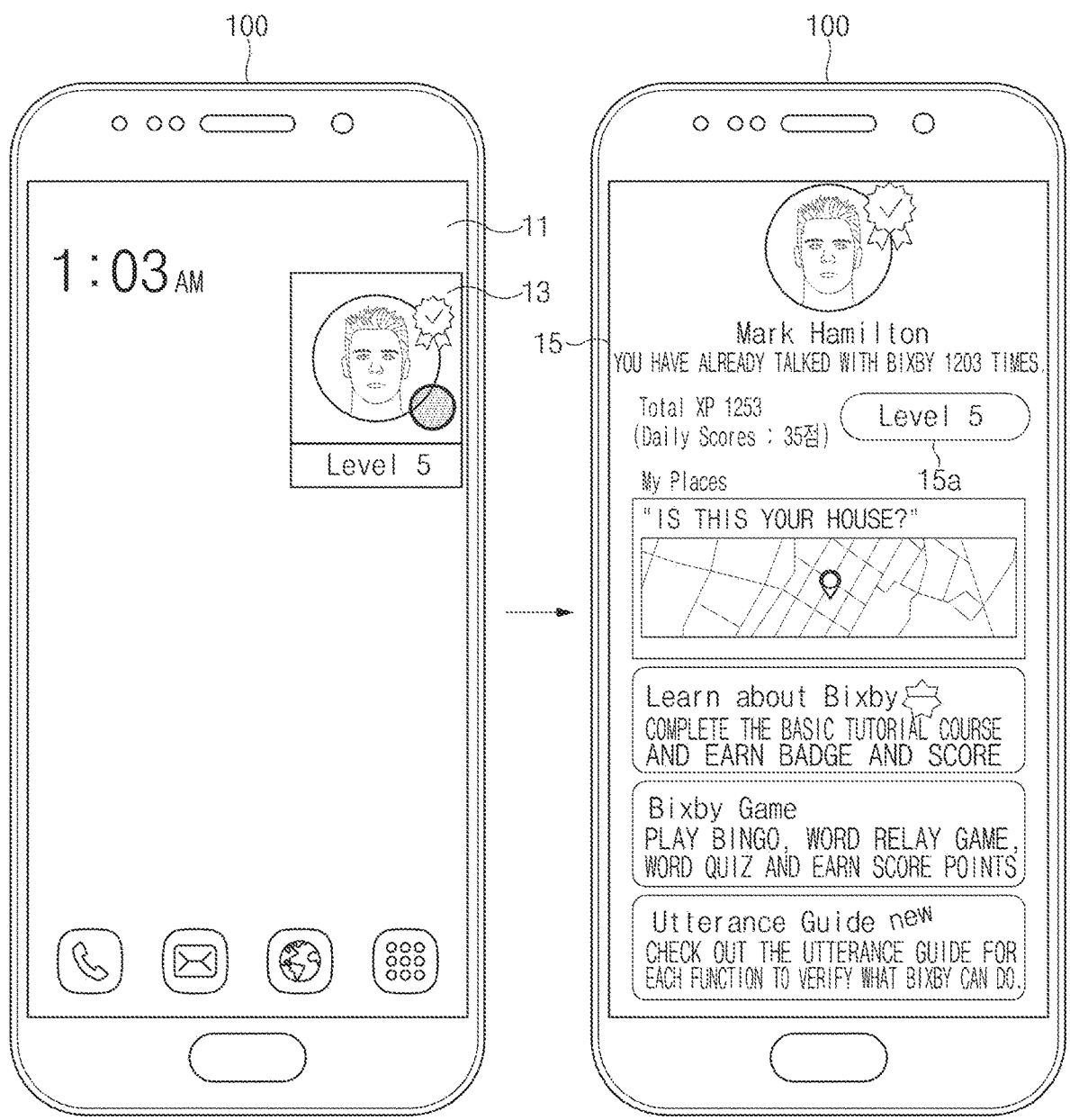
FIG. 2B is a view illustrating an interface associated with a speech recognition service, according to an embodiment of the disclosure.
Figure 2C:
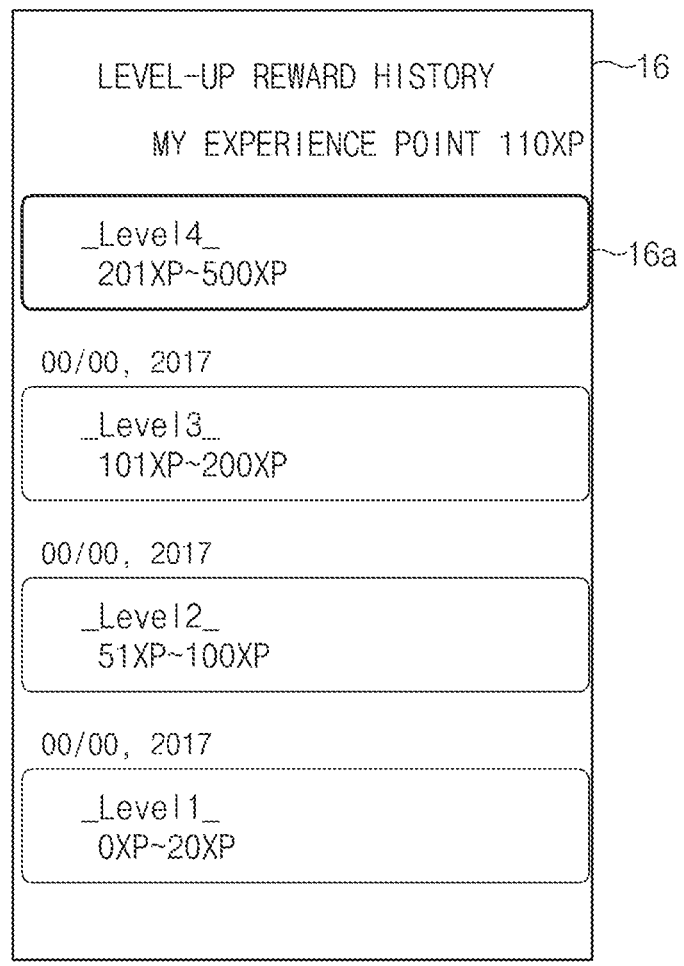
FIG. 2C is a view illustrating an interface associated with a speech recognition service, according to an embodiment of the disclosure.

FIGS. 2A to 2C are views illustrating various interfaces associated with a speech recognition service, according to various embodiments of the disclosure.

In an embodiment, the intelligence agent 151 of FIG. 1B (or the processor 150 of FIG. 1B) of the user terminal 100 may display the experience point of the artificial intelligence assistant (e.g., Bixby) calculated through a series of processes, through a specified interface. A user may access the interface to verify the experience point and at least one information associated with the experience point calculation. As such, the user may recognize the degree of trust in the artificial intelligence assistant (or speech recognition service) and may obtain information contributing to the improvement of the experience point.

In this regard, referring to FIG. 2A, an intelligence app that is installed in the user terminal 100 and supports the operation of the speech recognition service may output a first interface 1, in response to user control associated with a specific category (or menu). An experience point 3 (e.g., 2100 XP) of an artificial intelligence assistant and points 5, 7, and 9 (e.g., 1100 Pts, 500 Pts, and 500 Pts) respectively assigned to at least one or more elements (e.g., the ASR module 210 of FIG. 1D, the NLU module 220 of FIG. 1D, and the personal information server 300 of FIG. 1A) contributing to the calculation of the experience point 3 may be displayed in at least one area of the first interface 1. In an embodiment, the experience point 3 may be calculated by summing points 5, 7, and 9 respectively assigned to the ASR module 210, the NLU module 220, and the personal information server 300 or may be applied as the highest point or the lowest point among points. In various embodiments, the points 5, 7, and 9 may be displayed concurrently with the output of the first interface 1 or may be displayed in a specified area (e.g., an icon of the artificial intelligence assistant) on the first interface 1 together with a relevant diagram (e.g., graph) in the case where a user input (e.g., touch) is applied. In various embodiments, a user activity point (e.g., a point assigned in the case where a user performs a specified activity through the user terminal 100) contributing to the calculation of the experience point 3 may be further displayed on the first interface 1.

Referring to FIG. 2B, for example, a second interface 13 (e.g., widget) that operates in conjunction with the execution of the intelligence app may be included on a home screen 11 (or lock screen) of the user terminal 100. At least one of level information, badge information, and user image that correspond to the experience point of the artificial intelligence assistant may be displayed on the second interface 13. In various embodiments, as illustrated in FIG. 2B, the level information may be displayed in the form of a number as shown or may be displayed as a name of a specified object. For example, the object may include at least one planet, and the level information may be expressed as a planet (e.g., Solar system planet (e.g., Mercury, Venus, Earth, Mars, Jupiter, Saturn, Uranus, Neptune, and Pluto), dwarf Planet (Ceres, Haumea, Makemake, or Eris), Sedna, Moon, Galaxy, or the like) of a name that is different depending on the experience point value of an artificial intelligence assistant. For example, as the experience point value of the artificial intelligence assistant increases, the level information may be expressed as the name of a planet that exists at a great distance based on the sun. In an embodiment, with regard to the operation of a speech recognition service, the grade (or level information or planet name) of the level may be determined depending on at least one activity or function operation performed by a user or a part of elements of the integrated intelligent system 10 of FIG. 1A. For example, the level information of the different grade or the planet name may be determined depending on the number of times that the at least one activity (e.g., providing feedback of the user's satisfaction or dissatisfaction attribute, suggesting the user's variation, adopting the variation suggestion, or the like that is to be described below) is performed. In the case where a user input (e.g., touch) is applied to at least one area of the second interface 13, the second interface 13 may be switched to a third interface 15 corresponding to at least part of the execution screen of an intelligence app. In an embodiment, at least one of the experience point (e.g., 1253 XP) of the artificial intelligence assistant, the point (e.g., 35 Pts) obtained on the day, the maximum number of points obtainable on the day, guide information (e.g., experience point information assigned in the case where the function of a specific app is performed based on the execution of a path rule, experience point information assigned in the case where variation suggestion associated with the operation of the speech recognition service occurs from a user, experience point information additionally assigned in the case where the variation suggestion is adopted, or the like) associated with the improvement of the experience point, and notice information associated with the operation of a speech recognition service may be included on the third interface 15.

According to an embodiment, a button or a tap 15a that is implemented to include the level information may be provided on the third interface 15; in the case where a user touch input is applied to at least one area of the button or tap, the third interface 15 may be switched to an interface 16 as illustrated in FIG. 2C. The details about previously established level information may be displayed on the switched interface 16 in the form of a list, and level information 16a that can be established in the future (e.g., level information of the next grade) may be displayed at the top of the list. In various embodiments, the level information may be referred to as an indicator of a specific reward or benefits to be provided in operating the speech recognition service; in this regard, in the case where a user touch input is applied to the details about previously established level information, details about the previously provided reward or benefits may be displayed.

Figure 3A:
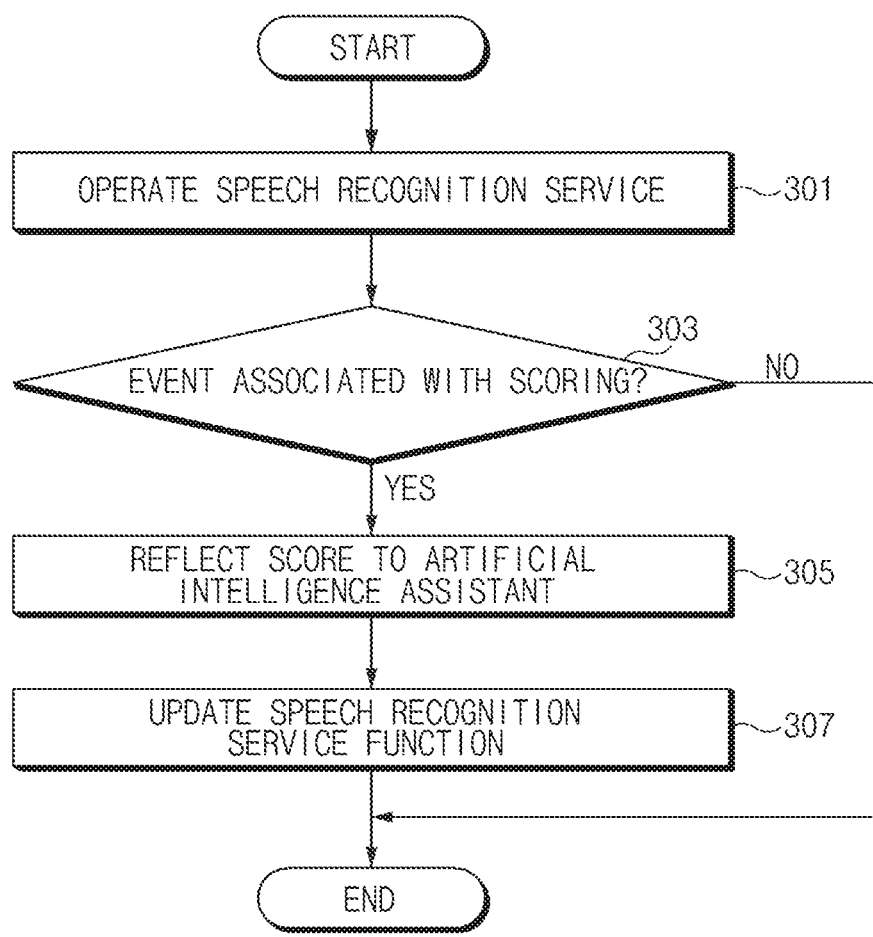
FIG. 3A is a view illustrating a speech recognition service operating method of a user terminal, according to an embodiment of the disclosure.

FIG. 3A is a view illustrating a speech recognition service operating method of a user terminal, according to an embodiment of the disclosure.

Referring to FIG. 3A, in operation 301, a user may operate a speech recognition service through the user terminal 100 of FIG. 1B. In this regard, a user may manipulate a specified hardware key (e.g., the hardware key 112 of FIG. 1C) on a user terminal or may perform a specified wakeup command speech (e.g., "wake up" or "Hi, Bixby") to execute an intelligence app. In an embodiment, the execution of the intelligence app may accompany the activation of an artificial intelligence assistant (e.g., Bixby) responding to a user speech based on the speech recognition result of the intelligence server 200 of FIG. 1D. After the execution of the intelligence app or the activation of the artificial intelligence assistant, the user may perform speech including a specific command or intent. Alternatively, after the execution of the intelligence app, a user may perform activity associated with the operation of the speech recognition service.

In operation 303, the intelligence agent 151 of FIG. 1B of a user terminal may determine whether at least one event occurring upon operating the speech recognition service of a user or operating an intelligence app of a user corresponds to a specified scoring event. For example, the specified scoring event may be an event that accompanies the element update of an intelligence server or the database update of the personal information server 300 of FIG. 1A. Furthermore, it is understood that the specified scoring event is an event that the function of the speech recognition service operable in a user terminal is updated (or refined) by contributing to the calculation of the experience point of the artificial intelligence assistant, and the specified scoring event may be referred to as "first to eleventh embodiments" described through FIGS. 4A to 7D.

According to an embodiment, in the case where the generated event is not associated with the scoring event, an intelligence agent may exclude the function update of the speech recognition service. Alternatively, in the case where it is determined that the generated at least one event is the scoring event, in operation 305, the intelligence agent may assign a point to an element (e.g., the ASR module 210 of FIG. 1D, the NLU module 220 of FIG. 1D, or the personal information server 300 of FIG. 1A) associated with the generated event or may assign an activity point thereto. In an embodiment, the intelligence agent may reflect the point to the calculation of the experience point of an artificial intelligence assistant. For example, the intelligence agent may calculate the experience point of the artificial intelligence assistant by summing at least one or more points or may apply the highest point or the lowest point of at least one point to the experience point. In various embodiments, the experience point is not limited to the above-described calculation method or application method, and the experience point may be calculated through various arithmetic operations based on points.

In operation 307, the intelligence agent may request the intelligence server to refine or update the speech recognition service function based on the experience point of the artificial intelligence assistant and may selectively operate the service function provided from the intelligence server.

Figure 3B:
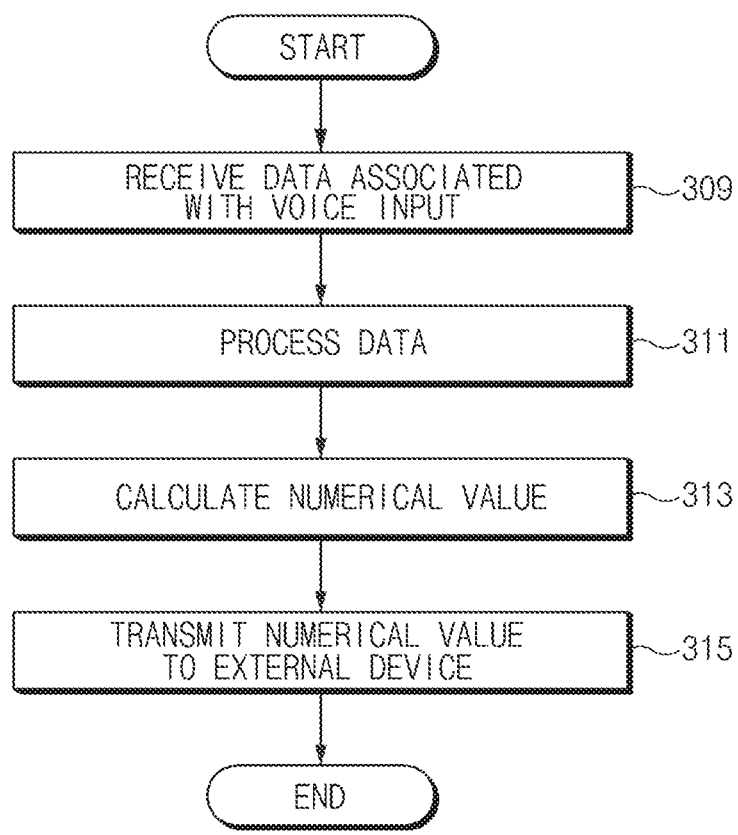
FIG. 3B is a view illustrating a speech recognition service operating method of an intelligence server, according to an embodiment of the disclosure.

FIG. 3B is a view illustrating a speech recognition service operating method of an intelligence server, according to an embodiment of the disclosure.

Referring to FIG. 3A, the calculation of the experience point of an artificial intelligence assistant according to an embodiment may be performed by the user terminal 100 of FIG. 1B of the integrated intelligent system 10 of FIG. 1A. Alternatively, as described below through FIG. 3B, the calculation of the experience point may be performed by the intelligence server 200 of FIG. 1D of the integrated intelligent system 10.

In operation 309, the intelligence server 200 may receive specified data from an external device (e.g., the user terminal 100) through a communication interface (or communication module). For example, the intelligence server may receive data (e.g., a user input according to the speech of a user of an external device) associated with a voice input, from the external device.

In operation 311, the intelligence server may process the received data. In an embodiment, the data processing may include an operation in which the ASR module 210 in FIG. 1D included as at least a part of elements of the intelligent server recognizes the data and converts the data into text data. Alternatively, the processing may include an operation in which the NLU module 220 of FIG. 1D included in the intelligence server derives user intent from the data and generates a path rule associated with an operation to be performed by the external device, based on the derived user intent. Alternatively, the processing may include an operation in which at least one of the ASR module 210 and the NLU module 220 interacts with the external device (or a user of the external device) to update a relevant model or the database 211 or 221 of FIG. 1D, in an operation of performing the function of the above-described modules 210 and 220.

In operation 313, the intelligence server may calculate a numerical value (e.g., point) associated with at least one of the ASR module 210 and the NLU module 220. In this regard, the intelligence server may include a scoring manager module that calculates the numerical value. In an embodiment, with regard to the operation of a speech recognition service of the external device user, in the case where at least one of the ASR module 210 and the NLU module 220 performs the assigned function, interacts (e.g., query and respond) with the user of the external device, or updates the relevant model, the database, or the like, the scoring manager module may assign the predetermined numerical value to the corresponding module. The scoring manager may collect at least one numerical value to calculate the experience point of the artificial intelligence assistant supporting interaction with the external device user. In operation 315, the intelligence server may transmit information associated with a numerical value or an experience point to the external device through a communication interface. The intelligence server may refine the function of the speech recognition service corresponding to the request to provide the external device with the refined function of the speech recognition service, depending on the request of the external device based on the numerical value or the experience point.

Figure 4A:
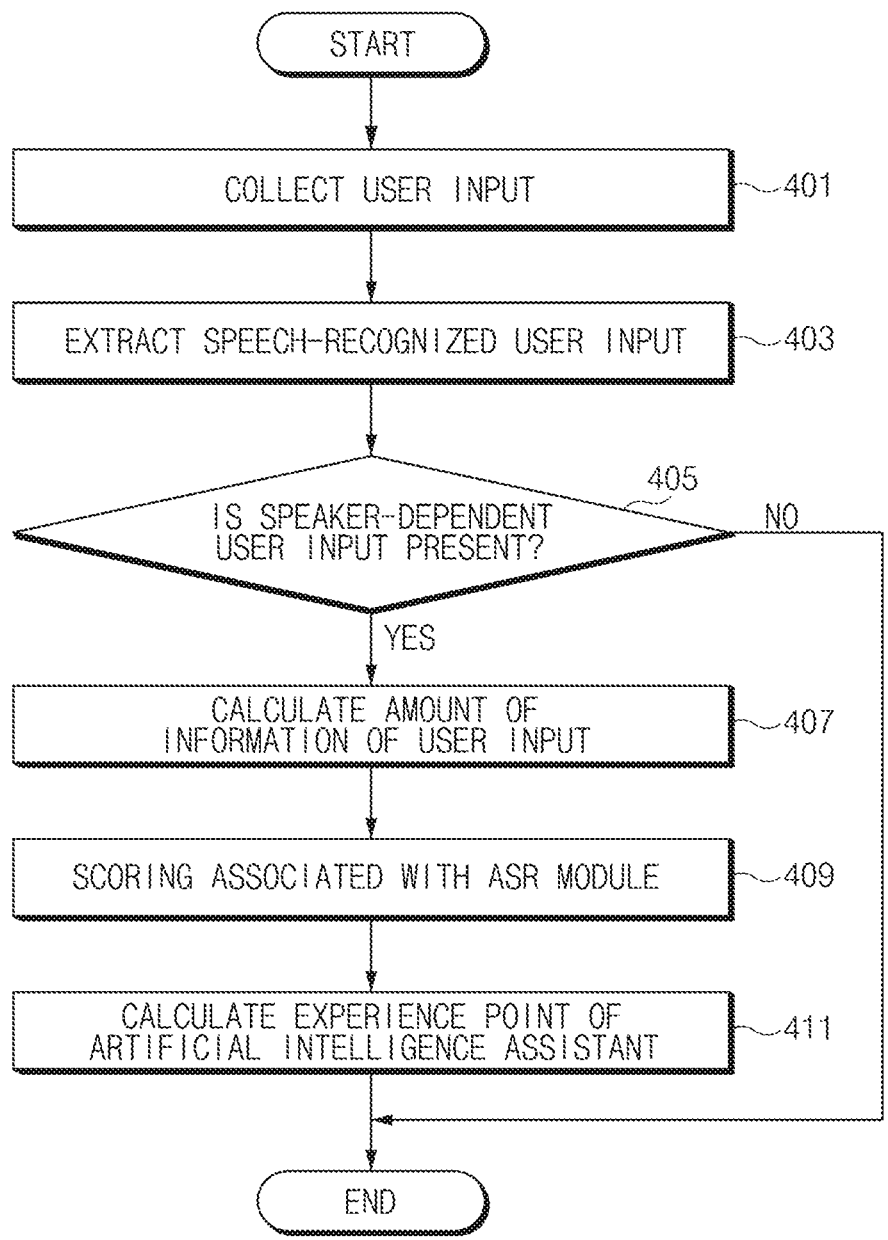
FIG. 4A is a flowchart illustrating a first embodiment to calculate an experience point of an artificial intelligence assistant based on function execution of an ASR module, according to an embodiment of the disclosure.

FIG. 4A is a flowchart illustrating a first embodiment to calculate an experience point of an artificial intelligence assistant based on function execution of an ASR module, according to an embodiment of the disclosure.

Referring to FIG. 4A, the intelligence agent 151 of FIG. 1B of the user terminal 100 of FIG. 1B may calculate the experience point of the artificial intelligence assistant based on the amount of information of a user input according to user speech.

In this regard, referring to FIG. 4A, in operation 401, the intelligence agent may collect the user input (or a voice signal) according to the user speech. For example, the intelligence agent may collect the user input, which has been stored in the memory 140 of FIG. 1B during a specified time period or which has been transmitted to the ASR module 210 of FIG. 1D of the intelligence server 200 of FIG. 1D.

In operation 403, the intelligence agent may extract a user input, of which the speech recognition is successful (or which is converted to a clear text) by the ASR module, of the collected at least one user input. The above-described operation may be implemented by sharing information about the speech recognition result between the user terminal and the ASR module of an intelligence server.

In operation 405, the intelligence agent may determine the presence or absence of the speaker-dependently recognized user input of at least one user input of which the speech recognition is successful. For example, the intelligence agent may obtain speaker recognition result information from the ASR module 210 of FIG. 1D of the intelligence server 200 of FIG. 1D to identify the speaker-dependently recognized user input. In the case where there is no speaker-dependently user input of the user input of which the speech recognition is successful, the intelligence agent may exclude the calculation of the experience point of the artificial intelligence assistant.

In the case where the at least one speaker-dependent user input is present, in operation 407, the intelligence agent may calculate the amount of information (e.g., accumulated time) by summing speech time corresponding to each speaker-dependent user input.

In operation 409, the intelligence agent may assign points Pts to the ASR module performing the speech recognition function associated with a user input, based on the amount of calculated information.

$$Pts_n = Pts_{n-1} + \alpha t \qquad \text{Equation 1}$$

$Pts_n$: the final point of the ASR module $Pts_{n-1}$: the previous point of the ASR module $\alpha$: the scoring coefficient associated with the ASR module 't': the accumulated time of user speech corresponding to a speaker-dependent user input It is understood that Equation 1 is an equation associated with the scoring of the ASR module. The intelligence agent may add the point $Pts_{n-1}$, which has been assigned to the ASR module, to the amount of calculated information (e.g., accumulated time 't') to assign the final point $Pts_n$ to the ASR module.

In operation 411, the intelligence agent may calculate the experience point of the artificial intelligence assistant by summing the final point $Pts_n$ of the ASR module and other points (e.g., the point of the NLU module 220 of FIG. 1D, the point of the personal information server 300 of FIG. 1A, a user activity point, or the like). Alternatively, the intelligence agent may calculate the experience point of the artificial intelligence assistant by comparing the final point $Pts_n$ of the ASR module with the other points based on a specified reference (e.g., the highest point or the lowest point).

Figure 4B:
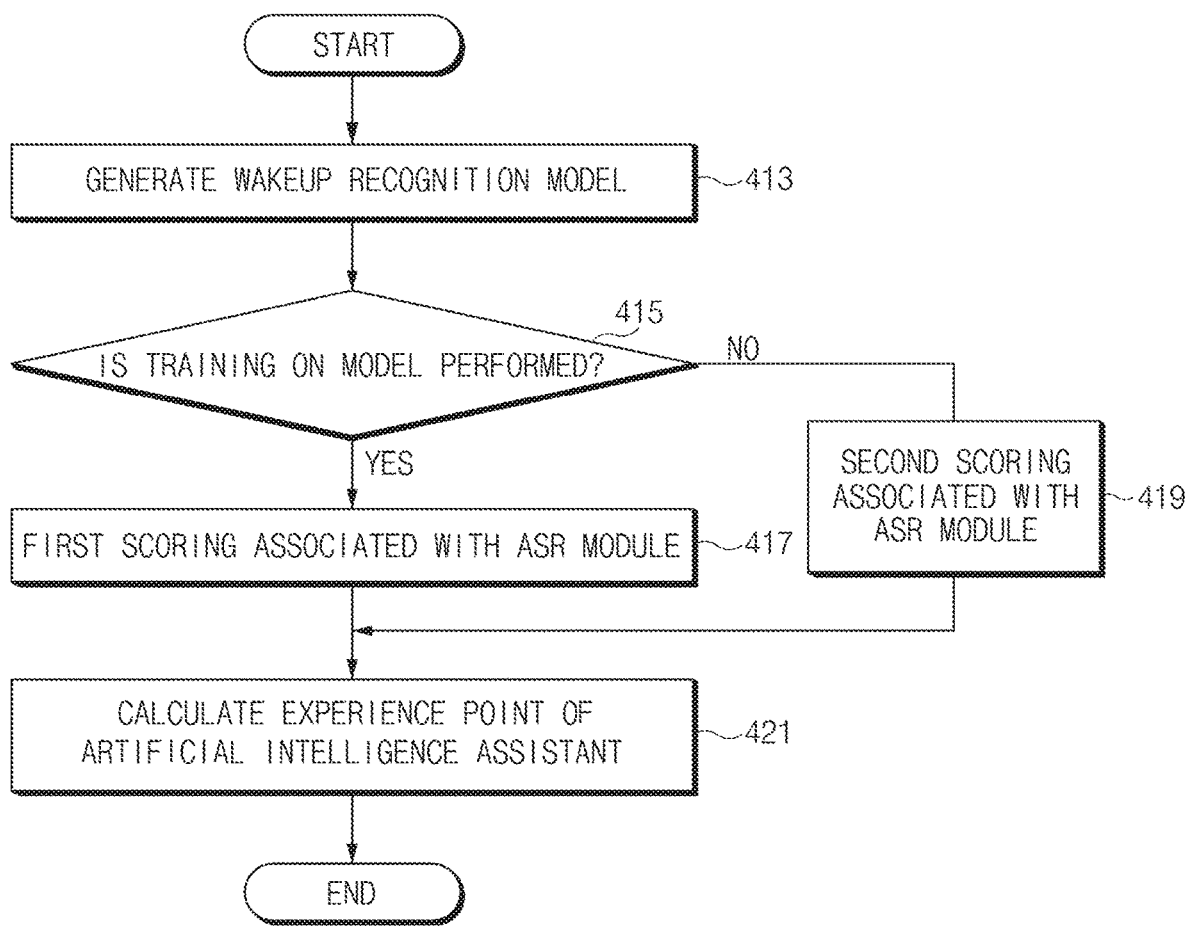
FIG. 4B is a flowchart illustrating a second embodiment to calculate an experience point of an artificial intelligence assistant based on function execution of an ASR module, according to an embodiment of the disclosure.

FIG. 4B is a flowchart illustrating a second embodiment to calculate an experience point of an artificial intelligence assistant based on function execution of an ASR module, according to an embodiment of the disclosure.

Referring to FIG. 4B, in operation 413, a user may perform wakeup command speech in association with the operation of a speech recognition service. It is understood that the wakeup command speech is the speech performed upon operating the speech recognition service of the user for the first time. Alternatively, it is understood that the wakeup command speech is the speech performed in an operation in which the user controls the setting of an intelligence app to designate the wakeup command speech. The wakeup command speech of the user may be transmitted to a wakeup recognition module included in the ASR module 210 of FIG. 1D of the intelligence server 200 of FIG. 1D by the processor 150 of FIG. 1B. The wakeup recognition module may generate a wakeup recognition model based on the transmitted wakeup command speech.

In operation 415, the intelligence agent may determine whether to perform the user's training on the wakeup command speech. It is understood that the training is the execution of the user's iterative wakeup command speech for mapping the user's wakeup command speech to the wakeup command recognition model. In an embodiment, the training associated with the wakeup command recognition model may be performed based on a specified algorithm (e.g., maximum likelihood estimation, gradient descent, linear regression, or the like).

In the case where the training is performed on the generated wakeup command recognition model, in operation 417, the intelligence agent may assign the first point Pts to the ASR module performing speech recognition on the user speech.

$$Pts_n = Pts_{n-1} + (\beta \cdot p(x|\lambda) + \beta_0) \cdot S_{wakeup} \quad \text{Equation 2}$$

$Pts_n$: the final point of the ASR module
$Pts_{n-1}$: the previous point of the ASR module
$S_{wakeup}$: the unit score of a wakeup command recognition model
$p(x|\lambda)$: the unit score of an algorithm used for wakeup command recognition model.
$\beta$ or $\beta_0$: correction coefficient It is understood that Equation 2 is another equation associated with the scoring of the ASR module. The intelligence agent may add the unit score $S_{wakeup}$ of the wakeup command recognition model, to which algorithm unit score $p(x|\lambda)$ is reflected, to the point $Pts_{n-1}$, which has been assigned to the ASR module to assign the final point $Pts_n$ to the ASR module.

Alternatively, in operation 419, in the case where the training is not performed on the wakeup command recognition model, the intelligence agent may assign the second point Pts to the ASR module.

$$Pts_n = Pts_{n-1} + S_{wakeup} \quad \text{Equation 3}$$

$Pts_n$: the final point of the ASR module
$Pts_{n-1}$: the previous point of the ASR module
$S_{wakeup}$: the unit score of a wakeup command recognition model It is understood that Equation 3 is still another equation associated with the scoring of the ASR module. The intelligence agent may add the unit score $S_{wakeup}$ of the generated wakeup command recognition model to the point $Pts_{n-1}$, which has been assigned to the ASR module to assign the final point $Pts_n$ to the ASR module. In this operation, the intelligence agent may proportionally increase the unit score of the wakeup command recognition model based on the number of recognition models generated by the wakeup recognition module, the number of users respectively matched to a plurality of recognition models, or the like.

In operation 421, the intelligence agent may calculate the experience point of the artificial intelligence assistant by summing the final point $Pts_n$ of the ASR module according to the assignment of the first point or the second point to the ASR module and other points (e.g., the point of the NLU module 220 of FIG. 1D, the point of the personal information server 300 of FIG. 1A, a user activity point, or the like). Alternatively, the intelligence agent may calculate the experience point of the artificial intelligence assistant by comparing the final point $Pts_n$ of the ASR module with the other points based on a specified reference (e.g., the highest point or the lowest point). In various embodiments, the wakeup recognition module may generate a recognition model associated with various command speeches in addition to the above-described wakeup command speech; in this case, a point may be assigned to the ASR module as in Equation 2 or Equation 3.

Figure 4C:
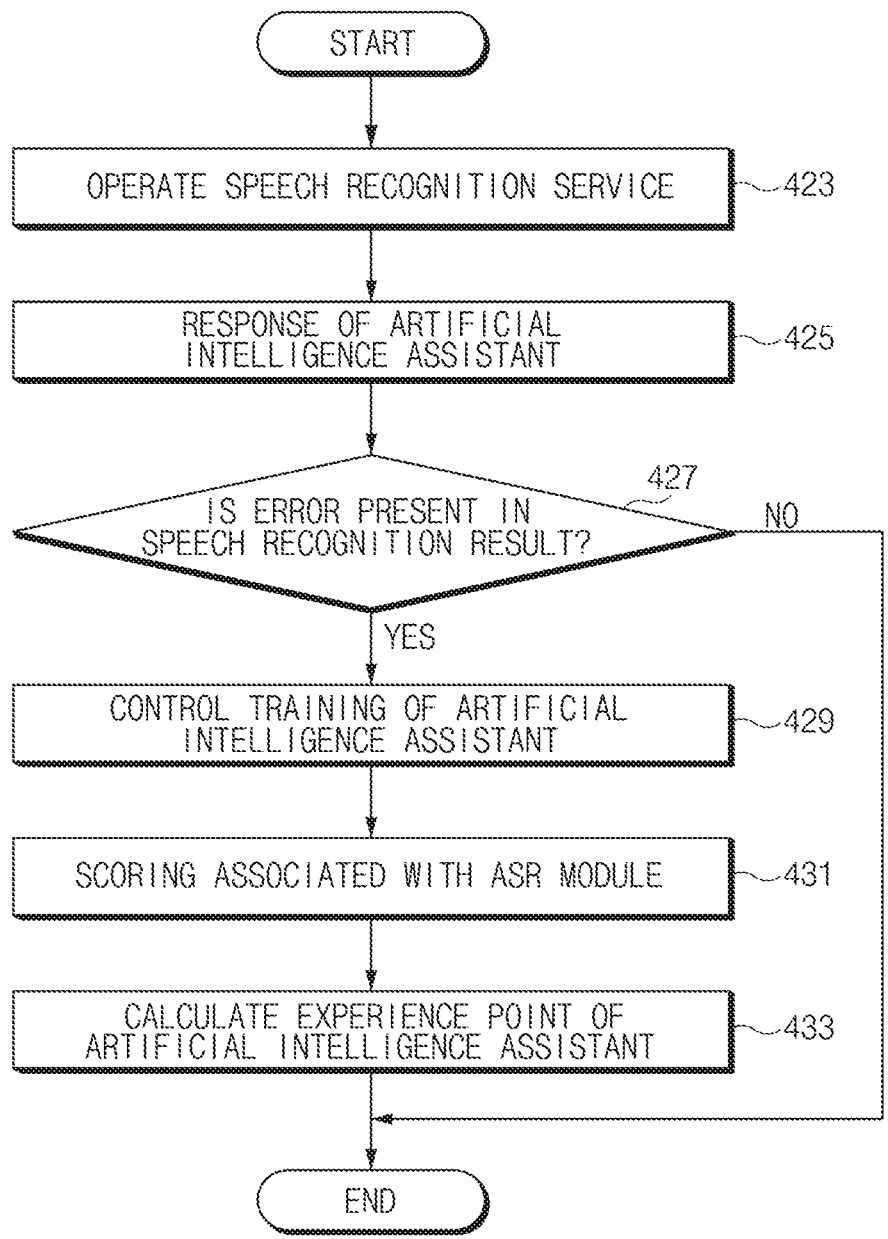
FIG. 4C is a flowchart illustrating a third embodiment to calculate an experience point of an artificial intelligence assistant based on function execution of an ASR module, according to an embodiment of the disclosure.

FIG. 4C is a flowchart illustrating a third embodiment to calculate an experience point of an artificial intelligence assistant based on function execution of an ASR module, according to an embodiment of the disclosure.

Figure 4D:
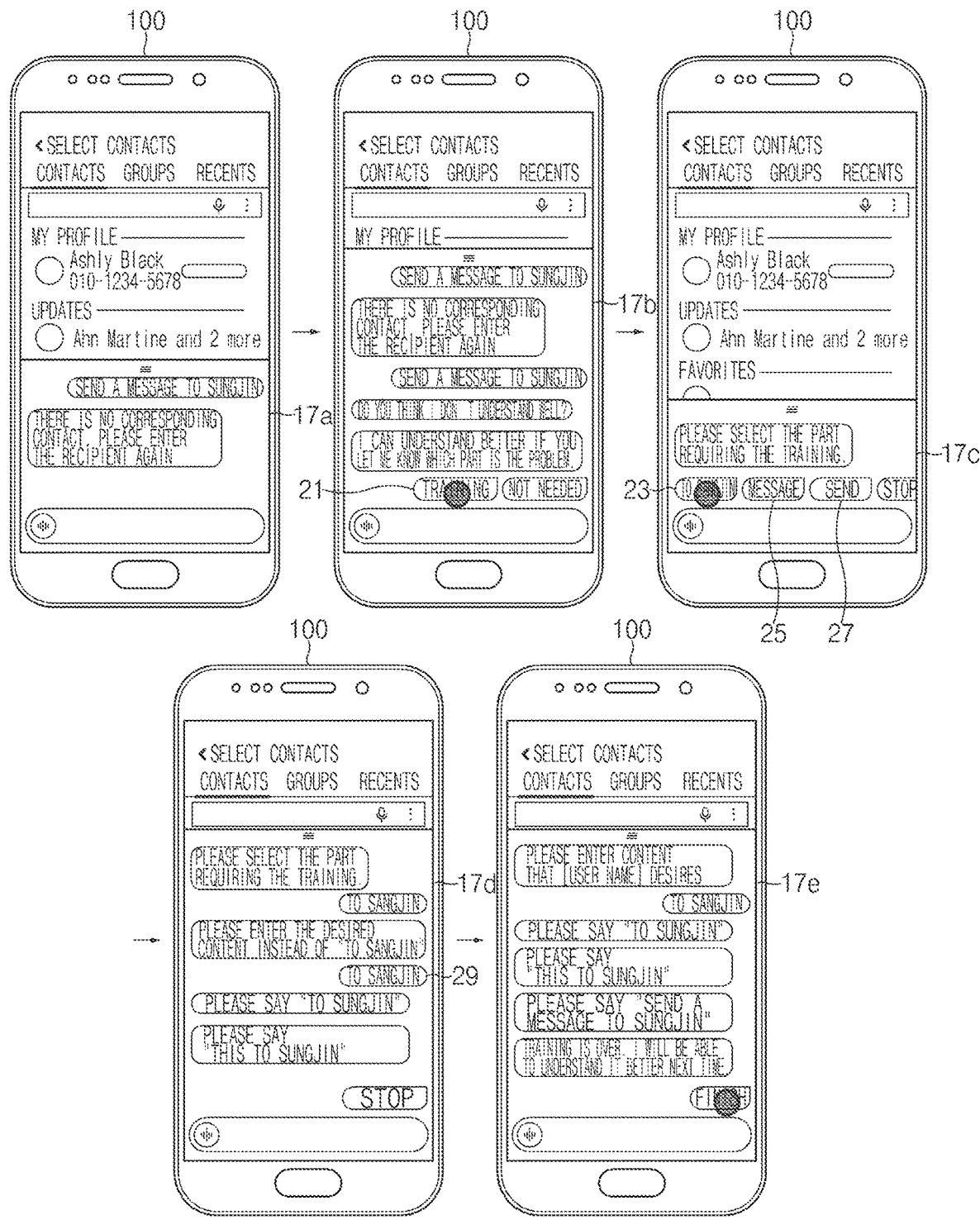
FIG. 4D is a view illustrating an embodiment to train an artificial intelligence assistant, according to an embodiment of the disclosure.
Figure 4E:
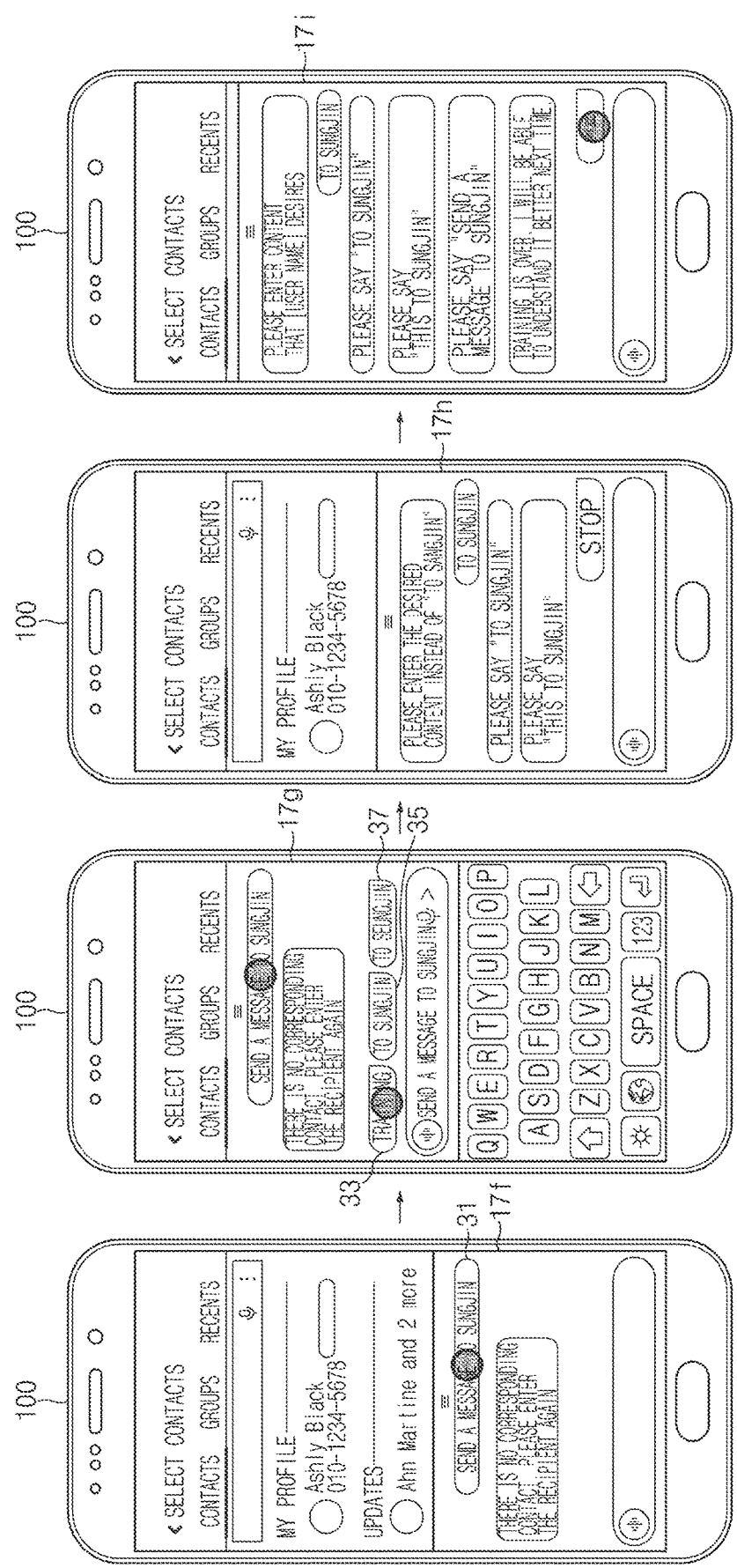
FIG. 4E is a view illustrating another embodiment to train an artificial intelligence assistant, according to an embodiment of the disclosure.

FIGS. 4D and 4E are views illustrating various embodiments to train an artificial intelligence assistant, according to various embodiments of the disclosure.

In an embodiment, the intelligence agent 151 of FIG. 1B of the user terminal 100 of FIG. 1B may calculate the experience point of an artificial intelligence assistant based on the result revision of speech recognition by the ASR module 210 of FIG. 1D.

Referring to FIG. 4C, in operation 423, the user may execute an intelligence app supporting the operation of a speech recognition service (e.g., manipulating a hardware key on an electronic device or speaking a specified wakeup command). As such, the artificial intelligence assistant responding to user speech may be activated, and a user may perform speech including a specific command or intent.

In operation 425, the activated artificial intelligence assistant may respond to the user speech. The response of the artificial intelligence assistant may be based on function execution by at least one of the ASR module 210 of FIG. 1D, the NLG module 250 of FIG. 1D, and the TTS module 260 of FIG. 1D in the intelligence server 200 of FIG. 1D. In an embodiment, the intelligence agent (or the processor 150 of FIG. 1B) may output the response of the artificial intelligence assistant on an interface (e.g., dialogue interface) supporting interaction between the user and the artificial intelligence assistant or may output the response through the speaker 130 of FIG. 1B.

In operation 427, the user may determine whether an error is present in the speech recognition result associated with the speech, based on the output response of the artificial intelligence assistant. For example, in the case where an error is present in the output text or in the case where the response of the artificial intelligence assistant is in conflict with the speech, the user may determine whether the speech recognition associated with the speech is unclearly performed. In the case where an event associated with the revision of the speech recognition result does not occur because speech recognition associated with user speech is clearly performed, the intelligence agent may exclude the calculation of the experience point of the artificial intelligence assistant.

In the case where the user recognizes the uncertainty of the speech recognition associated with the speech, in operation 429, the user may perform feedback speech on the response of the artificial intelligence assistant that is in conflict with a text or speech in which an error is present. The feedback speech may be transmitted to the DM module 240 of FIG. 1D of the intelligence server, and the DM module 240 may provide a user terminal with option information for training the artificial intelligence assistant (or for improving the speech recognition rate of the ASR module). The user may perform the option and may train the artificial intelligence assistant in association with speech recognition that is unclearly performed. Hereinafter, an example associated with above-described operation 427 and operation 429 will be described with reference to FIG. 4D.

Referring to a first dialogue interface 17*a* of FIG. 4D, in the case where the user performs speech (e.g., "send a message to Sungjin") including a specific command or intent, a user input associated with the user speech may be transmitted to the ASR module of the intelligence server, and the speech recognition may be performed. In this operation, in the case where the user speech is unclear, or in the case where noise is generated around the user during user speech, an error (e.g., send a message to Sangjin) may be present in the speech recognition result (or the converted text) of the ASR module. The intelligence server may transmit, to the user terminal, text information converted by the ASR module and path rule information by the NLU module 220 of FIG. 1D. The intelligence agent may output the transmitted text information, and an execution service 141*a* or 143*a* of FIG. 1B of a specific app (e.g., message app) corresponding to the path rule may perform at least one unit operation included in the path rule. At this time, in the case where there is no information corresponding to information (e.g., parameter information) accompanying the execution of the unit operation on a user terminal, the intelligence agent may provide a DM module with a notification thereof. The DM module may transmit, to an electronic device, text information (e.g., there is no corresponding contact. Please re-enter the recipient.) about the absence of the information and text information for requesting the re-execution of the user speech.

Referring to a second dialogue interface 17*b*, when the user re-performs speech (e.g., "send a message to Sungjin"), the ASR module may perform speech recognition on the re-performed speech. At this time, in the case where the speech recognition result of the re-performed speech is the same as the previous speech recognition result, the DM module may transmit, to a user terminal, specified text information (e.g., Do you think I don't understand well? I can understand better if you let me know which part is the problem.). Together with the transmission of the specified text information, the DM module may transmit option information associated with the training of the artificial intelligence assistant or the improvement of speech recognition rate. For example, it is understood that the option information is a training tap 21 output on the second dialogue interface 17*b*.

Referring to a third dialogue interface 17*c*, in the case where the user selects the training tap 21, the DM module may make a request for additional information associated with the training of the artificial intelligence assistant to the user terminal. For example, the DM module may transmit text information (e.g., please select the part requiring the training) requesting details about the error of the speech recognition result and list information about at least one or more words constituting the text converted by the ASR module. For example, it is understood that the list information includes "to Sangjin" tap 23, "message" tap 25, and "send" tap 27.

Referring to a fourth dialogue interface 17*d* and a fifth dialogue interface 17*e*, in the case where a user input (e.g., touch) is applied to a word tap (e.g., "to Sangjin" tap 29) corresponding to the error on the third dialogue interface 17*c*, the DM module may transmit text information (e.g., please enter your desired content instead of "to Sangjin") for requesting the revision of the error, to the user terminal. To cope with the issue, an intelligence agent (or a processor) may output an input interface (e.g., SIP keyboard), and the user may enter details (e.g., to Sungjin) about the revision of the error. After receiving revision information from the user terminal, the DM module may transmit at least one text information (e.g., please tell "to Sungjin", please tell "this to Sungjin", please tell "send a message to Sungjin", or the like) associated with a speech request including the revision. In the case where the user performs the requested speech, the ASR module may update a speech recognition model based on a user input according to user speech (e.g., "to Sungjin", "this to Sungjin" and "send a message to Sungjin").

FIG. 4E is a diagram illustrating another example associated with operation 427 and operation 429, and one example described in FIG. 4E may include a training process similar to an example described in FIG. 4D. Accordingly, a duplicated description may be omitted.

The description of a sixth dialogue interface 17*f* of FIG. 4E may correspond to that described through the first dialogue interface 17*a* of FIG. 4D. However, according to an embodiment, in the case where text information (e.g., there is no corresponding contact. Please re-enter the recipient.) about the absence of the information and text information for requesting the re-execution of the user speech is output on a sixth dialogue interface 17*f*, the user may apply a user input (e.g., touch) to the text information 31 (e.g., send a message to Sangjin) converted by the ASR module.

Referring to a seventh dialogue interface 17*g*, the DM module of an intelligence server may transmit at least one option information associated with the training of the artificial intelligence assistant or the improvement of the speech recognition rate, in response to the user input. For example, it is understood that the at least one option information includes the training tap 33, "to Sungjin" tap 35, and "to Seungjin" tap 37. The user may apply a user input to a tap, which is associated with the error, in at least one option information output on the seventh dialogue interface 17*g* to designate the requested recipient. Alternatively, in the case where there is no tap associated with the error on at least one option information, the user may select the training tap 33 to proceed to the training process as illustrated in an eighth dialogue interface 17*h* and a ninth dialogue interface 17*i*. The descriptions of the eighth dialogue interface 17*h* and the ninth dialogue interface 17*i* may be the same as or correspond to that described through the fourth dialogue interface 17*d* and the fifth dialogue interface 17*e* in FIG. 4D.

Returning to FIG. 4C, in operation 431, in a process to revise the above-described speech recognition result, the intelligence agent of a user terminal may assign the point Pts to the ASR module, based on information (e.g., the number of revised words) about the revision.

$$Pts_n = Pts_{n-1} + N_W S_W \qquad \text{Equation 4}$$

$Pts_n$: the final point of the ASR module
$Pts_{n-1}$: the previous point of the ASR module
$N_W$: the number of revised words
$S_W$: the unit score of the revised word It is understood that Equation 4 is yet another equation associated with the scoring of the ASR module. The intelligence agent may add a value, which is obtained by multiplying the number of revised words $N_W$ by the unit score $S_W$, to the point $Pts_{n-1}$, which has been assigned to the ASR module to assign the final point $Pts_n$ to the ASR module.

Operation 433 may be the same as or correspond to operation 411 described through FIG. 4A.

Figure 5A:
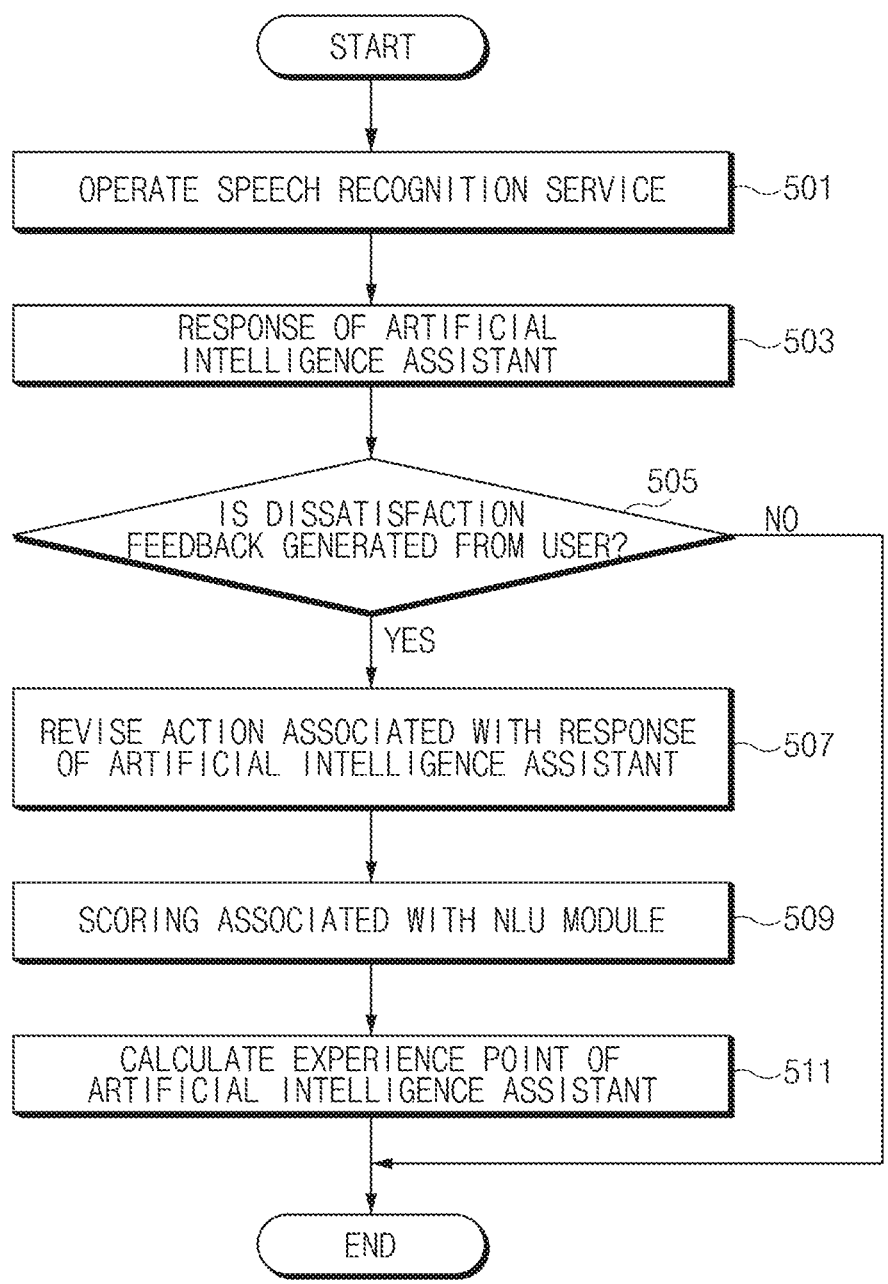
FIG. 5A is a flowchart illustrating a fourth embodiment to calculate an experience point of an artificial intelligence assistant based on function execution of an NLU module, according to an embodiment of the disclosure.
Figure 5B:
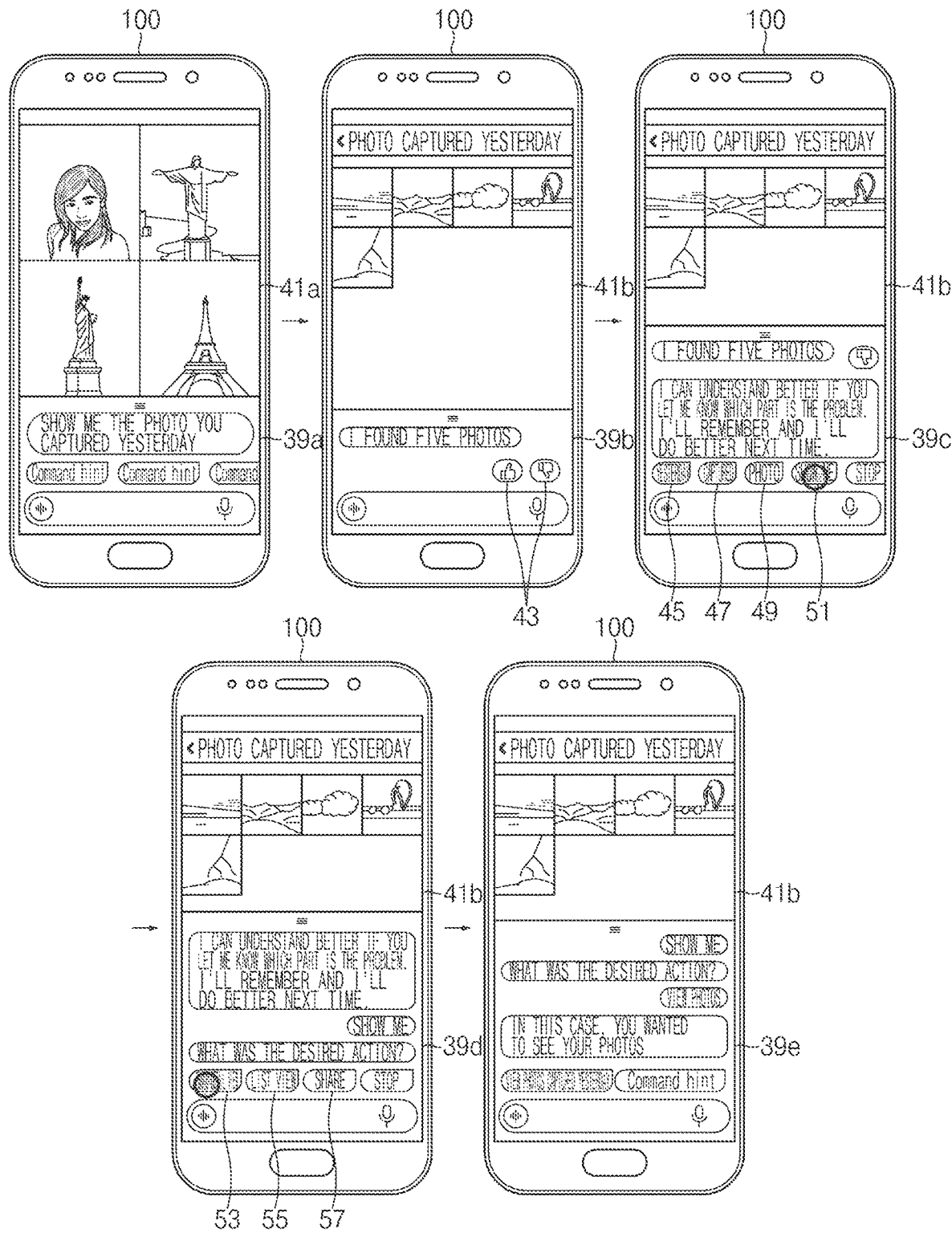
FIG. 5B is a view illustrating an embodiment to train an artificial intelligence assistant, according to an embodiment of the disclosure.

FIG. 5A is a flowchart illustrating a fourth embodiment to calculate an experience point of an artificial intelligence assistant based on function execution of an NLU module, according to an embodiment of the disclosure. FIG. 5B is a view illustrating an embodiment to train an artificial intelligence assistant, according to an embodiment of the disclosure.

In an embodiment, the intelligence agent 151 of FIG. 1B of the user terminal 100 of FIG. 1B may calculate the experience point of an artificial intelligence assistant based on the application of user preference information about the function execution (e.g., identification of the intent of user speech) of the NLU module 220 of FIG. 1D.

In this regard, referring to FIG. 5A, in operation 501, a user may operate a speech recognition service by executing an intelligence app installed in a user terminal. If the intelligence app is executed, or if the artificial intelligence assistant is activated depending on the execution of the intelligence app, the user may perform speech including a specific command or intent.

In operation 503, the activated artificial intelligence assistant may respond to the user speech. For example, the response corresponding to the user speech may be generated based on function execution by at least one of the ASR module 210 of FIG. 1D, the NLG module 250 of FIG. 1D, and the TTS module 260 of FIG. 1D of the intelligence server 200 of FIG. 1D, and the intelligence agent (or the processor 150 of FIG. 1B) of the user terminal may output the response on a dialogue interface.

In operation 505, the intelligence agent may receive feedback information about the execution result of a specific unit operation (e.g., final unit operation) according to a path rule, from the user. In the case where the feedback information of satisfaction attribute is provided from the user, the intelligence agent may exclude the calculation of the experience point of the artificial intelligence assistant.

In the case where the feedback information of dissatisfaction attribute is provided from the user, in operation 507, the intelligence agent may receive, from the user, preference information associated with the execution result of the specific unit operation and may transmit the feedback information of the dissatisfaction attribute and the preference information to an intelligence server. To cope with the issue, the NLU module 220 of FIG. 1D may apply preference information of the user to the intent on a matching rule consisting of a domain, intent, and a parameter (or slot). In this operation, the NLU module 220 may change a unit operation (or action) associated with the preference information on a path rule associated with the user speech intent before the preference information is applied. Hereinafter, an example associated with above-described operation 505 and operation 507 will be described with reference to FIG. 5B.

Referring to a tenth dialogue interface 39*a* of FIG. 5B, in the case where speech (e.g., "Show me the photo you captured yesterday") including a specific command or intent is performed by the user, a user input according to the speech may be transmitted to the ASR module of the intelligence server. In an embodiment, it is understood that the user's specific command or intent included in the speech is view details (e.g., a state where a photo is enlarged in the screen area of an electronic device) associated with a photo among at least one or more photos captured yesterday. The ASR module may perform speech recognition on a user input and, after converting the recognized user input into a text, the ASR module may transmit the text to the user terminal. The NLU module may analyze the speech recognition result (or converted text) to determine a domain (e.g., photo), intent (e.g., show me a photo), and a parameter (e.g., yesterday). The NLU module may generate a path rule including a first unit operation (e.g., execution of a gallery application), a second unit operation (e.g., date settings), a third unit operation (e.g., navigation of a gallery), and a fourth unit operation (e.g., thumbnail display), based on the user speech intent or may select the path rule on a database to transmit the selected path rule to the user terminal. As such, the intelligence agent may output text information received from the ASR module on the tenth dialogue interface 39*a* and may output the execution screen of a specific unit operation (e.g., the first unit operation (the execution of a gallery application)) to a fourth interface area 41*a*, which is an area other than the tenth dialogue interface 39*a* in the screen area of the user terminal.

Referring to an eleventh dialogue interface 39*b*, the intelligence agent may perform a final unit operation on a path rule and may transmit processing information thereof to the intelligence server. With regard to the processing information, the intelligence agent may output text information (e.g., I found five photos), which the NLG module transmits, and at least one object 43 supporting the user's feedback input associated with the final unit operation, on the eleventh dialogue interface 39*b*. In addition, the intelligence agent may output the execution screen (e.g., a screen including fifth thumbnails) of a final unit operation (e.g., the fourth unit operation (thumbnail display), in a fifth interface area 41*b* of the screen area of the user terminal.

Referring to a twelfth dialogue interface 39*c*, when the command or intent of the performed speech is a photo detail view, the user may apply an input to a dissatisfaction object. In this case, the DM module 240 of FIG. 1D may receive information about a user input from the user terminal and may transmit, to the user terminal, text information (e.g., I can understand better if you let me know which part is the problem. I'll remember and I'll do better next time.) corresponding to the user's dissatisfaction feedback. In this operation, the DM module 240 may transmit list information about at least one word constituting the text converted by the ASR module, to the user terminal. For example, it is understood that the list information includes yesterday tap 45, "captured" tap 47, "photo" tap 49, and "show me" tap 51. The user may apply an input (e.g., touch) to "show me" tap 51 corresponding to view details.

Referring to a thirteenth dialogue interface 39d and a fourteenth dialogue interface 39e, the DM module may transmit at least one group of candidates' information to the user terminal, in response to the user's touch input. As such, photo detail view tap 53, list view tap 55, or share tap 57 corresponding to the group of candidates' information may be displayed on the thirteenth dialogue interface 39d. The user may apply the touch input to a tab (e.g., photo detail view tap 53) closely related to the speech intent. In this case, the NLU module may determine that the photo detail view is user preference information, and may apply the preference information to intent on a matching rule composed of a domain, intent, and a parameter. As such, the NLU module may change the unit operation associated with the user's speech intent previously derived based on the application of the preference information of at least one unit operation constituting the pass rule. For example, the NLU module may change the fourth unit operation from the thumbnail display to photo detail view.

Returning to FIG. 5A, in operation 509, when the preference information is applied to the user speech intent initially identified by the NLU module, the intelligence agent of a user terminal may assign a point (Pts) to the NLU module.

$$Pts_n = Pts_{n-1} + S_{intent} \quad \text{Equation 5}$$

$Pts_n$: the final point of the NLU module
$Pts_{n-1}$: the previous point of the NLU module
$S_{intent}$: the unit score of user preference information applied to the intent on the matching rule It is understood that Equation 5 is an equation associated with the scoring of the NLU module. The intelligence agent may add the unit score $S_{intent}$ of the user preference information to the point $Pts_{n-1}$, which has been assigned to the NLU module, to assign the final point $Pts_n$ to the NLU module.

Operation 511 may be the same as or correspond to operation 411 described through FIG. 4A.

Figure 5C:
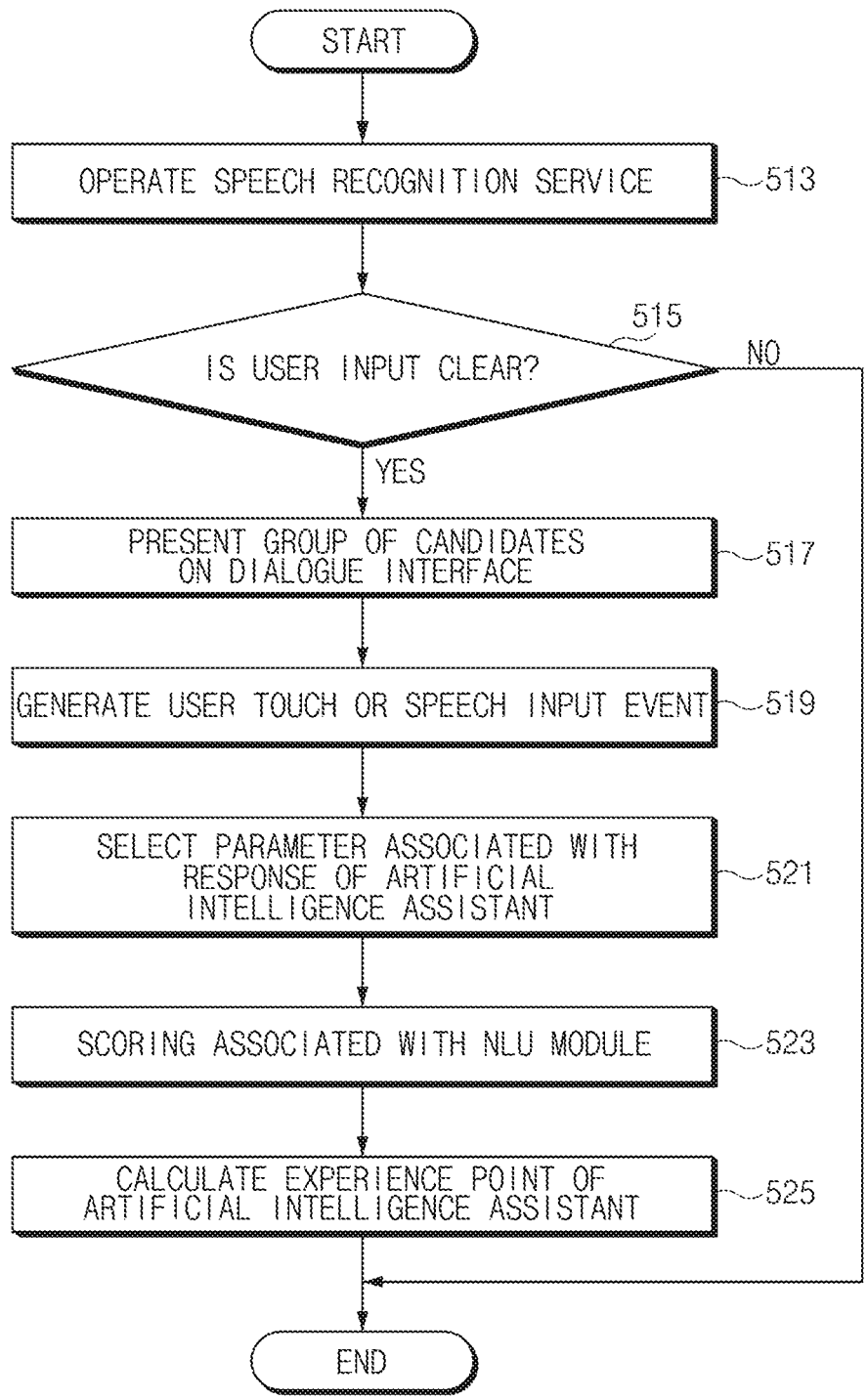
FIG. 5C is a flowchart illustrating a fifth embodiment to calculate an experience point of an artificial intelligence assistant based on function execution of an NLU module, according to an embodiment of the disclosure.

FIG. 5C is a flowchart illustrating a fifth embodiment to calculate an experience point of an artificial intelligence assistant based on function execution of an NLU module, according to an embodiment of the disclosure.

In an embodiment, the intelligence agent 151 of FIG. 1B of the user terminal 100 of FIG. 1B may calculate the experience point of an artificial intelligence assistant based on the application of user preference information about the function execution (e.g., determination of the parameter (or slot) of user speech) of the NLU module 220 of FIG. 1D.

Referring to FIG. 5C, in operation 513, a user may control (e.g., manipulating a hardware key on a user terminal or speaking a specified wakeup command) the execution of a speech recognition app to activate the artificial intelligence assistant and may perform speech (e.g., "call Professor Hong") including a specific command or intent.

In operation 515, the intelligence agent may determine the clarity of the user input according to user speech. In this regard, the ASR module 210 of FIG. 1D of the intelligence server 200 of FIG. 1D may perform speech recognition on the user input, and the NLU module 220 of FIG. 1D may analyze the speech recognition result (or the text converted by the ASR module 210) to identify a domain (e.g., telephone), intent (e.g., make a call), and a parameter (e.g., Professor Hong). The NLU module may generate a path rule including a first unit operation (e.g., execution of a contact application), a second unit operation (e.g., recipient settings), and a third unit operation (e.g., Call connection), depending on the identification of a user speech intent or may select the path rule on a database to transmit the selected path rule to the user terminal. In an embodiment, in the case where a function (e.g., a call function) corresponding to user speech is performed on the user terminal after the execution the at least one unit operation is completed, the intelligence agent may exclude the calculation of the experience point of an artificial intelligence assistant.

Alternatively, in an embodiment, with regard to the execution of the second unit operation (e.g., recipient settings), pieces of information (e.g., Professor Gildong Hong and Professor Samsung Hong) corresponding to information about the parameter (e.g., Professor Hong) that the NLU module identifies may be present on a user terminal (or contact application). In this case, the intelligence agent may determine that the user input according to user speech is unclear.

If it is determined that the user input is unclear, in operation 517, the DM module 240 of FIG. 1D of the intelligence server may transmit a group of candidates (e.g., Professor Gildong Hong tap and Professor Samsung Hong tap) of parameter (e.g., Professor Hong), that causes the uncertainty, to the user terminal. Alternatively, the DM module may transmit additional information request (e.g., there are contacts of Professor Gildong Hong and Professor Samsung Hong. Who do you want to call?) in the form of a text, to the user terminal.

In operation 519, a user may apply a touch input to one among the group of candidates depending on the intent of the performed speech or may touch one of Professor Gildong Hong or Professor Samsung Hong through an input interface (e.g., SIP keyboard). Alternatively, in various embodiments, the user may provide a user input associated with one of Professor Gildong Hong or Professor Samsung Hong, through speech.

In operation 521, the NLU module may determine that the candidate selected from the user or the professor (e.g., Professor Gildong Hong) corresponding to the user touch or the speech input is user preference information. The NLU module may apply the determined preference information to the initially identified parameter (e.g., Professor Hong) or may assign a priority to the initially identified parameter, with regard to the speech recognition result by the ASR module Afterwards, the NLU module may determine that the speech recognition result including Professor Hong or the parameter associated with the converted text is Professor Gildong Hong.

In operation 523, the intelligence agent may assign the point Pts to the NLU module based on the application of the user preference information about the parameter that the NLU module identifies initially.

$$Pts_n = Pts_{n-1} + S_{param} \quad \text{Equation 6}$$

$Pts_n$: the final point of the NLU module
$Pts_{n-1}$: the previous point of the NLU module
$S_{param}$: the unit score of user preference information applied to a parameter It is understood that Equation 5 is another equation associated with the scoring of the NLU module. The intelligence agent may add the unit score $S_{param}$ of the user preference information to the point $Pts_{n-1}$, which has been assigned to the NLU module, to assign the final point $Pts_n$ to the NLU module.

Operation 525 may be the same as or correspond to operation 411 described through FIG. 4A.

Figure 5D:
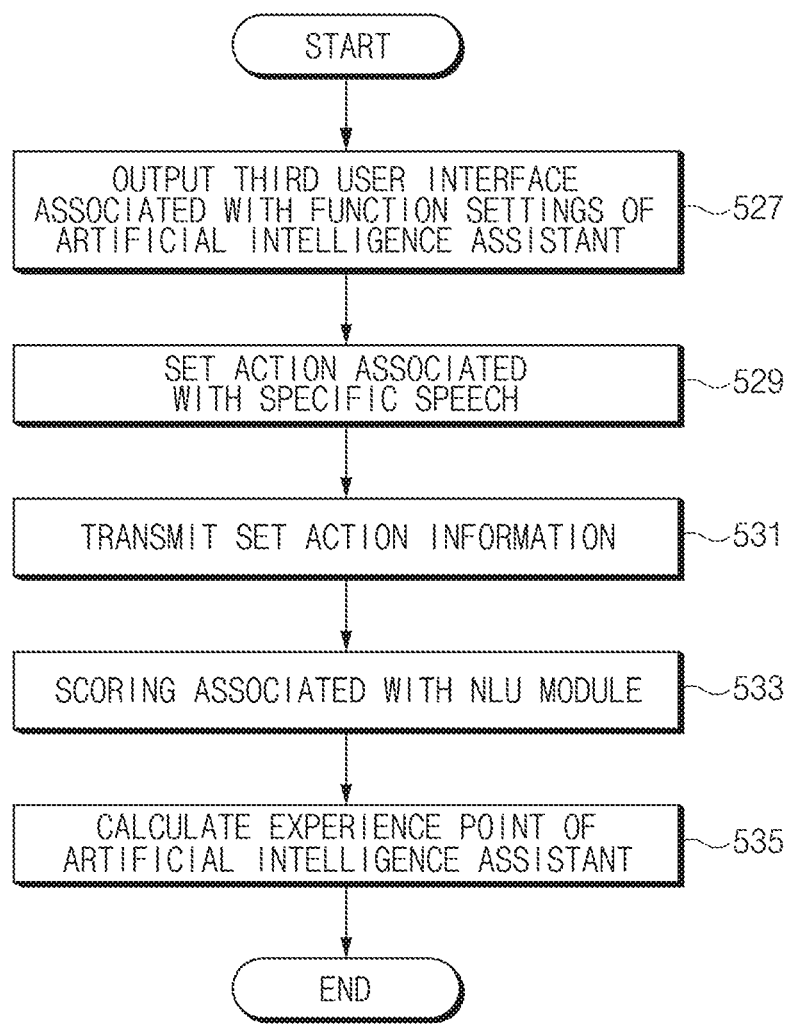
FIG. 5D is a flowchart illustrating a sixth embodiment to calculate an experience point of an artificial intelligence assistant based on function execution of an NLU module, according to an embodiment of the disclosure.

FIG. 5D is a flowchart illustrating a sixth embodiment to calculate an experience point of an artificial intelligence assistant based on function execution of an NLU module, according to an embodiment of the disclosure.

Figure 5E:
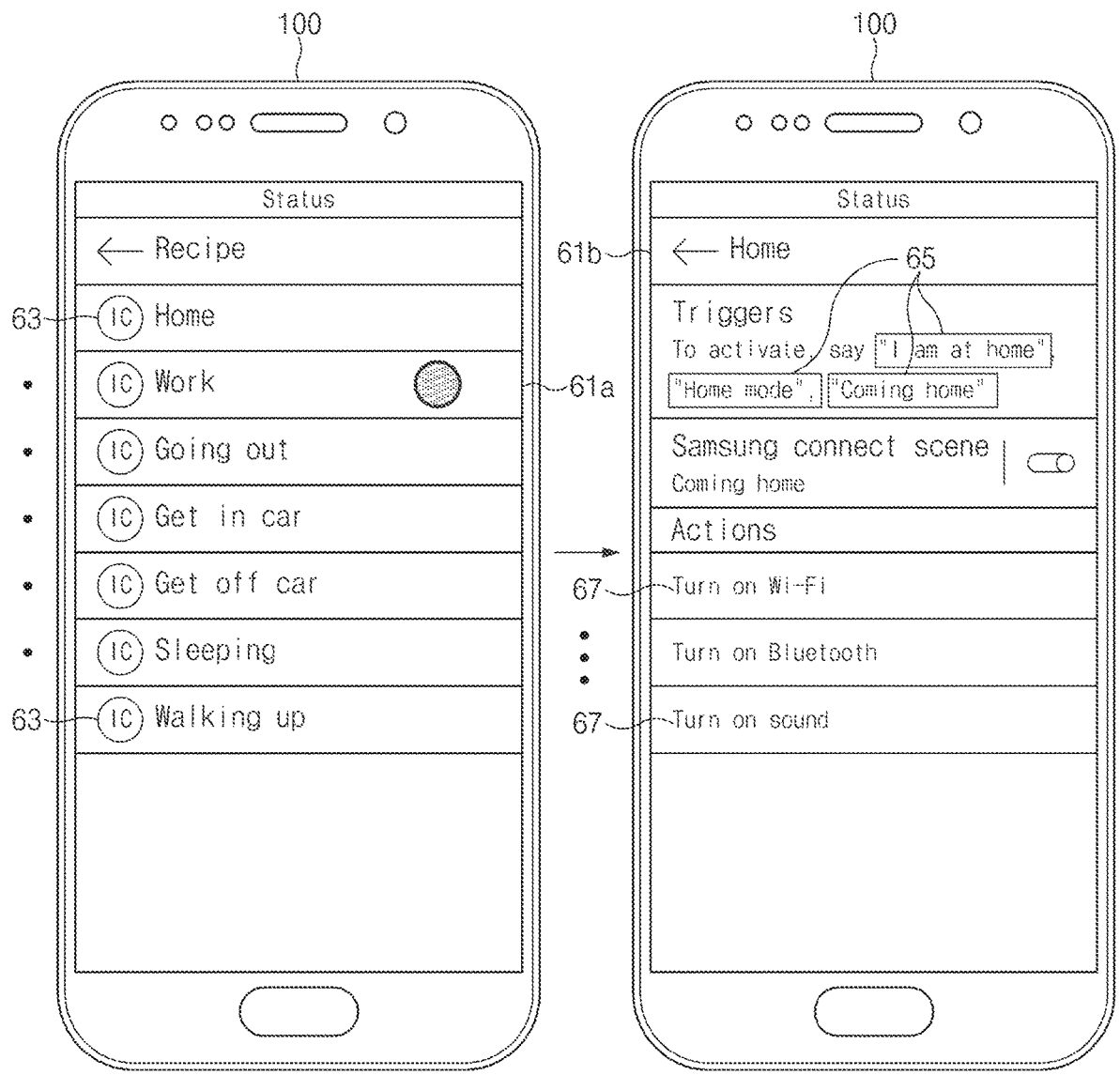
FIG. 5E is a view illustrating an embodiment to train an artificial intelligence assistant, according to an embodiment of the disclosure.

FIG. 5E is a view illustrating an embodiment to train an artificial intelligence assistant, according to an embodiment of the disclosure.

In an embodiment, the intelligence agent 151 of FIG. 1B of the user terminal 100 of FIG. 1B may calculate the experience point of an artificial intelligence assistant based on function response settings corresponding to the function execution (e.g., identification of the intent of user speech) of the NLU module 220 of FIG. 1D.

In this regard, referring to FIG. 5D, in operation 527, the intelligence agent (or the processor 150 of FIG. 1B) may output a sixth interface associated with function settings of a speech recognition service, under control of a user. For example, it is understood that the sixth interface is at least part of the execution screen of an intelligence app.

In operation 529, the user may select one of at least one category on the sixth interface and may set at least one function response (or action) to be triggered by the speech associated with the corresponding category. In an embodiment, the category may be associated with at least one of user location and user context, and each category may be referred to as a "recipe". Hereinafter, an example associated with operation 529 will be described with reference to FIG. 5E.

Referring to FIG. 5E, at least one category 63 (or recipe) associated with the location (e.g., Home, Work, or the like) and the context (e.g., Going out, Get in car, Get off car, Sleeping, Walking up, or the like) of a user may be included on a sixth interface 61a. In an embodiment, in the case where the user applies an input (e.g., touch) to the area of a specific category (e.g., Home), the sixth interface 61a may be switched to a seventh interface 61b supporting function response settings associated with the corresponding category.

At least one speech information 65 (e.g., "I am at home", "Home mode", "Coming home", or the like) associated with the category selected from a user may be included on the seventh interface 61b. For example, the speech information 65 may include a word corresponding to the category or a word associated with the intent of the category. In addition, information 67 (e.g., Turn on Wi-Fi, Turn on Bluetooth, Turn on sound, or the like) about at least one function response (or action) may be included in one area of the seventh interface 61b. In an embodiment, it is understood that the function response is an operation that is to be performed by the intelligence agent after being triggered by the performed speech, in the case where the user has performed speech on one of the at least one speech information 65. In this regard, the function response may be associated with the control of the function installed in the user terminal or may be associated with the function control of at least one external device (e.g., IoT device) that interacts with the user terminal. The user may select and activate a specific function response based on an input (e.g., touch); in this operation, the sequence of user inputs associated with the plurality of functional responses may act in sequence of a plurality of functional responses to be performed by the intelligent agent.

Returning to FIG. 5D, in operation 531, the intelligence agent may transmit, to the NLU module 220 of FIG. 1D of the intelligence server 200 of FIG. 1D, speech information (e.g., "I am at home", "Home mode", "Coming home", or the like) associated with a specific category (e.g., Home) and information about the function response (or action) activated with respect to the speech information. Alternatively, in various embodiments, at least one speech information associated with a specific category may be stored in the database 221 of FIG. 1D corresponding to the NLU module, and the intelligence agent may transmit, to the NLU module, only the function response information activated by the user. The NLU module may map and store speech information about the specific category to function response information.

According to the above description, in the case where a user speech intent associated with the user input derived from the NLU module corresponds to the speech information designated with respect to the specific category, the NLU module may specify (or determine) the function response, which is mapped to the speech information, as the user speech intent. When the user speech intent is determined as the function response, the NLU module may generate or select a path rule associated with the execution of the function response. That is, in the case where the user performs speech corresponding to the specific category, the intelligence agent may receive a path rule associated with the function response mapped to the speech to perform at least one unit operation, and thus perform the function response.

In operation 533, the intelligence agent may assign the point Pts to the NLU module based on function response setting associated with a specified user speech.

$$Pts_n = Pts_{n-1} + S_{recipe} \qquad \text{Equation 7}$$

$Pts_n$: the final point of the NLU module $Pts_{n-1}$: the previous point of the NLU module $S_{recipe}$: the unit score of a function response set to a specific recipe (or category)

It is understood that Equation 7 is yet another equation associated with the scoring of the NLU module. The intelligence agent may add the unit score $S_{recipe}$ of the set function response to the point $Pts_{n-1}$, which has been assigned to the NLU module, to assign the final point $Pts_n$ to the NLU module. In an embodiment, in the case where there are a plurality of function responses set (or activated) by the user, the unit score of each of the plurality of functions responses may be added to the previous point $Pts_{n-1}$ of the NLU module.

Operation 535 may be the same as or correspond to operation 411 described through FIG. 4A.

Figure 6A:
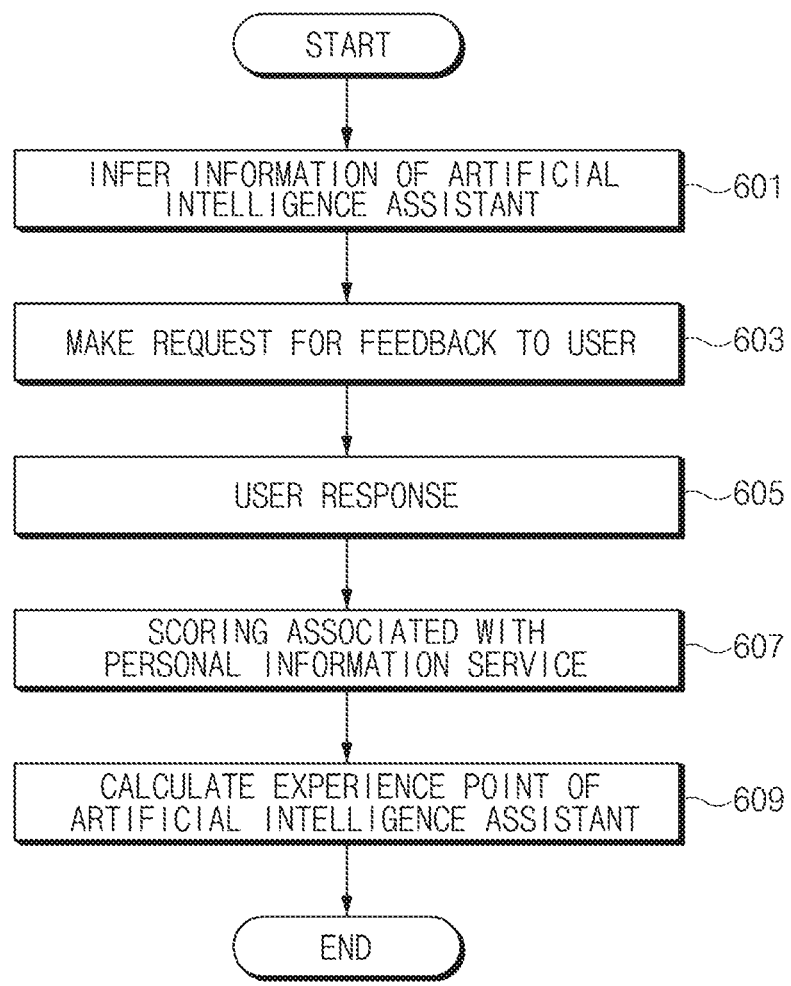
FIG. 6A is a flowchart illustrating a seventh embodiment to calculate an experience point of an artificial intelligence assistant based on function execution of a personal information server, according to an embodiment of the disclosure.

FIG. 6A is a flowchart illustrating a seventh embodiment to calculate an experience point of an artificial intelligence assistant based on function execution of a personal information server, according to an embodiment of the disclosure.

Figure 6B:
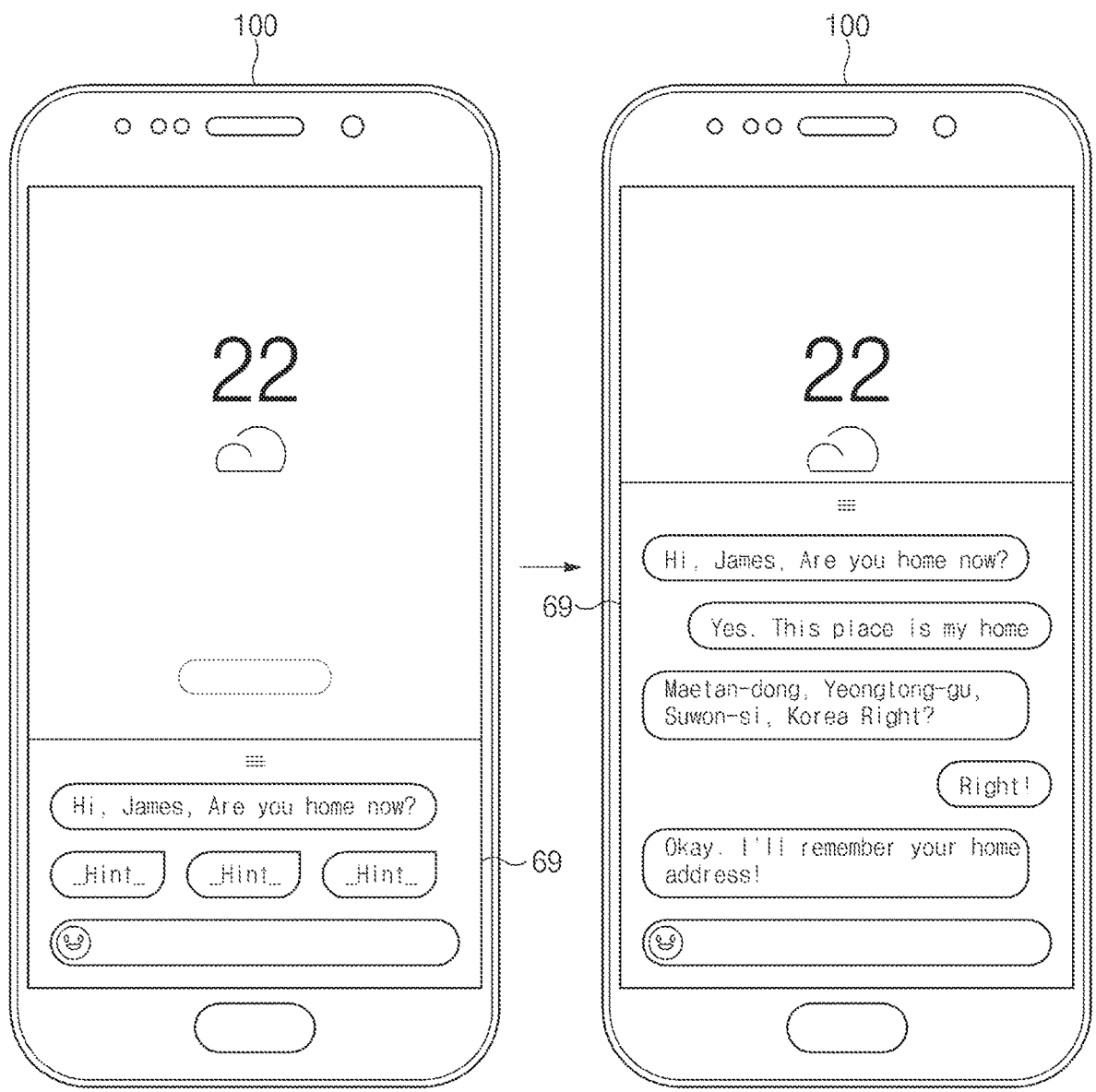
FIG. 6B is a view illustrating an embodiment to train an artificial intelligence assistant, according to an embodiment of the disclosure.
Figure 6C:
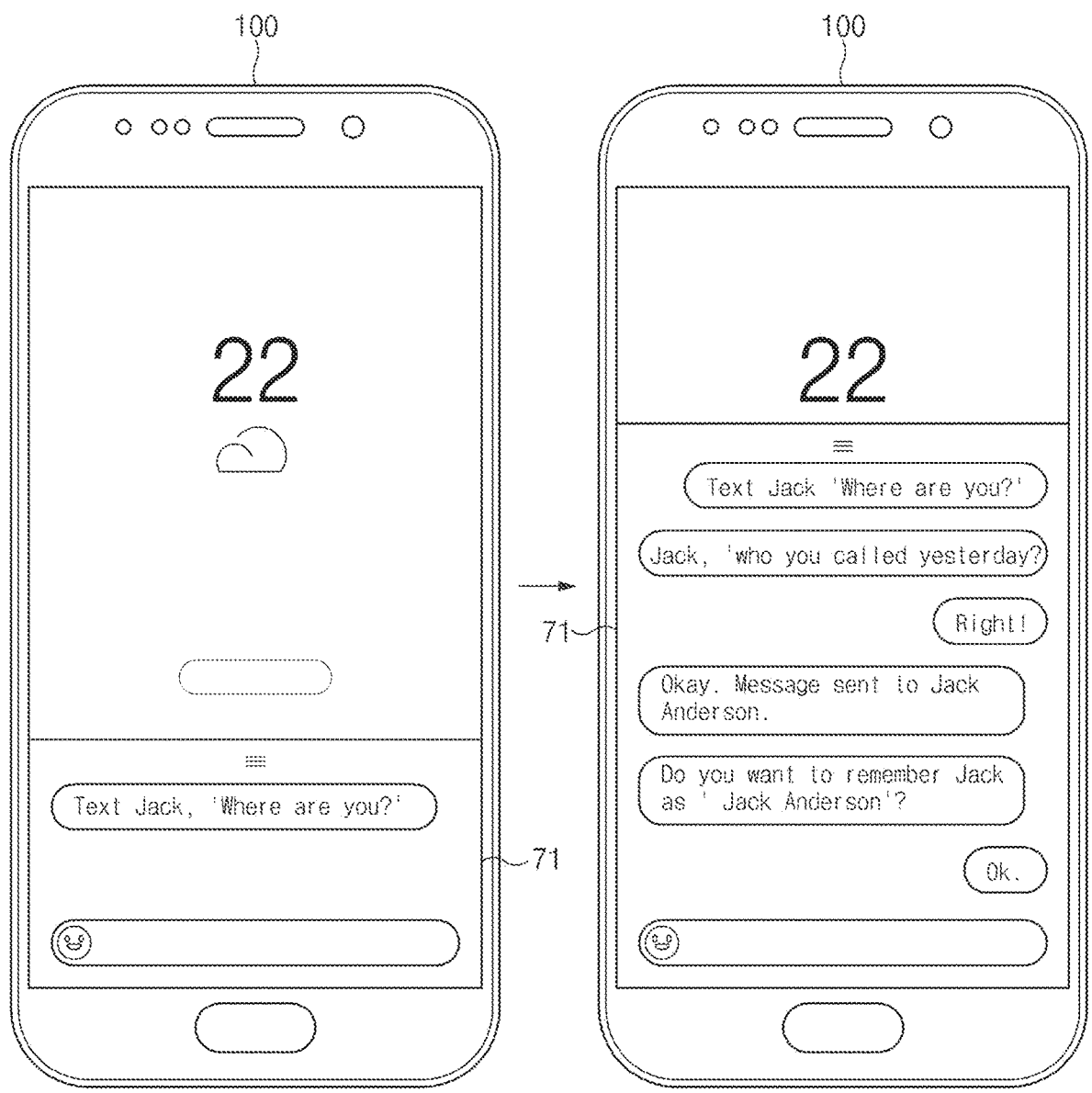
FIG. 6C is a view illustrating another embodiment to train an artificial intelligence assistant, according to an embodiment of the disclosure.

FIGS. 6B and 6C are views illustrating various embodiments to train an artificial intelligence assistant, according to various embodiments of the disclosure.

In an embodiment, the intelligence agent 151 of FIG. 1B of the user terminal 100 of FIG. 1B may calculate the experience point of the artificial intelligence assistant based on user information in the database established in the personal information server 300 of FIG. 1A or the verification of usage information of the user terminal.

In this regard, referring to FIG. 6A, in operation 601, the artificial intelligence assistant activated depending on the execution of an intelligence app may infer information (e.g., name, age, gender, address, occupation, health, anniversary, family, or the like) associated with the user, based on the operation pattern of the user's voice recognition service, the operation history of the user's voice recognition service, context information upon operating the user's voice recognition service, or the like. In an embodiment, the inference may include the verification of the user information or usage information of the user terminal pre-stored in the user terminal or the personal information server or the check of the clarity of the user information or usage information of the user terminal to be stored in the personal information server.

In operation 603, the artificial intelligence assistant may request the user's feedback associated with information to be verified or checked through a query. As such, in operation 605, the user may respond to the authenticity of the queried information. Hereinafter, an example associated with operation 601 to operation 605 will be described with reference to FIGS. 6A and 6B.

Referring to FIG. 6B, the intelligence server may infer information (e.g., the user's current location) about the user based on information (e.g., user information (e.g., name, age, gender, address, occupation, health, anniversary, family, or the like) or user terminal information (e.g., location information, communication information, application operating information, or the like)) provided from the personal information server or the user terminal. The NLG module 250 of FIG. 1D of the intelligence server may generate query information about the inferred information and may transmit the query information to the user terminal. As such, an eighth interface 69 including the query (e.g., Are you home now?) by the artificial intelligence assistant may be output to the user terminal. The user performs feedback speech (e.g., Yes, This place is my home) as the response to the query, and the artificial intelligence assistant may perform a query (e.g., Maetan-dong, Yeongtong-gu, Suwon-si, Korea Right?) associated with the verification of user information (e.g., address) provided from the personal information server. In the case where the user information is verified by the user response (e.g., Right), the intelligence server may confirm user information provided from the personal information server or the user terminal.

FIG. 6C is a view illustrating another example associated with operation 601 to operation 605. And an example described in FIG. 6C may include the verification or check process similar to the above-described that in FIG. 6B. For example, as illustrated in a ninth interface 71, in the case where the user performs speech (e.g., Text Jack, Where are you?) including a specific command or intent, the intelligence server may verify or check user preference information (e.g., the user preference associated with persons, which have the same name, stored in the user terminal) associated with the user speech, based on user terminal information (e.g., application operating information, call information, communication information, or the like) provided from the personal information server. In this regard, the query (e.g., Jack, who you called yesterday?) of the artificial intelligence assistant associated with the verification or check may be displayed on the ninth interface 71. The artificial intelligence assistant may perform verification or check query (e.g., Do you want to remember Jack as Jack Anderson?) associated with information (e.g., message recipient (Jack)) about the user speech, based on the user's feedback speech (e.g., Right) associated with the query. In the case where the user performs feedback speech (e.g., Ok) on the verification or check query, the intelligence server may confirm user preference information provided from the personal information server or the user terminal.

Returning to FIG. 6A, in operation 607, in the case where the query information of the artificial intelligence assistant is verified or checked depending on the user's response, the intelligence agent may assign the point Pts of a specified value to the personal information server based on the interaction between the artificial intelligence assistant and the user with respect to the verification or check process.

Operation 609 may be the same as or correspond to operation 411 described through FIG. 4A.

FIGS. 7A to 7D are views illustrating various embodiments to calculate an experience point of an artificial intelligence assistant based on execution of user activity, according to an embodiment of the disclosure.

In an embodiment, the intelligence agent 151 of FIG. 1B of the user terminal 100 of FIG. 1B may calculate the experience point of the artificial intelligence assistant based on a user's activity performed on a user terminal or an intelligence app.

Figure 7A:
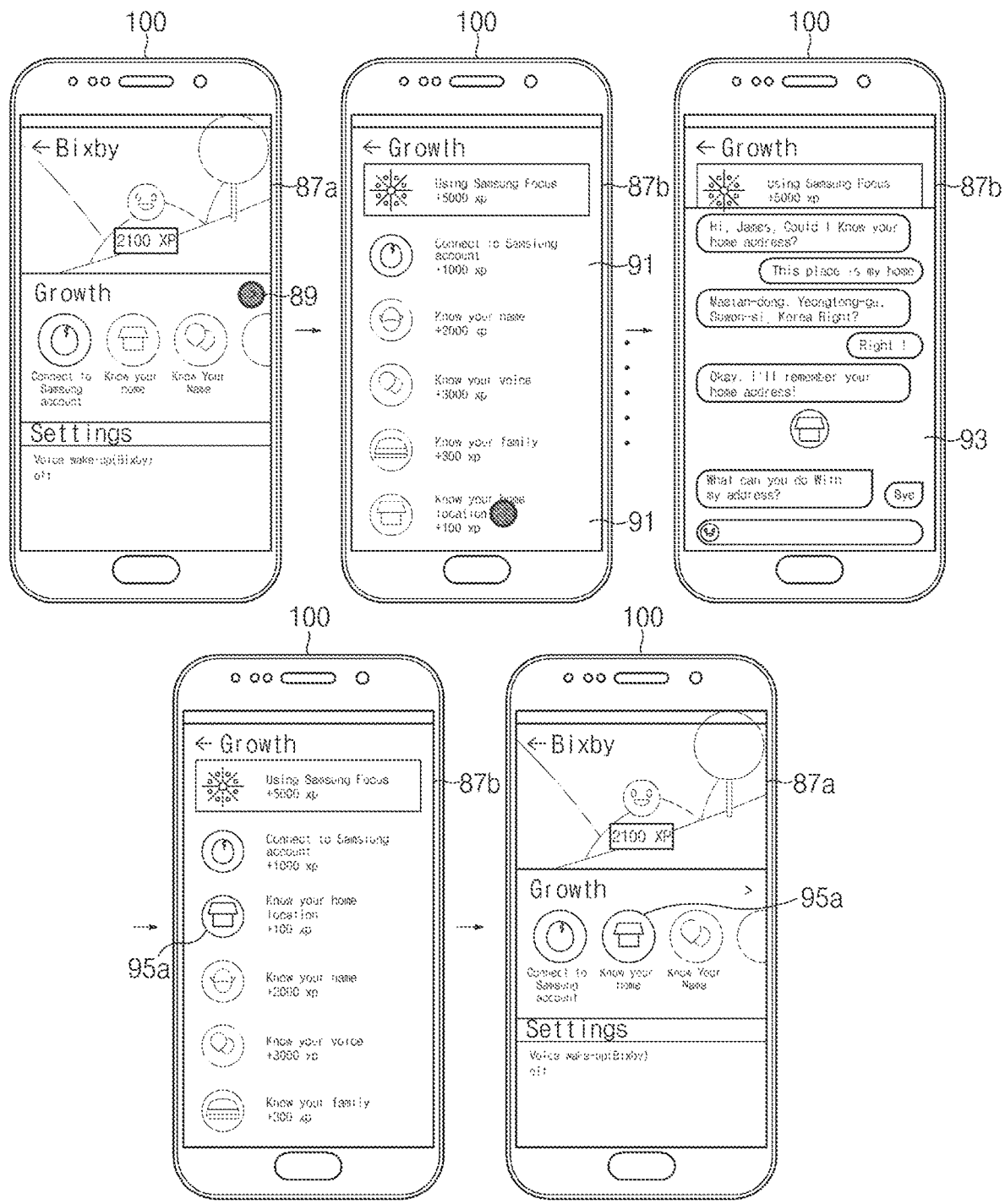
FIG. 7A is a view illustrating an eighth embodiment to calculate an experience point of an artificial intelligence assistant based on execution of user activity, according to an embodiment of the disclosure.

In this regard, referring to FIG. 7A, the user may apply a touch input 89 to a tenth interface 87a associated with the execution screen of the intelligence app, for example, the training or experience category (or menu) of the artificial intelligence assistant. In this case, the tenth interface 87a may be switched to an eleventh interface 87b including at least one activity information 91 that trains or grows the artificial intelligence assistant. The user may select an activity (e.g., user address information providing activity) to interact with the artificial intelligence assistant. For example, the user may perform interaction (e.g., query and response), which is associated with the corresponding activity, with the artificial intelligence assistant on a dialogue interface 93 output in response to the selection of the activity. In an embodiment, in the case where the activity selected from the user is completed, an icon 95a of the completed activity may be displayed (e.g., color display or flash blink) as a specified display on the tenth interface 87a and the eleventh interface 87b. In this case, with regard to the execution of the corresponding activity, the intelligence agent may assign a point of a pre-specified value as a user activity point and may calculate the experience point of the artificial intelligence assistant by summing the point of a pre-specified value and any other point (e.g., the point of the ASR module 210 of FIG. 1D, the point of the NLU module 220 of FIG. 1D, the point of the personal information server 300 of FIG. 1A, or the like).

Figure 7B:
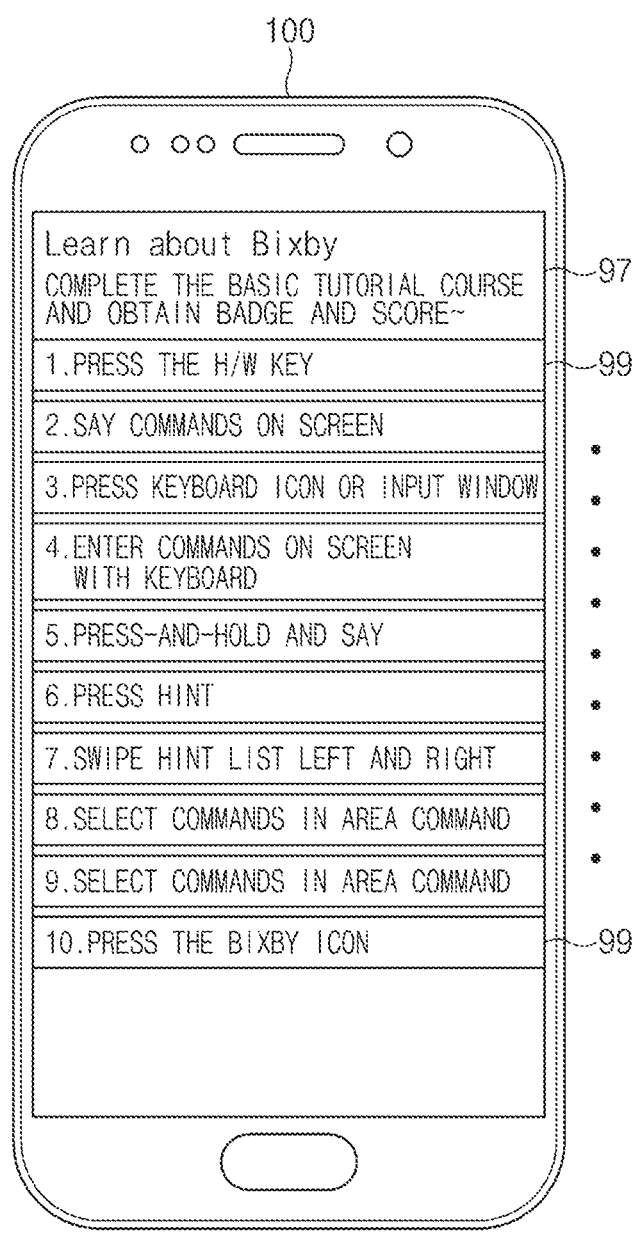
FIG. 7B is a view illustrating a ninth embodiment to calculate an experience point of an artificial intelligence assistant based on execution of user activity, according to an embodiment of the disclosure.

Alternatively, referring to FIG. 7B, at least one usage guide information 99 associated with the operation of the speech recognition service or the intelligence app may be displayed on a twelfth interface 97 associated with the execution screen of the intelligence app, as another example of the training or experience of the artificial intelligence assistant. The user may select any usage guide of the usage guide information 99 to perform the corresponding activity. In this case, the intelligence agent may assign the point of a pre-specified value to each usage guide information 99 as a user activity point.

Figure 7C:
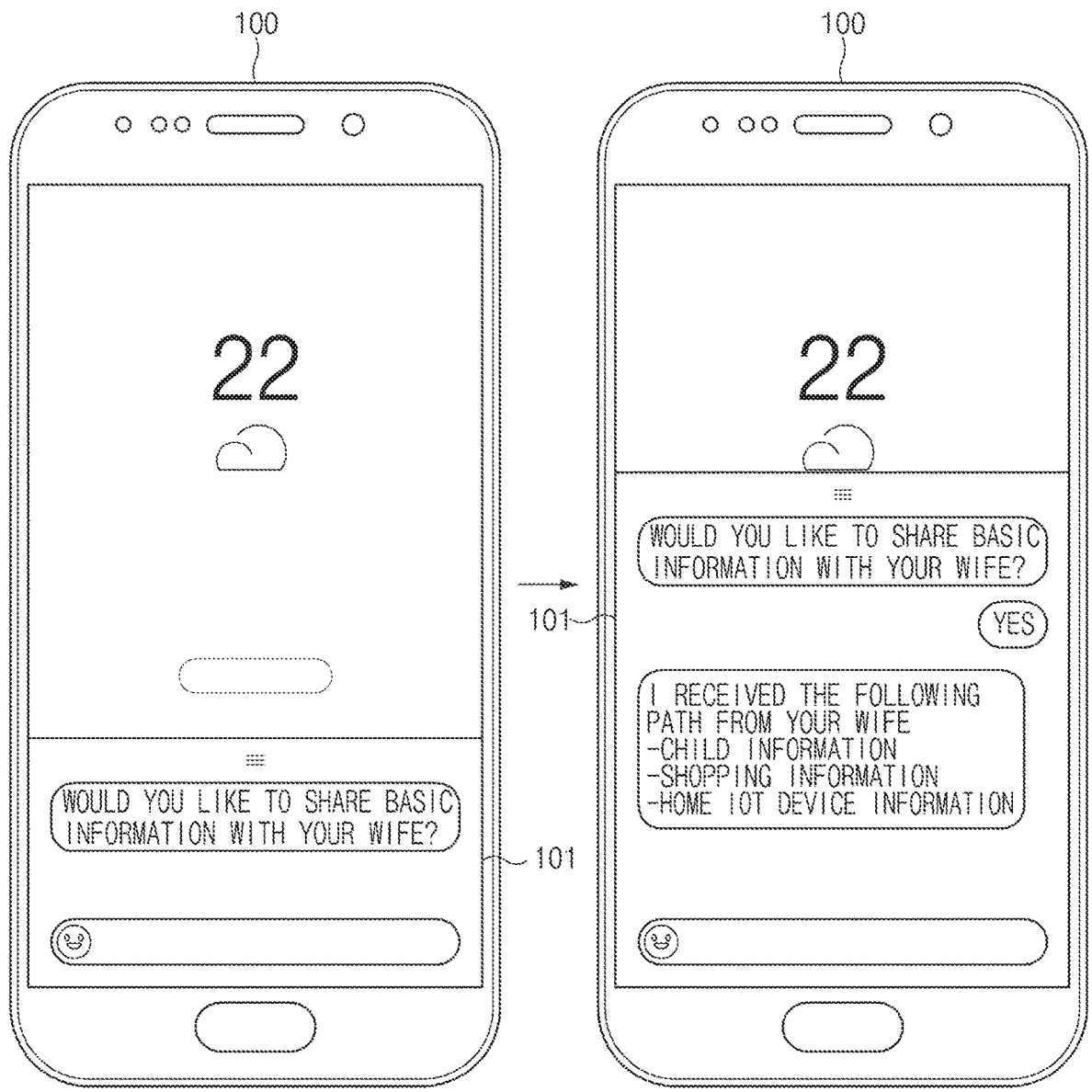
FIG. 7C is a view illustrating a tenth embodiment to calculate an experience point of an artificial intelligence assistant based on execution of user activity, according to an embodiment of the disclosure.

Referring to FIG. 7C, in an embodiment, the user may share information with acquaintances, such as family members, friends, or the like based on the operation of the speech recognition service. In this regard, the intelligence server 200 of FIG. 1D may identify the acquaintances associated with the user based on user information (e.g., family information or the like) and usage information (e.g., application (contacts) information, social media service account information, or the like) of the user terminal, which are provided from the user terminal or the personal information server. Alternatively, the acquaintance may be pre-assigned by the user control or recommended by the user. In an embodiment, in an operation of interacting with the user through a dialogue interface 101, in the case where there is no information accompanying the processing of the user's speech, the artificial intelligence assistant may query whether information share is requested from the identified acquaintance. The generation of the query may be implemented by the function execution of the NLG module 250 of FIG. 1D of an intelligence server. Alternatively, as in that described above, the artificial intelligence assistant may query whether information is provided to the acquaintance. In the case where the information is shared from the user terminal to an external device (e.g., a terminal owned by the acquaintance) or in the case where the information is shared from the external device to the user terminal, the intelligence agent may assign the specified point as a user activity point.

Figure 7D:
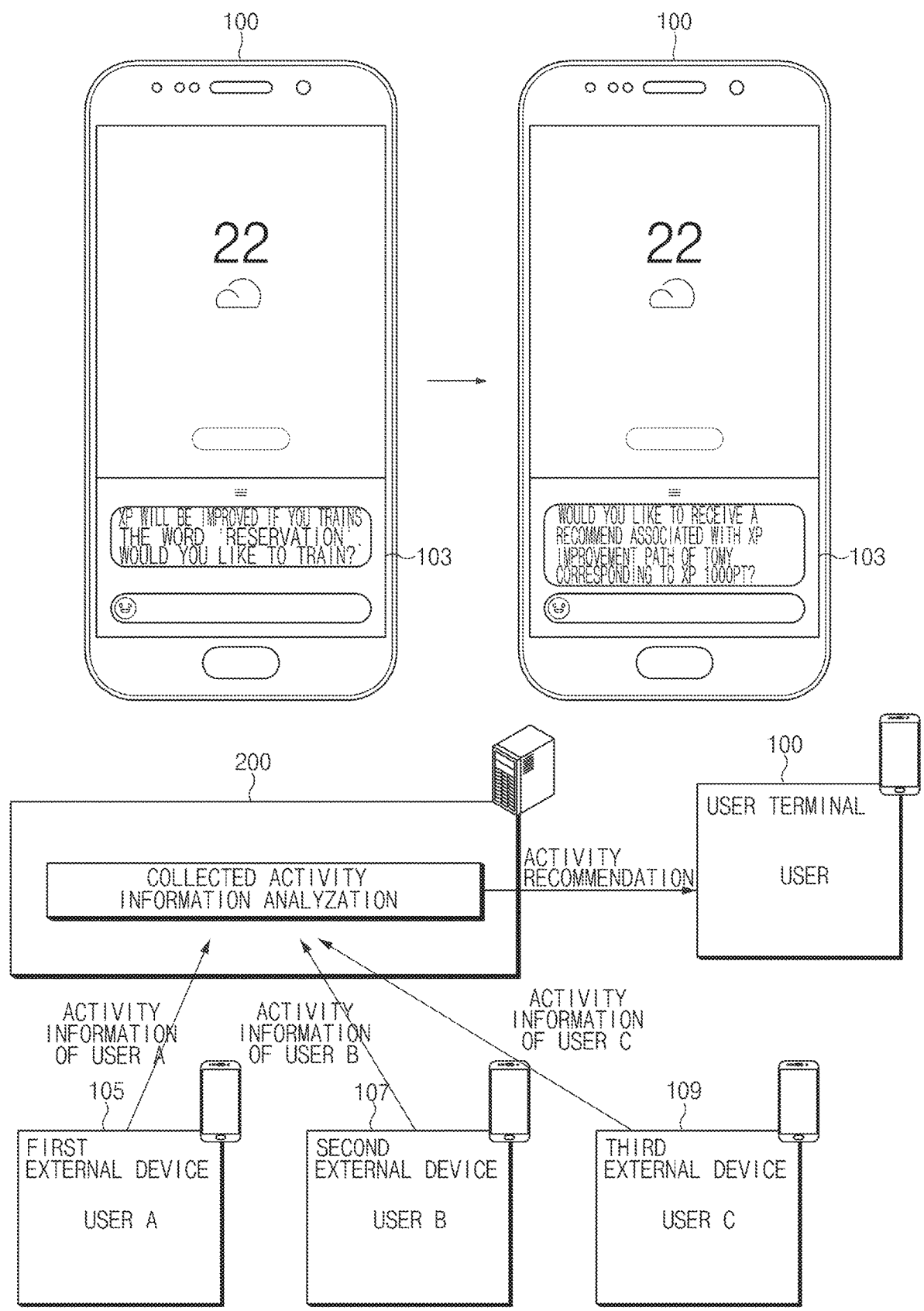
FIG. 7D is a view illustrating an eleventh embodiment to calculate an experience point of an artificial intelligence assistant based on execution of user activity, according to an embodiment of the disclosure.

Referring to FIG. 7D, in an embodiment, the intelligence server 200 may collect pieces of activity information performed by the corresponding external device, from at least one external device 105, 107 or 109 (e.g., a terminal owned by the acquaintance associated with the user) and may analyze the activity information to identify an activity to which a high point is assigned, or an activity that is not performed on the user terminal 100. In this regard, the artificial intelligence assistant may perform a query, which recommends or suggests the execution of an activity of a high point that the acquaintance performs or an activity that the user does not perform, to the user based on a dialogue interface 103. In the case where the recommendation or suggestion is accepted by the user's feedback speech, the intelligence agent may assign the specified point as a user activity point.

FIGS. 8A to 8G are views illustrating various embodiments to use an experience point of an artificial intelligence assistant, according to an embodiment of the disclosure.

Figure 8A:
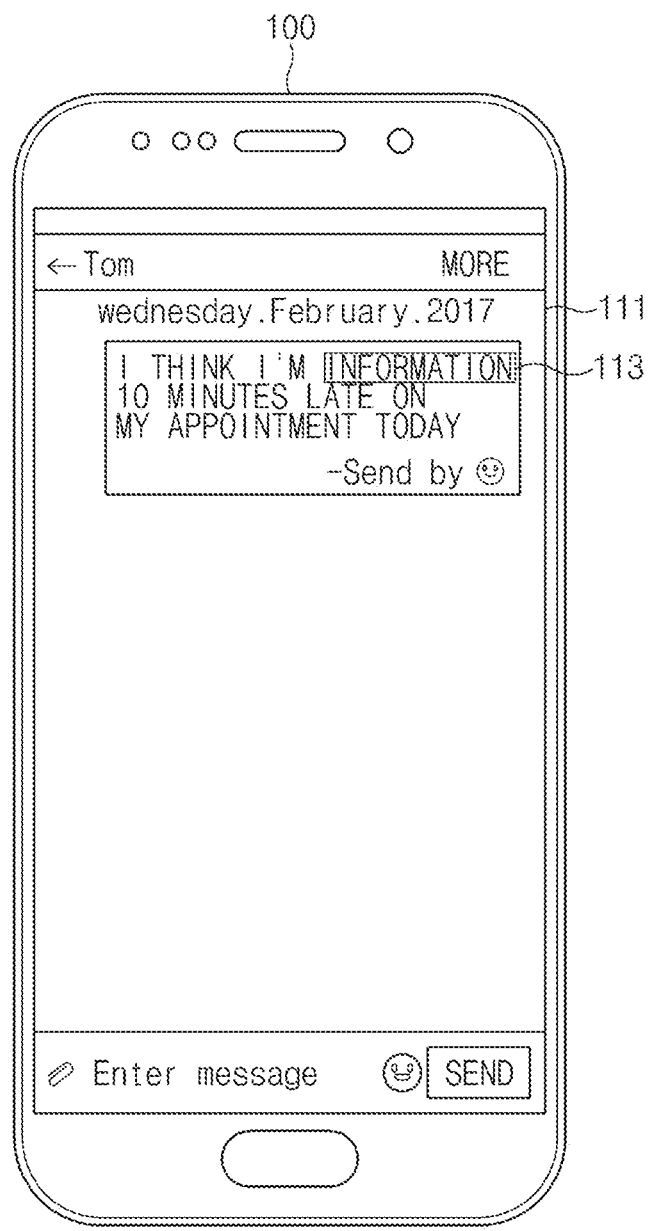
FIG. 8A is a view illustrating a first embodiment to use an experience point of an artificial intelligence assistant, according to an embodiment of the disclosure.

Referring to FIG. 8A, the user terminal 100 may receive a message according to the speech of the external device user, from an external device (e.g., a terminal operating a speech recognition service or an intelligence app). As such, a message application may be executed on the user terminal 100, and the message information transmitted by the external device may be displayed on an execution screen 111 of the message application. At this time, information about the transmission means (or path) of the message may be included in the message information. For example, when the message is transmitted based on the operation of a speech recognition service (or the operation of an intelligence app) of a user of the external device, information (e.g., the experience point of the artificial intelligence assistant, the icon of the artificial intelligence assistant, the level information of the artificial intelligence assistant, the visual graph associated with the experience point of the artificial intelligence assistant, or the like) about the artificial intelligence assistant of the external device may be included in a message information displayed on the execution screen 111. As such, the user of the user terminal 100 may determine the degree of trust in the received message. For example, the user of the user terminal 100 may estimate the accuracy of speech recognition performed by the external device based on the experience point of the artificial intelligence assistant of the external device included in the message information to estimate a typo error 113 (e.g., in the case where a user of the external device utters "about" but the external device recognizes "about" as "information" because speech recognition is performed unclearly, and thus a message including a typo is transmitted to the user terminal 100) in the message information or information that is not capable of being recognized. In an embodiment, in the case where information about the artificial intelligence assistant in the message is selected (or touched), detailed information (e.g., trust percentage information or error probability information of speech recognition) about the artificial intelligence assistant may be displayed.

Figure 8B:
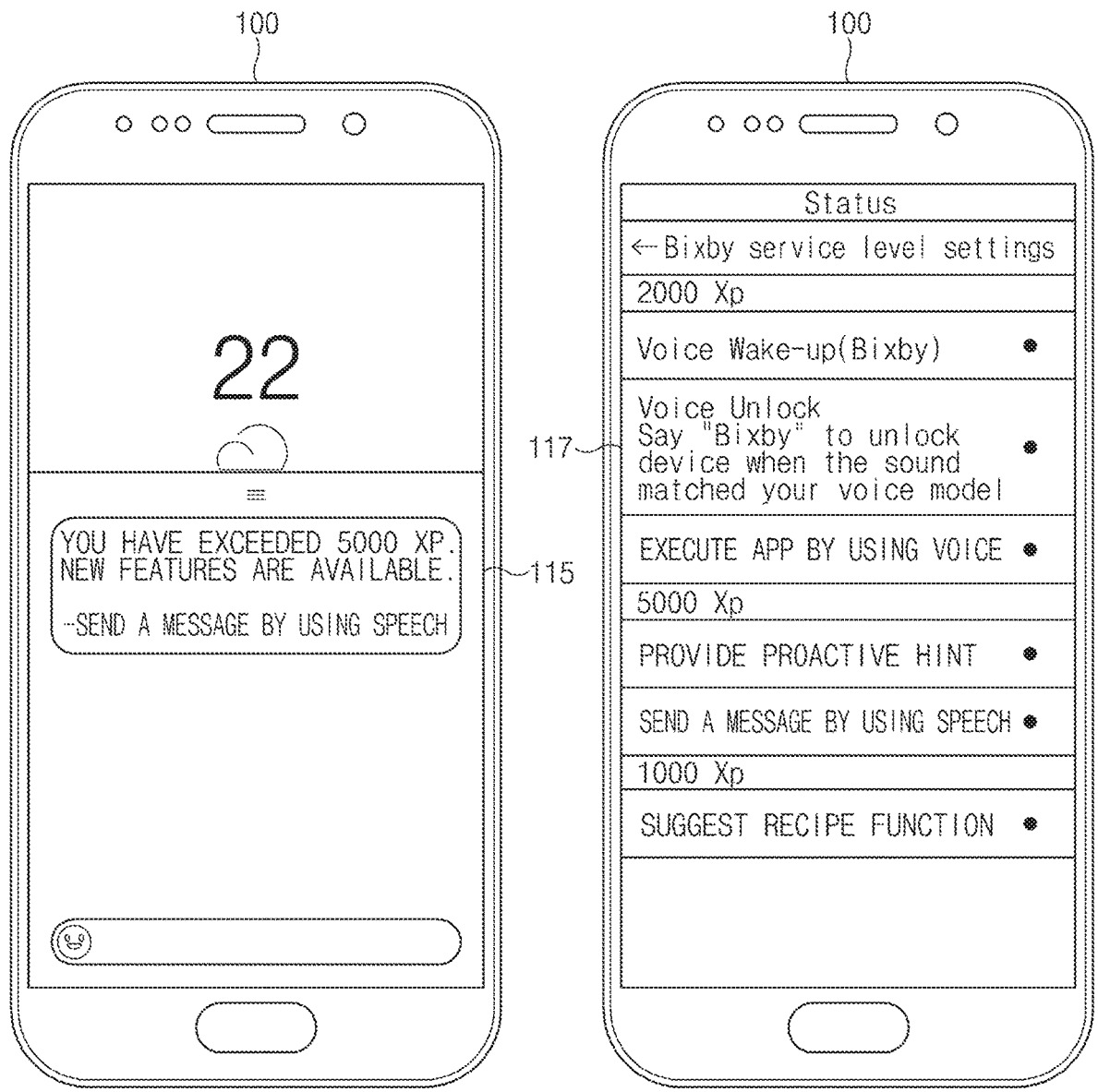
FIG. 8B is a view illustrating a second embodiment to use an experience point of an artificial intelligence assistant, according to an embodiment of the disclosure.

Referring to FIG. 8B, the intelligence server 200 of FIG. 1D may stepwisely support the function of the speech recognition service to the user terminal 100, based on the experience point of the artificial intelligence assistant on the user terminal 100. In this regard, it is understood that in the case of the slight experience point of the artificial intelligence assistant, the function execution of the element (e.g., the ASR module 210 of FIG. 1D, the NLU module 220 of FIG. 1D, or the like) of the intelligence server 200 is not clear or the update of a model associated with the element is not complete. In this case, the speech recognition associated with the user's speech input or an operation of generating a path rule may be performed unclearly or an error may occur during the performance. As such, the intelligence server 200 may provide a stepwise service function depending on the experience point of the artificial intelligence assistant of the user terminal 100. In the case where the experience point of the artificial intelligence assistant on the user terminal 100 exceeds a specified critical value, the intelligence server 200 may refine the function support of the speech recognition service corresponding to the corresponding critical value with respect to the user terminal 100. The NLG module 250 of the intelligence server 200 may allow the artificial intelligence assistant to provide information about the refined function (e.g., a function to send a message by using speech) through a dialogue interface 115. Alternatively, the intelligence server 200 may refine the service function support associated with the function execution of the element corresponding to a high point, with reference to a plurality of points (e.g., the point of the ASR module 210 of FIG. 1D, the point of the NLU module 220 of FIG. 1D, the point of the personal information server 300 of FIG. 1A, and the like) contributing to the calculation of the experience point of the artificial intelligence assistant. In an embodiment, in the case where a touch input is applied to the dialogue interface 115 (or in the case where a touch input is applied to an area of information about the refined function), a thirteenth interface 117 in which the service function provided to the specific experience point (or of which the support is refined) is listed may be output. In various embodiments, the user may release the operating restriction with respect to specific functions on the thirteenth interface 117 regardless of the degree of the current experience point of the artificial intelligence assistant and may request the intelligence server 200 to support the released service function.

Figure 8C:
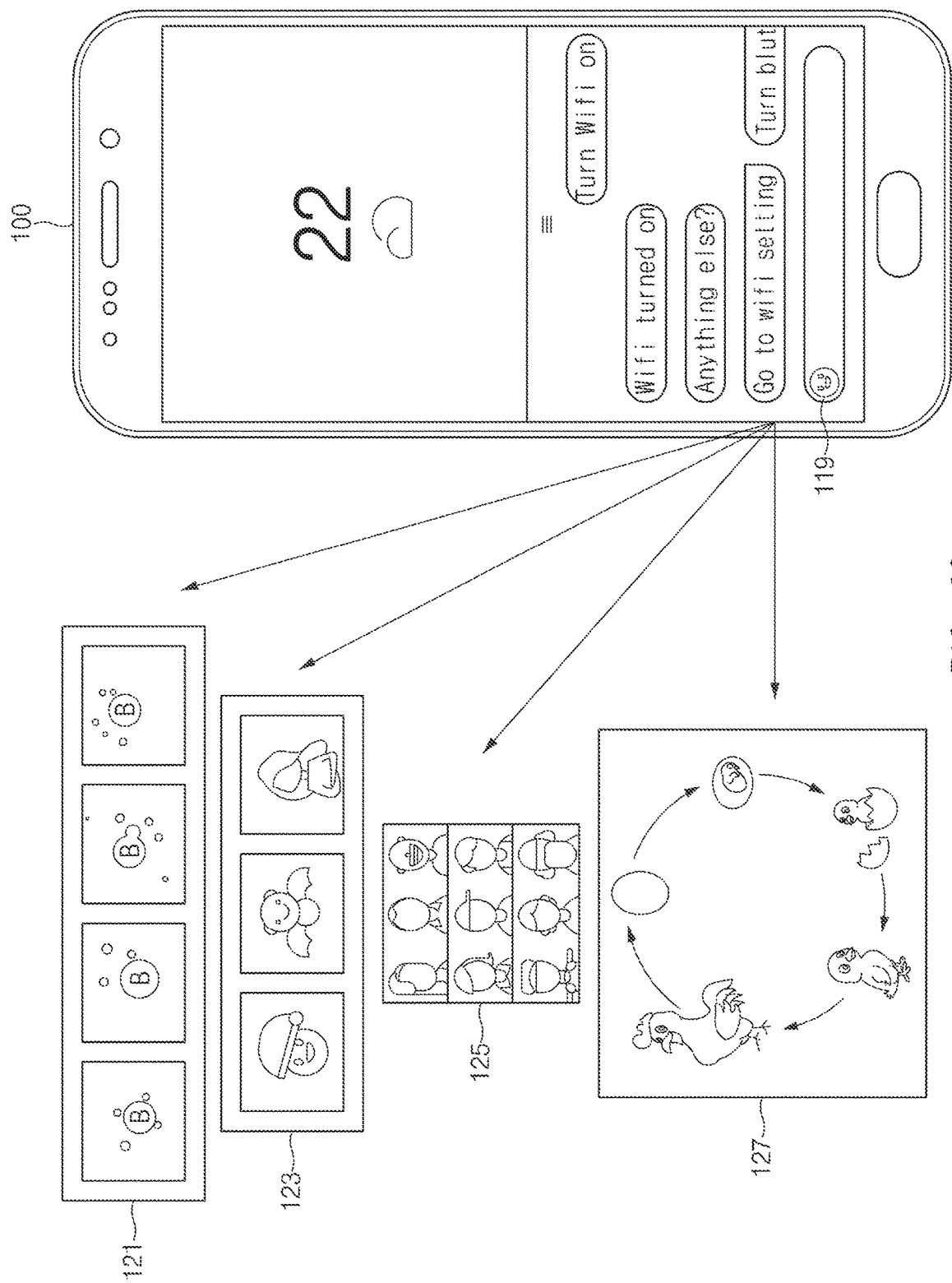
FIG. 8C is a view illustrating a third embodiment to use an experience point of an artificial intelligence assistant, according to an embodiment of the disclosure.

Referring to FIG. 8C, the intelligence server 200 may support, for example, the update of an icon 119 of the artificial intelligence assistant displayed on a dialogue interface, based on the experience point the artificial intelligence assistant of the user terminal 100. For example, the intelligence server 200 may provide icons 121 and 123 of various themes or may provide an icon 125 of various races or characters, depending on the experience point. Alternatively, the intelligence server 200 may support an icon 127 of a scenario in which an animal, character, person, or the like grows in response to the rise of the experience point.

Figure 8D:
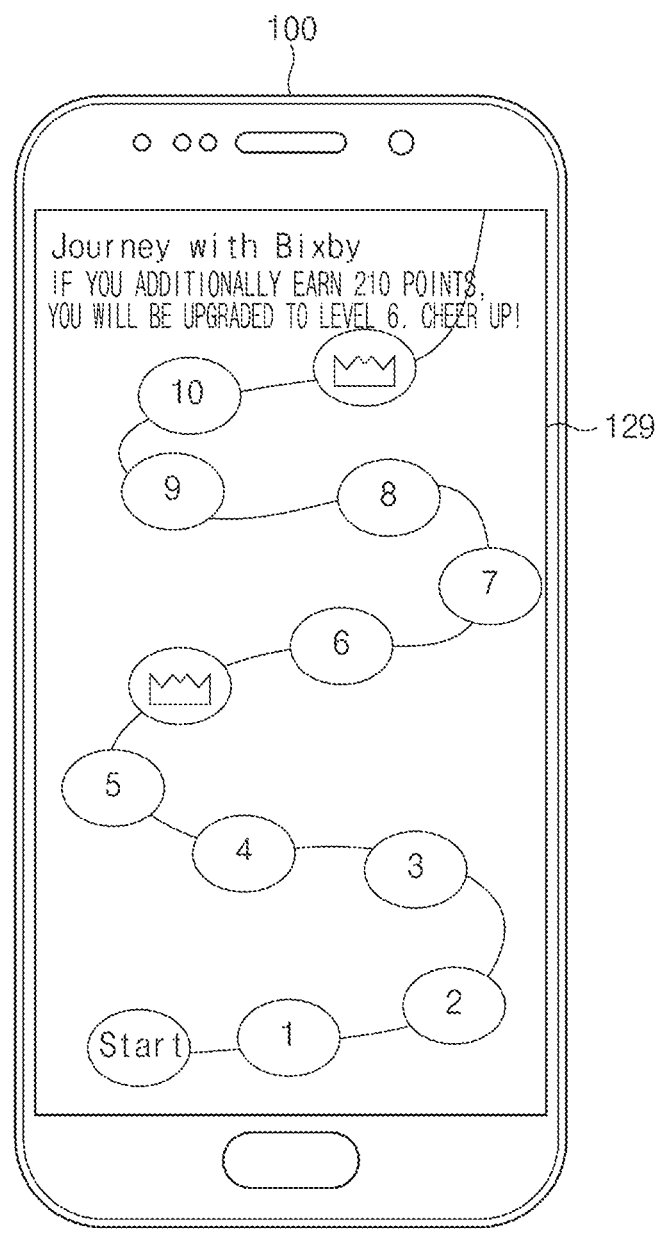
FIG. 8D is a view illustrating a fourth embodiment to use an experience point of an artificial intelligence assistant, according to an embodiment of the disclosure.

Referring to FIG. 8D, level information corresponding to the experience point of the artificial intelligence assistant may be displayed on a fourteenth interface 129 associated with the execution screen of an intelligence app. In an embodiment, in the case where the experience point reaches the specific level, coupons, merchandise, vouchers, or the like provided from an external device (e.g., shopping mall server, grocery server, application market server, or the like) associated with or in cooperation with the integrated intelligent system 10 of FIG. 1A may be provided (e.g., delivered or downloaded).

Figure 8E:
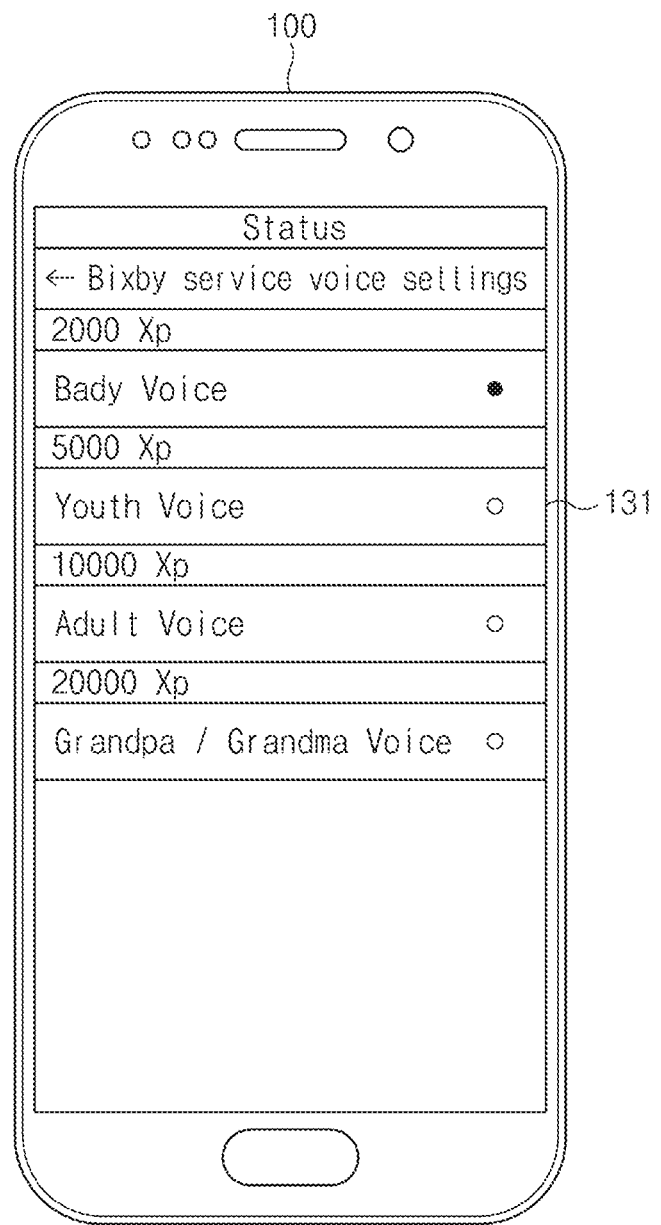
FIG. 8E is a view illustrating a fifth embodiment to use an experience point of an artificial intelligence assistant, according to an embodiment of the disclosure.

Referring to FIG. 8E, the user may set a voice corresponding to the experience point of the artificial intelligence assistant on the user terminal 100, on the fifteenth interface 131 associated with the intelligence app. It is understood that the voice is the acoustic characteristic associated with the response (e.g., accent, tone, speech speed, or the like) in the case where the response of the artificial intelligence assistant is output through the speaker 130 of FIG. 1B on the user terminal 100. In this regard, voice information corresponding to a specific experience point may be displayed on the fifteenth interface 131. For example, a voice list to be grown depending on the rise of the experience point may be displayed on the fifteenth interface 131, and the user may select and activate a voice corresponding to the experience point of the artificial intelligence assistant calculated as needed. In various embodiments, in an operation of selecting a voice, the user may allow the voice to be selectively applied to only words that frequently appear or are expressed during the response of the artificial intelligence assistant.

Figure 8F:
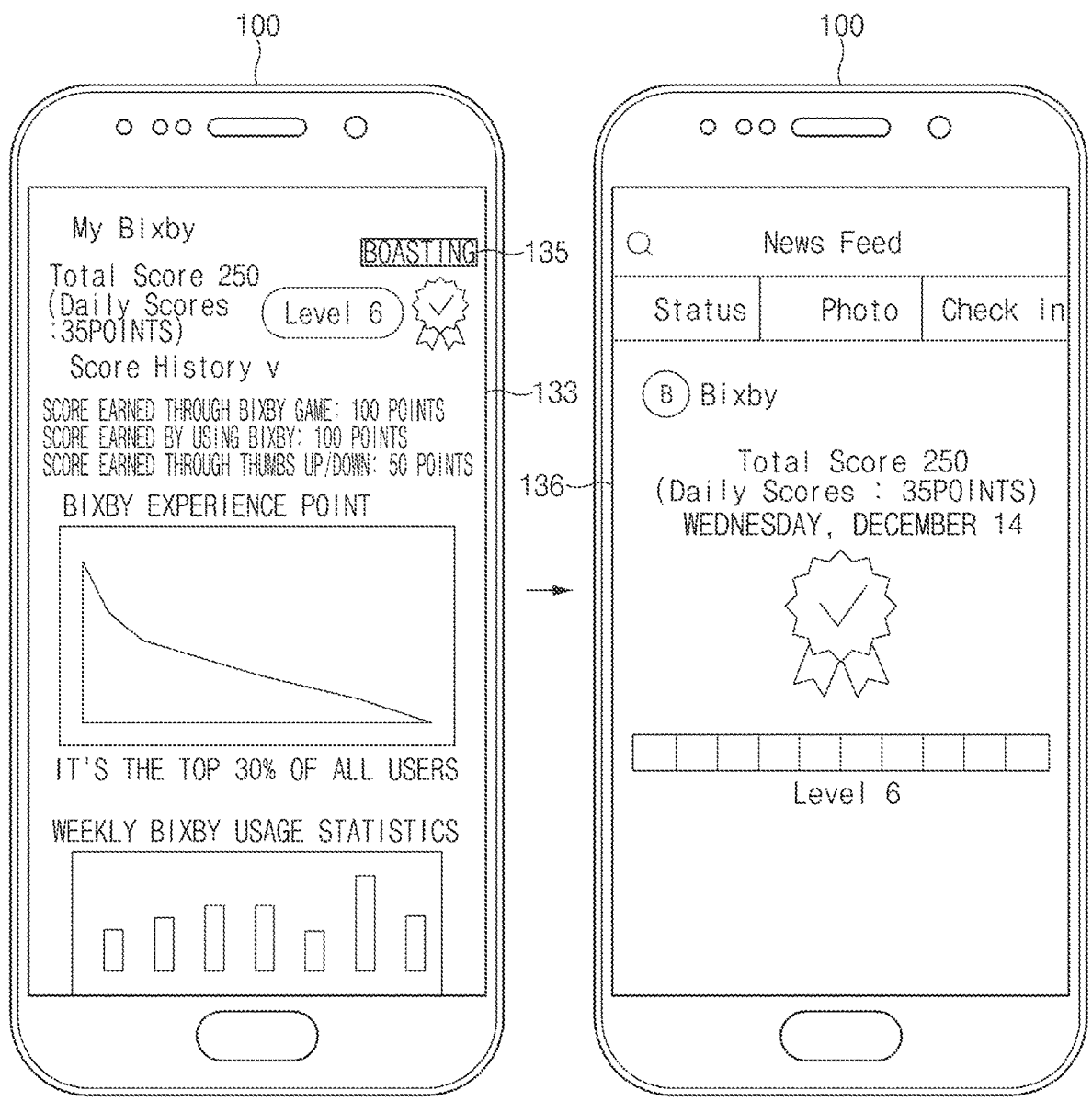
FIG. 8F is a view illustrating a sixth embodiment to use an experience point of an artificial intelligence assistant, according to an embodiment of the disclosure.

Referring to FIG. 8F, information (e.g., an experience point value, a path where the experience point is obtained, statistical information about the experience point, or the like) about the experience point of the artificial intelligence assistant may be displayed on a sixteenth interface 133 associated with the execution screen of an intelligence app. In an embodiment, the sixteenth interface 133 may include an object 135 (e.g., boasting) that is capable of transmitting or sharing the above-described information onto a social media service installed in the user terminal 100. In the case where the user's touch input is applied to the object 135, at least one experience point information included in the sixteenth interface may be updated in a user feed 136 on the social media service.

Figure 8G:
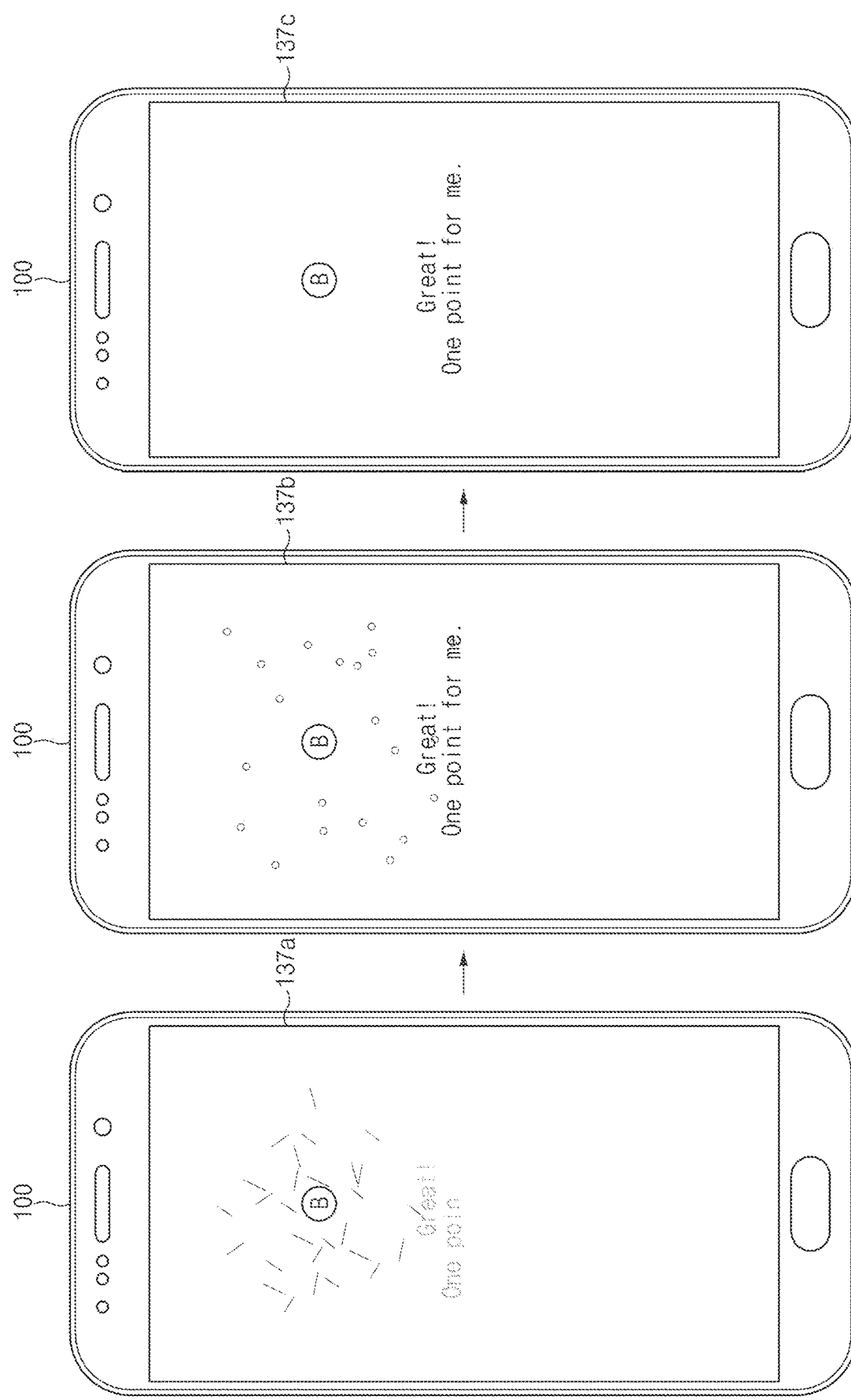
FIG. 8G is a view illustrating a seventh embodiment to use an experience point of an artificial intelligence assistant, according to an embodiment of the disclosure.

Referring to FIG. 8G, in the case where the experience point of the artificial intelligence assistant on the user terminal 100 exceeds a specified value, the intelligence server 200 of FIG. 1D may provide visual effect associated with the artificial intelligence assistant. For example, in the case where the intelligence app is executed or in the case where the artificial intelligence assistant is activated, the intelligence server 200 may provide the icon of the artificial intelligence assistant with visual effect on a home screen or a lock screen of the user terminal 100. In this regard, in the case where user manipulation is applied to a hardware key 112 of FIG. 1C on the user terminal 100 in the sleep state of the user terminal 100 or in the case where the user performs specified wakeup command speech, the icon of the artificial intelligence assistant and a particle object of a specified shape may be displayed on a first lock screen 137a of the user terminal 100. Afterwards, as specified time goes on, the particle object may flow and form gradually a specified text as illustrated in a second lock screen 137b. If the flow of the particle object is completed, a text indicating specific information may be displayed on the third lock screen 137c.

Figure 9A:
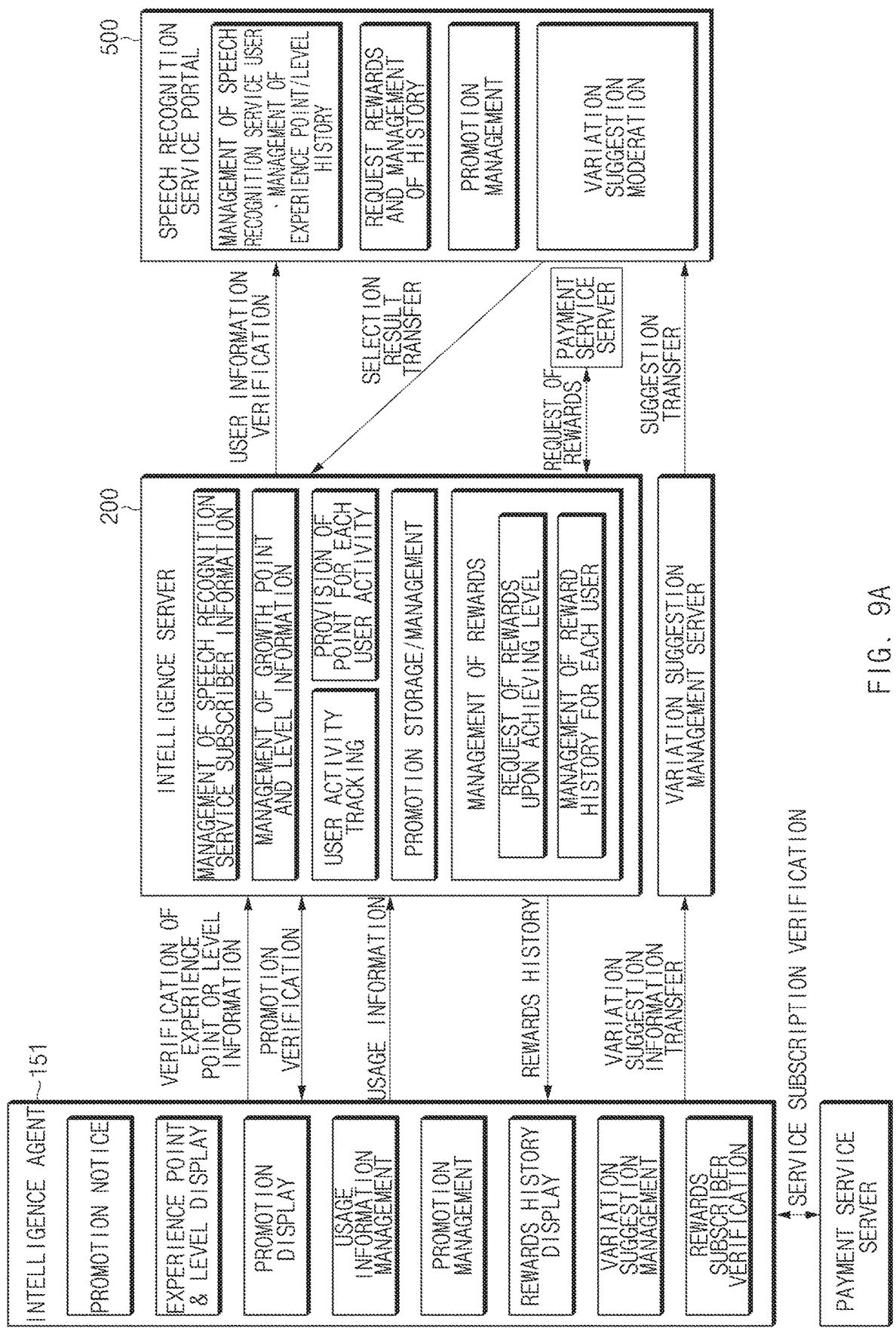
FIG. 9A is a block diagram illustrating an architecture associated with some elements in an integrated intelligent system, according to an embodiment of the disclosure.

FIG. 9A is a block diagram illustrating an architecture associated with some elements in an integrated intelligent system, according to an embodiment of the disclosure. FIGS. 9B through 9K are views illustrating various processes associated with some elements of an architecture and an interface of a relevant user terminal, according to various embodiments of the disclosure.

Referring to FIGS. 9A through 9K, additional various embodiments in addition to the above-described various embodiments will be described with regard to the calculation of the experience point of an artificial intelligence assistant. In addition, the function execution of elements implementing the additional various embodiments and relevant screen interfaces will be described. In various embodiments, it is understood that an intelligence server described below is the above-described intelligence server 200 of FIG. 1D or a server (e.g., level information management server) implemented separately for the purpose of managing the experience point or the level information of the artificial intelligence assistant. For convenience of description, hereinafter, the intelligence server may be referred to as the above-described "intelligence server 200" of FIG. 1D.

Figure 9B:
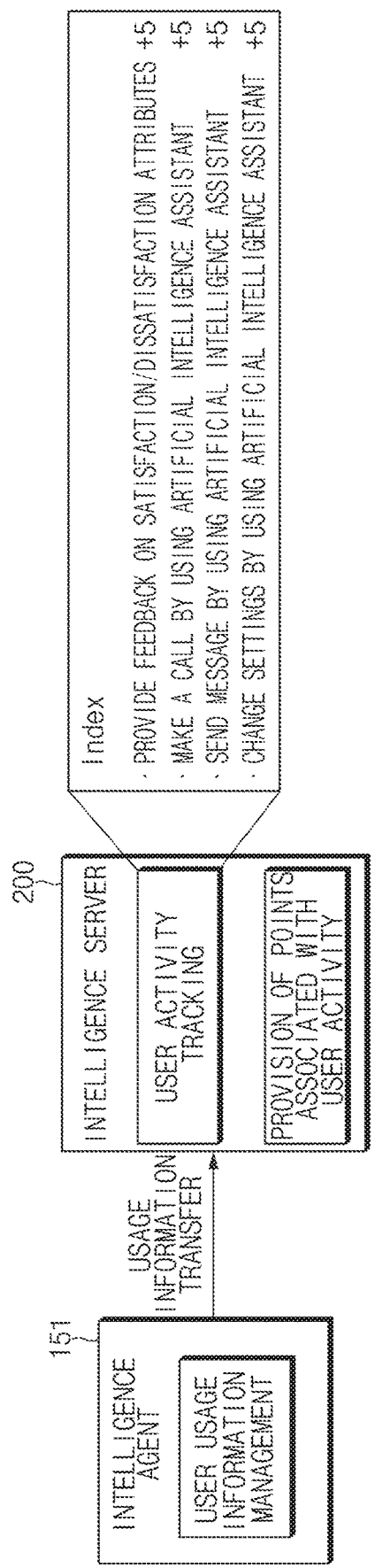
FIG. 9B is a view illustrating a first process between some elements in an integrated intelligent system associated with an architecture, according to an embodiment of the disclosure.
Figure 9C:
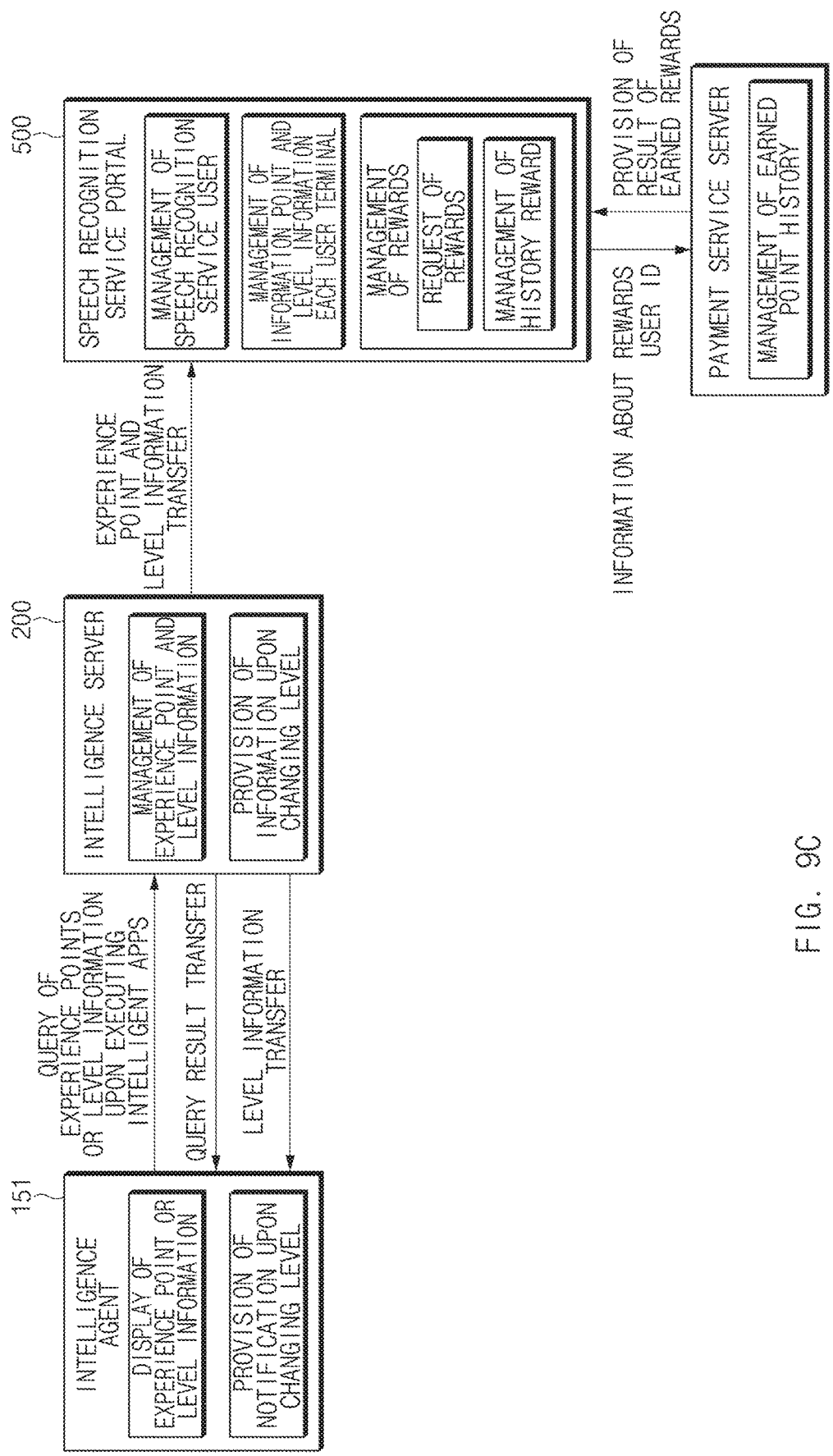
FIG. 9C is a view illustrating a second process between some elements in an integrated intelligent system associated with an architecture, according to an embodiment of the disclosure.

Referring to FIGS. 9A and 9B, in association with the operation of speech recognition service of the user, the intelligence agent 151 may manage the specific activity of the user as usage information and may receive a point used to calculate the experience point of the artificial intelligence assistant, from the intelligence server 200 based on the usage information. The specific activity may include feedback provision of the user's satisfaction or dissatisfaction attribute with respect to the response of the artificial intelligence assistant provided depending on user speech. Alternatively, the specific activity may include function operation control (e.g., dialing, sending a message, changing system settings of an intelligence app, or the like) associated with at least one app mounted or installed in the user terminal 100 of FIG. 1B by using the artificial intelligence assistant. According to an embodiment, the function operation control associated with the app may accompany the execution or processing of a path rule provided from the intelligence server 200 to the user terminal 100 depending on the user speech. In other words, the specific activity may include a series of processes in which the user terminal 100 receives a path rule corresponding to the user speech to perform or process the path rule depending on user speech (e.g., please make a call, please send a message, please change settings, or the like) including a specific intent or command. At this time, the intelligence agent 151 may manage information (e.g., path rule ID) about the path rule received in response to the execution of specific activity of the user. In the case where the above-described specific activity of the user occurs, the intelligence agent 151 may transmit usage information to the intelligence server 200.

In an embodiment, the intelligence server 200 may establish the predetermined point assignment value as an index with respect to each specific activity. In the case where the intelligence server 200 receives the usage information from the intelligence agent 151, the intelligence server 200 may track the activity corresponding to the usage information on the index to identify the corresponding point assignment value. The intelligence server 200 may transmit information about the identified point assignment value to the intelligence agent 151, and the intelligence agent 151 may refer to the received information to calculate the experience point of the artificial intelligence assistant. Alternatively, in various embodiments, the intelligence server 200 may receive level information from the intelligence agent 151 and may apply the point assignment value to the level information to transmit the refined level information to the intelligence agent 151.

As described above, the calculation of the experience point of the artificial intelligence assistant may be performed by a scoring manager module included in the intelligence server 200. In this regard, referring to FIGS. 9A and 9C, the intelligence server 200 may manage speech recognition service subscription information of the user and may map and manage the subscribed user information to the experience point of the artificial intelligence assistant or level information corresponding to the experience point. In an embodiment, in association with the experience point or level information of the artificial intelligence assistant to be displayed on the screen interface of an intelligence app, in the case where the intelligence app is executed, the intelligence agent 151 may make a request for the updated experience point or level information to the intelligence server 200. The intelligence server 200 may transmit, to the intelligence agent 151, the updated experience point or level information as the response to the request, and the intelligence agent 151 may display the received experience point or level information on the screen interface.

In an embodiment, the intelligence server 200 may update the experience point or level information of the artificial intelligence assistant in real time and may provide information, which is changed depending on the update, to the intelligence agent 151. For example, in the case where the level grade corresponding to the experience point is changed because the experience point of the artificial intelligence assistant increase, the intelligence server 200 may transmit the changed level grade information to the intelligence agent 151. In the case where the existing level information is changed based on the level grade information, the intelligence agent 151 may output a notification (e.g., message, sound effect, or the like) thereof.

According to an embodiment, the intelligence server 200 may transmit the experience point or level information of the artificial intelligence assistant operated by the user terminal 100, to a speech recognition service portal 500 implemented through a separate server. The speech recognition service portal 500 may collectively manage at least one user subscribed in the speech recognition service and may collectively manage the experience point or level information of the artificial intelligence assistant operated by the user terminal of each user. In an embodiment, the intelligence server 200 may request the specific reward or benefits (hereinafter collectively referred to as a "reward") corresponding to the corresponding experience point or level information together with the transmission of the experience point or level information to the speech recognition service portal 500. In this regard, the speech recognition service portal 500 may establish a reward platform with a first external device (e.g., payment service server) associated with the speech recognition service and may transmit, to the first external device, the reward information requested from the intelligence server 200 and user information (e.g., speech recognition service subscription information, user subscription ID, or the like) associated with the reward. In various embodiments, the reward may include the accumulation of a point associated with a service operated by the first external device. The first external device may process (e.g., earn points) reward information received from the speech recognition service portal 500 to transmit the processing result to the speech recognition service portal 500 and may manage information about the processing history. As such, the speech recognition service portal 500 may manage the reward history of the user terminal corresponding to the reward requested by the intelligence server 200, based on the processing result received from the first external device. In various embodiments, the intelligence server 200 may exclude the reward request to the speech recognition service portal 500, may make a request for the reward to the first external device directly, and may receive the sharing of processing information about the reward request from the first external device to manage (e.g., manage the reward history) the processing information. Moreover, the intelligence server 200 may transmit the reward history to the intelligence agent 151; as such, the intelligence agent 151 may output the reward history through the interface 16 of FIG. 2C described through FIG. 2C. The above-described reward request and processing may be based on the assumption that the user associated with the reward subscribes the service operated by the first external device, and in the case where the intelligence agent 151 receives the reward history from the intelligence server 200, the intelligence agent 151 may access the first external device to determine whether the user subscribes the service.

Figure 9D:
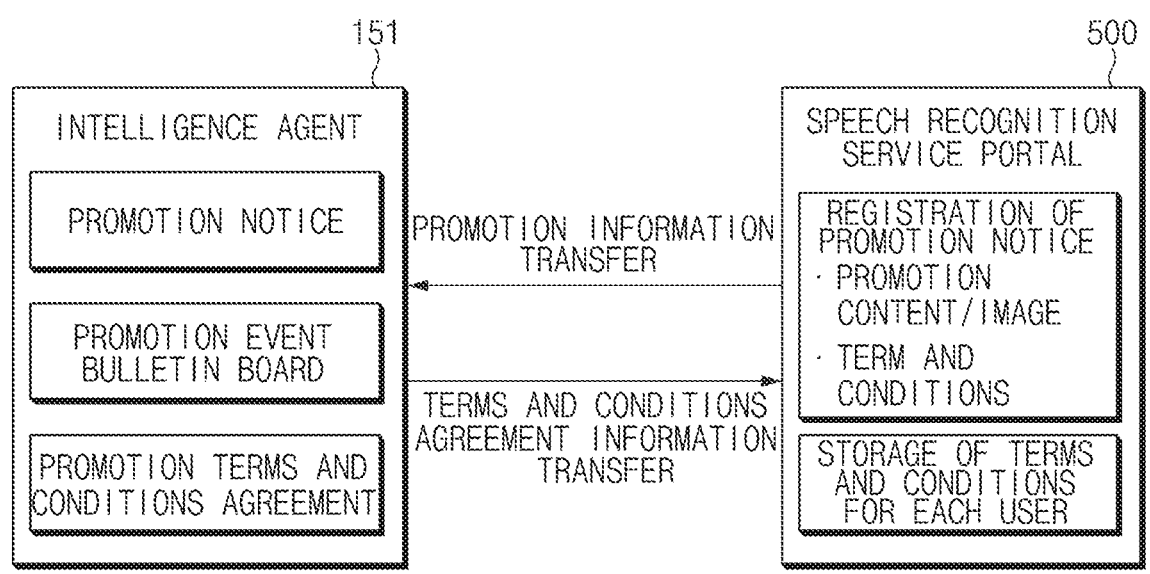
FIG. 9D is a view illustrating a third process of some elements execution associated with an architecture, according to an embodiment of the disclosure.

Referring to FIGS. 9A and 9D, the speech recognition service portal 500 may manage at least one promotion associated with the operation of the speech recognition service. For example, the speech recognition service portal 500 may establish the promotion platform with the second external device (e.g., an affiliate product server or the like) associated with the speech recognition service. In an embodiment, the manager (or operator) of the second external device may access the speech recognition service portal 500 to register information about the specific promotion. For example, the second external device manager may register promotion identification information (e.g., ID or promotion name allocated to the promotion, or the like), a promotion operation period, content information accompanying the operation of the promotion, information about promotion terms and conditions, or the like, in the speech recognition service portal 500. The promotion information registered in the speech recognition service portal 500 may be transmitted to the user terminal 100 and/or the intelligence server 200, and the intelligence agent 151 may generate an event bulletin board on the screen interface of an intelligence app to display the promotion information. In various embodiments, the second external device manager may exclude the registration of the promotion information to the speech recognition service portal 500, and may operate a separate portal (e.g., administration portal) to provide the intelligence agent with the promotion information based on the separate portal.

In the case where the intelligence agent 151 may receive new promotion information from the speech recognition service portal 500 or in the case where the promotion information is posted on the event bulletin board, the intelligence agent 151 may output a notification (e.g., a push message or the like) thereof on the user terminal 100 to provide a notification of the promotion. The user may verify the promotion on the event bulletin board and may enter the agreement information about the terms and conditions of the promotion in which the user wants to participate, in response to the notification. The intelligence agent 151 may transmit the agreement information about the terms and conditions to the speech recognition service portal 500, and the speech recognition service portal 500 may map and manage the received agreement information about the terms and conditions to the corresponding promotion.

Figure 9E:
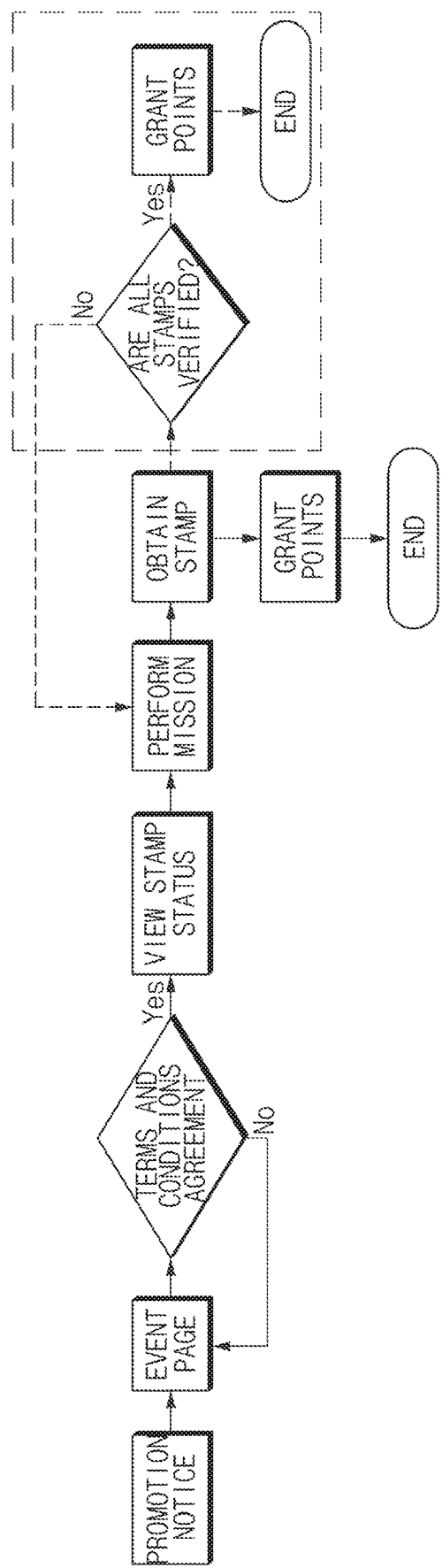
FIG. 9E is a view illustrating a fourth process of some elements execution associated with an architecture, according to an embodiment of the disclosure.

According to an embodiment, the promotion may include various missions for activating the operation of the speech recognition service. For example, the second external device manager may constitute a mission of the execution of an intelligence app, a first user activity associated with the above-described usage information, a second user activity (e.g., finding a hidden function of the artificial intelligence assistant, generating and using a macro, or the like) associated with the function of the artificial intelligence assistant, a third user activity (e.g., launching a plurality of apps based on multitasking through user speech) using the artificial intelligence assistant, or the like, as a promotion FIG. 9E illustrates a series of processes according to the above-mentioned promotion participation. In FIG. 9E, various embodiments of the promotion participation may be represented by branching in a specific operation (e.g., a stamp acquisition operation) in the process.

Referring to FIG. 9E, in the case where the promotion is announced on the user terminal 100, the user may access the event bulletin board and may verify the stamp information (e.g., stamp acquisition status) by agreeing with terms and conditions of the promotion in which the user desires to participate. In an embodiment, if the user will perform at least one mission consisting of promotions, the stamp may be provided from the second external device. In an embodiment, whenever obtaining the stamp, the intelligence agent 151 may receive a predetermined point from the second external device. Alternatively, in another embodiment, the intelligence agent 151 may receive the predetermined point from the second external device only when stamps of the specified number are authenticated. The intelligence agent 151 may refer to the received predetermined point to calculate the experience point of the artificial intelligence assistant.

Figure 9F:
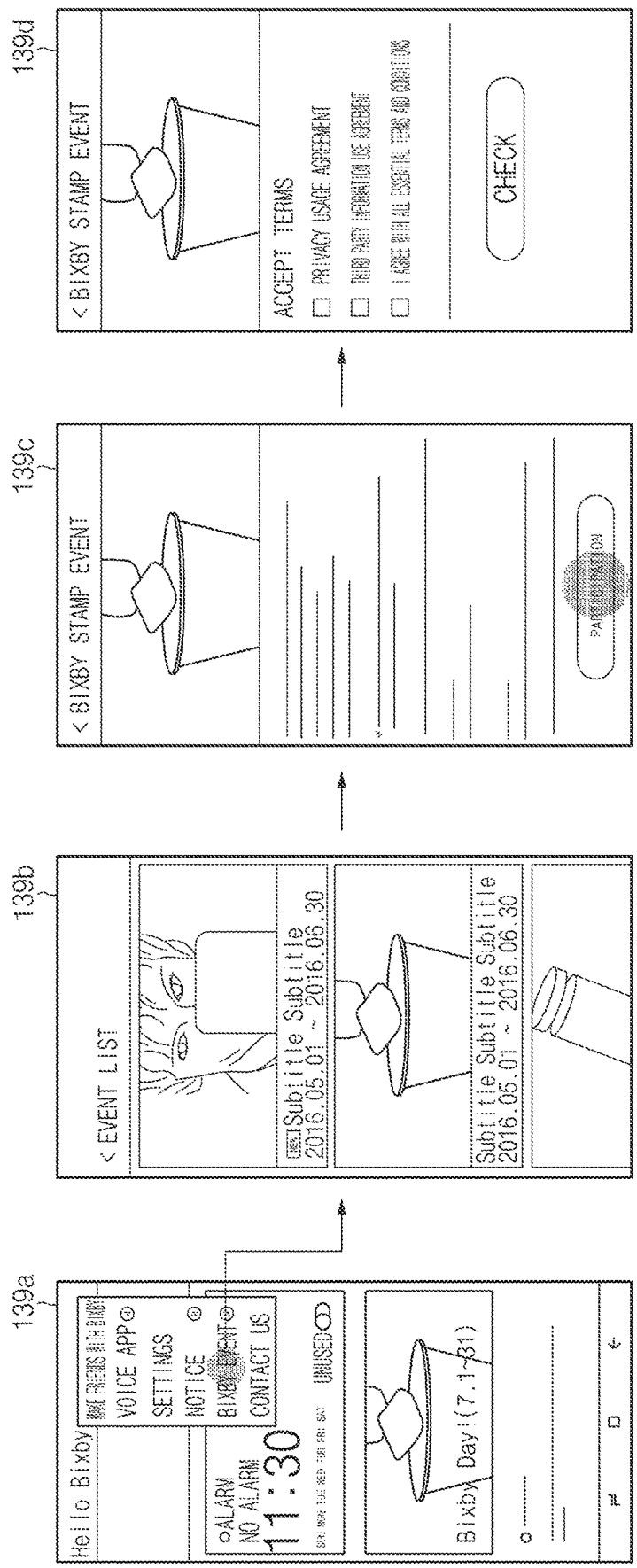
FIG. 9F is a view illustrating an output example of various interfaces of a user terminal associated with promotion participation, according to an embodiment of the disclosure.

FIG. 9F is a view illustrating various interfaces of an intelligence app associated with promotion participation. Referring to FIG. 9F, a specific interface 139a (e.g., the home screen of an intelligence app), which is output depending on the execution of an intelligence app, may display a menu associated with the operation of a speech recognition service. In an embodiment, the menu may include various categories, and the specific category may support interworking with an event bulletin board 139b in response to a user's touch input. In the case where the specific promotion is selected on the event bulletin board 139b by the user, the event bulletin board 139b may be switched to an interface 139c including information about the selected promotion and a promotion participation tap. Furthermore, if the user's touch input is applied to the promotion participation tap, an interface 139d for entering information about terms and conditions of the corresponding promotion and agreement information of the user about the terms and conditions may be output.

Figure 9G:
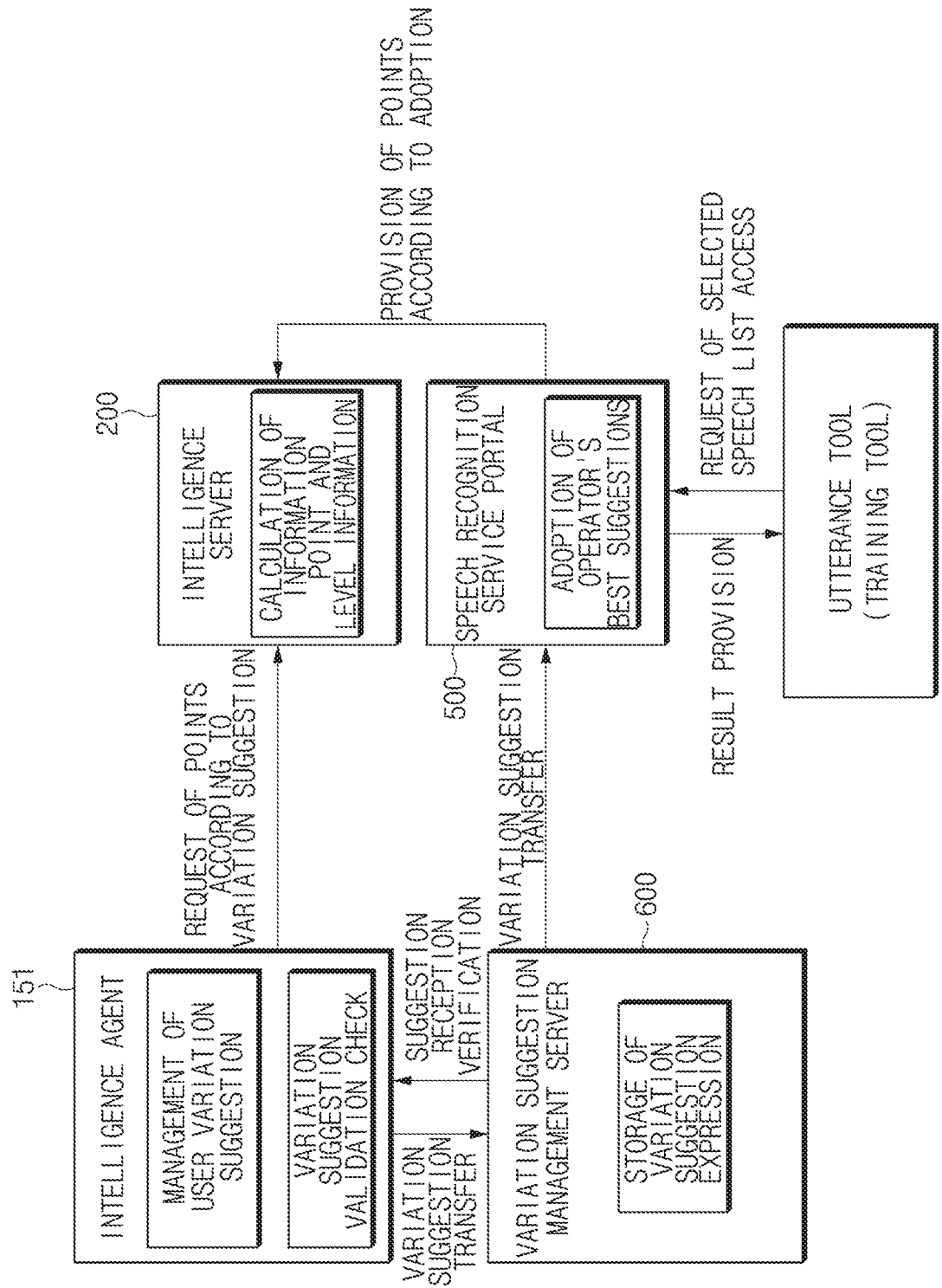
FIG. 9G is a view illustrating a fifth process between some elements in an integrated intelligent system associated with an architecture, according to an embodiment of the disclosure.

Referring to FIGS. 9A and 9G, the intelligence agent 151 may receive variation suggestion associated with the operation of the speech recognition service from the user and may manage the variation suggestion. For example, a touch input is applied to a first button (e.g., variation suggestion button) on a specific screen interface (e.g., variation suggestion interface) of an intelligence app by the user; afterwards, in the case where a second button (e.g., variation suggestion submitting button) is manipulated by performing the variation suggestion of a user, the intelligence agent 151 may receive the variation suggestion. In an embodiment, for example, the variation suggestion may include another response suggestion of the user associated with the response of an artificial intelligence assistant according to user speech. Alternatively, in the case where a path rule is provided from the intelligence server 200 depending on the occurrence of user speech associated with function operation control of a specific app and then the function operation control of the specific app is processed, the variation suggestion may include suggestion (e.g., "send a message" is changed to "fly a message", or the like) for at least partly changing the aspect of the user speech. In the case where the above-described variation suggestion is provided from the user, the intelligence agent 151 may determine the validity (e.g., whether the variation suggestion is suggestion of a specified expression) of the provided variation suggestion to transmit (or stores the variation suggestion in a user suggestion management database) the variation suggestion to a variation suggestion management server 600 implemented (or implemented to include the intelligence server 200 or implemented with the intelligence server 200 as it is) with a separate external device. In this operation, the intelligence agent 151 may receive acceptance information of the variation suggestion from the variation suggestion management server 600 and may output a notification (e.g., push message) including the acceptance information. In various embodiments, in the case where it is determined that the variation suggestion is invalid, the intelligence agent 151 may output an interface for performing or entering the variation suggestion again.

In an embodiment, the occurrence of the variation suggestion may accompany the payment of predetermined point, and in the case where it is determined that the variation suggestion is valid, the intelligence agent 151 may make a request for the point according to the occurrence of the variation suggestion to the intelligence server 200. The intelligence server 200 may apply the predetermined point (e.g., 10 points) to the calculation of the experience point of the artificial intelligence assistant or the determination of the level information of the artificial intelligence assistant depending on the request. The variation suggestion management server 600 may map and store the provided variation suggestion onto the corresponding user ID and may provide information thereof to the intelligence agent 151. Alternatively, the variation suggestion management server 600 may transmit the provided variation suggestion to the speech recognition service portal 500. In an embodiment, the manager of the speech recognition service portal 500 may determine the priority based on the efficiency for the received at least one variation suggestion and may adopt the best (or top priority) variation suggestion to manage the best variation suggestion by using the list. The speech recognition service portal 500 may transmit predetermined point (e.g., 100 points) payment information about the adopted variation suggestion, to the intelligence server 200, and the intelligence server 200 may apply the point (e.g., 100 points) according to the adoption of the variation suggestion to the calculation of the experience point or the determination of the level information of the artificial intelligence assistant. In an embodiment, the speech recognition service portal 500 may provide information about the adopted variation suggestion to a training tool associated with the artificial intelligence assistant. Alternatively, the training tool may request the speech recognition service portal 500 to access a list including the adopted at least one variation suggestion.

Figure 9H:
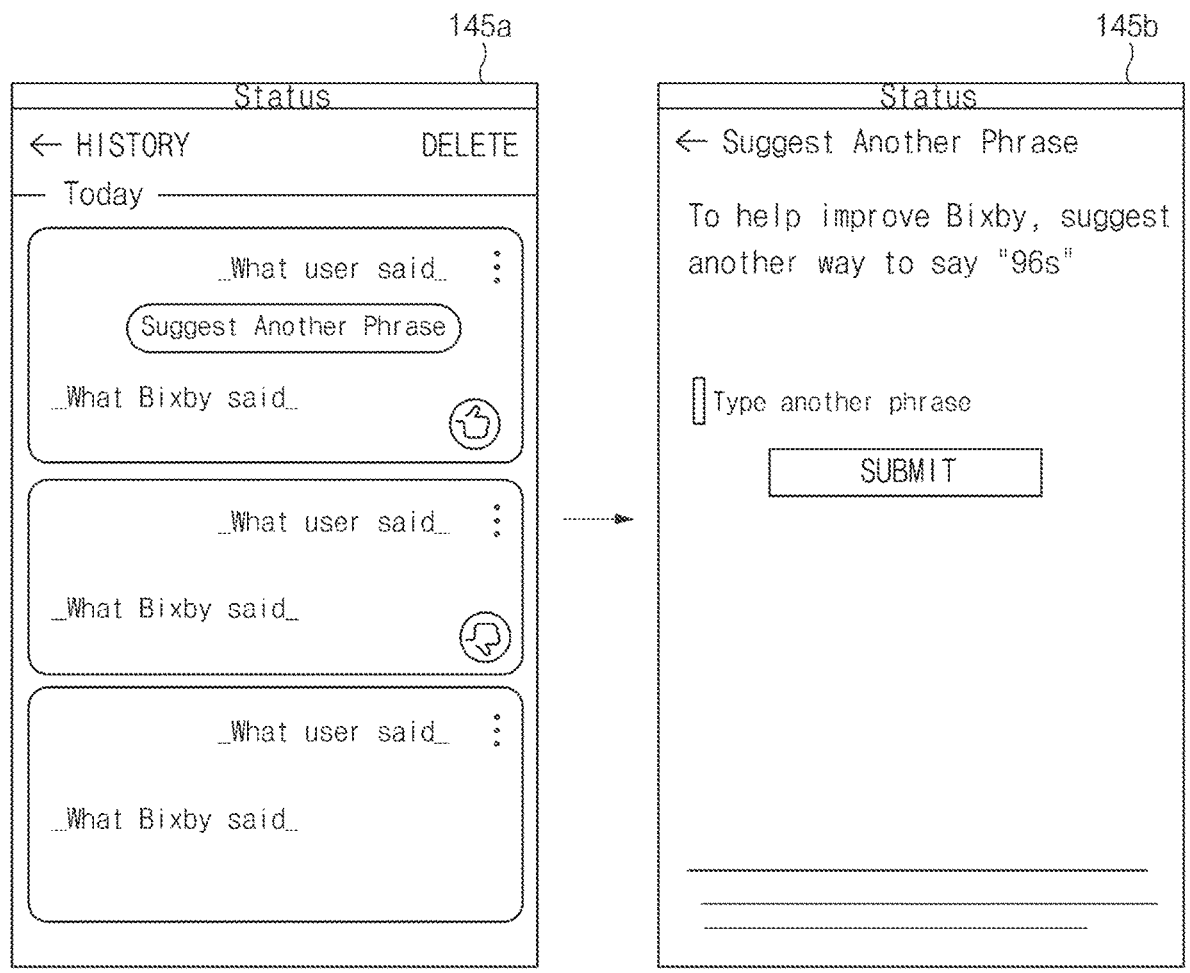
FIG. 9H is a view illustrating an output example of various interfaces of a user terminal associated with first user variation suggestion, according to an embodiment of the disclosure.
Figure 91:
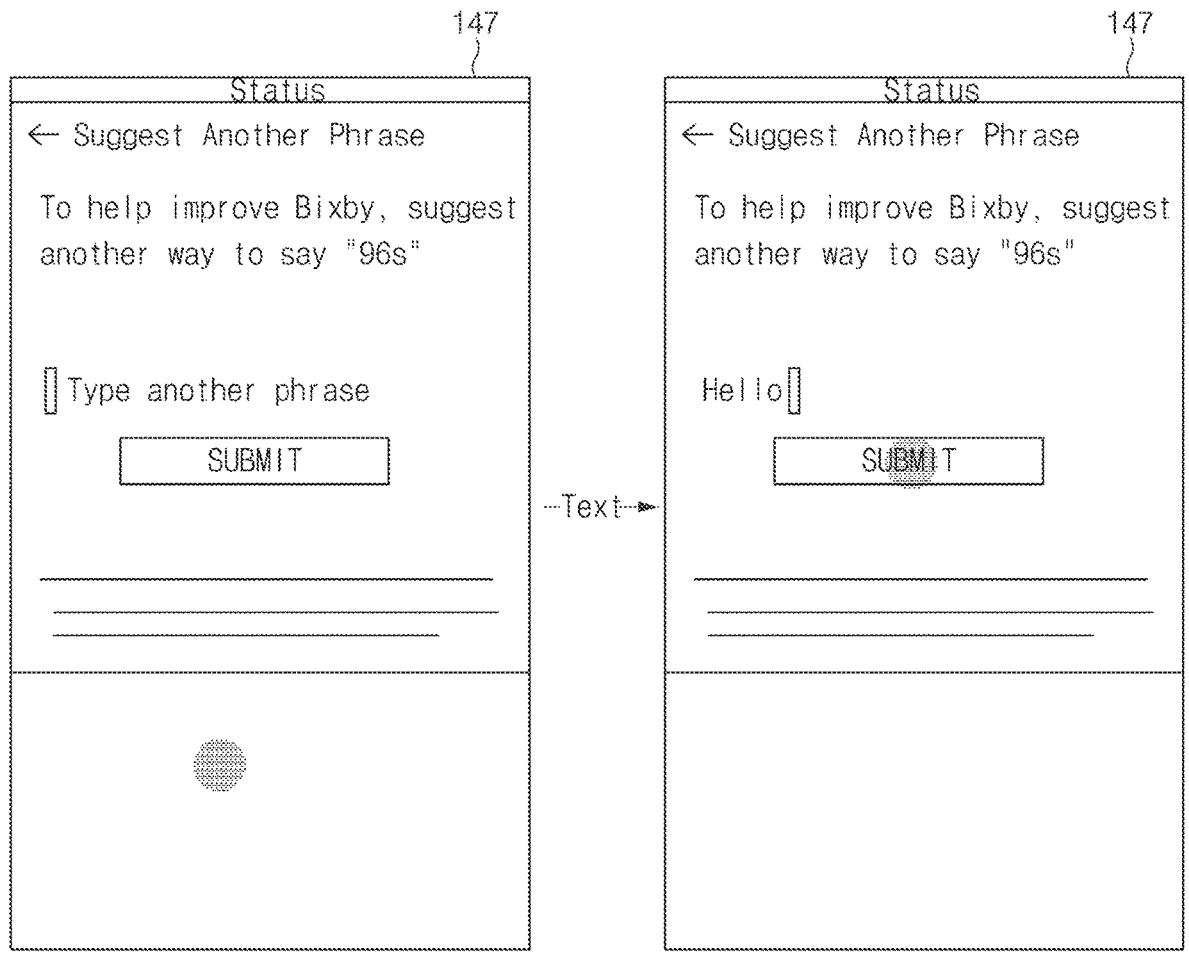

FIGS. 9H and 9I are views illustrating interfaces of an intelligence app in which the above-described variation suggestion is performed by a user. Referring to FIG. 9H, feedback provision history information of the user's satisfaction or dissatisfaction attribute with respect to history information (e.g., dialogue history) about interaction between the user and the artificial intelligence assistant and the response of the artificial intelligence assistant according to the interaction may be displayed on a first interface 145a of an intelligence app. In an embodiment, in the case where a user touch input is applied to the interaction history information, the first interface 145a may be switched to a second interface 145b for suggesting another response with respect to the response of the artificial intelligence assistant according to the corresponding interaction. Referring to FIG. 9I, the user may perform variation suggestion for at least partly changing the aspect of the specific user speech on a third interface 147 of the intelligence app. For example, the user may enter the aspect of the user speech to be changed through a software input panel (SIP) keyboard provided to at least one area of the third interface 147, and may transmit (e.g., submit) the aspect of the user speech to the variation suggestion management server 600.

Figure 9J:
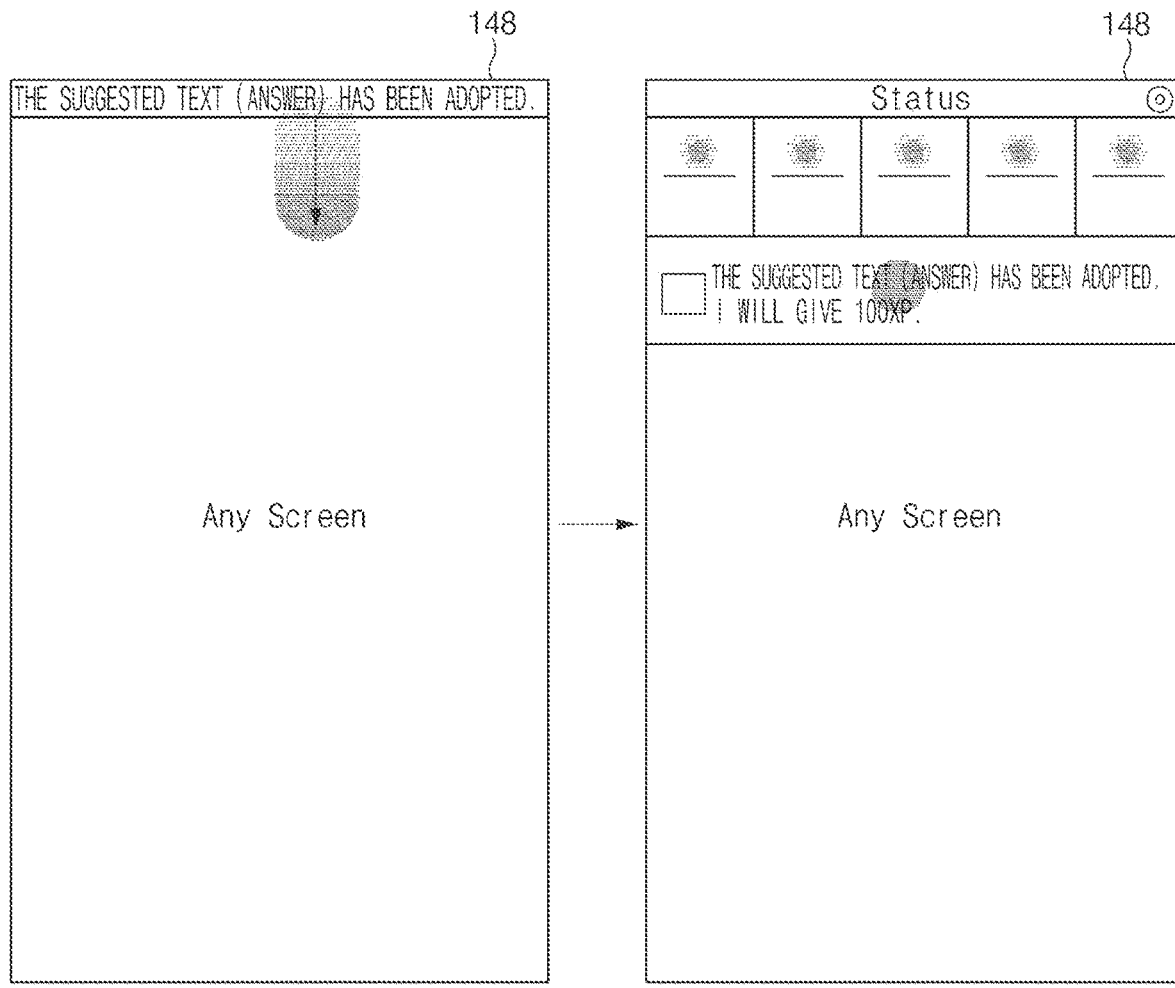
FIG. 9J is a view illustrating an output example of various interfaces of a user terminal associated with user variation suggestion adoption, according to an embodiment of the disclosure.
Figure 9K:
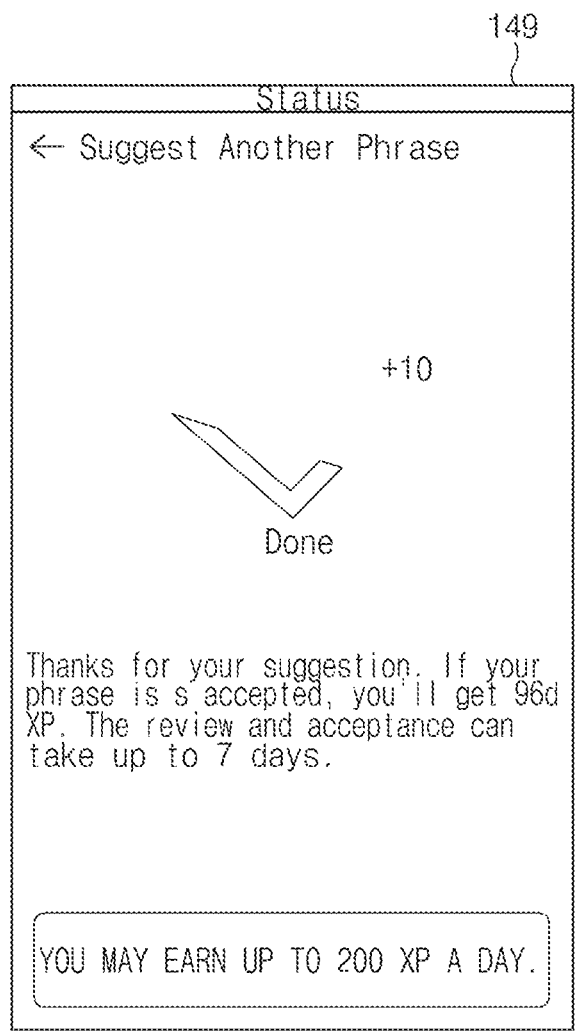
FIG. 9K is a view illustrating an interface output example of a user terminal associated with experience point limit excess of an artificial intelligence assistant, according to an embodiment of the disclosure.

FIG. 9J is a view illustrating an interface output by the user terminal 100, in association with adoption of the variation suggestion. Referring to FIG. 9J, in the case where the specific variation suggestion is adopted by the speech recognition service portal 500, the user terminal 100 may receive information about the adoption and may output a notification (e.g., push message) thereof. For example, the user terminal 100 may display the push message in at least one area of a home interface, a background interface, or an execution interface 148 of a specific app and may display detailed information of the variation suggestion adopted in response to a user's manipulation (e.g., drag) applied to the push message.

In an embodiment, the intelligence server 200 may refine the experience point of a voice recognition service depending on the execution of the user's variation suggestion. At this time, the experience point may be refined within a specified limit (e.g., 200 points per day), and in the case where the intelligence server 200 monitors the refinement of the experience point and the limit is exceeded, the intelligence server 200 may transmit information thereof to the user terminal 100. However, the point (e.g., 100 points) received by adopting the above-described suggestion change may be excluded from the limit. In this regard, referring to FIG. 9K, the user terminal 100 may output information indicating the limit excess of the experience point through a separate message or the screen interface 149 of an intelligence app. As such, it is understood that the limit refine configuration of the experience point is a part of the policy to prevent the operation of illegal speech recognition services.

According to various embodiments, an electronic system may include a user device including a display, a microphone, a speaker, a communication circuit, a first memory, and a first processor electrically connected with the display, the microphone, the speaker, the communication circuit, and the first memory, and a first server including a communication interface, a second memory, and a second processor electrically connected with the communication interface, and the second memory.

According to various embodiments, the second memory may include an automatic speech recognition (ASR) module and a natural language understanding (NLU) module.

According to various embodiments, the first memory may store instructions that, when executed by the first processor, causes the first processor to receive a voice input of a user through the microphone and to transmit data associated with the voice input to the second processor through the communication circuit.

According to various embodiments, the second memory may store instructions that, when executed by the second processor, causes the second processor to process the data by using at least one of the ASR module or the NLU module, to calculate at least one numerical value associated with at least one of the ASR module or the NLU module by using the data, and to provide the at least one numerical value to the first processor.

According to various embodiments, the first memory may further store instructions that, when executed by the first processor, causes the first processor to provide information about the at least one numerical value on a user interface.

According to various embodiments, an electronic system may include a first server including a communication interface, a first memory, and a first processor electrically connected with the communication interface, and the first memory.

According to various embodiments, the first memory may include an automatic speech recognition (ASR) module and a natural language understanding (NLU) module.

According to various embodiments, the first memory may store instructions that, when executed by the first processor, causes the first processor to receive data associated with a voice input through the communication interface, to process the data by using at least one of the ASR module or the NLU module, to calculate at least one numerical value associated with at least one of the ASR module or the NLU module based on the processing of the data, and to transmit the at least one numerical value to a specified external device through the communication interface.

According to various embodiments, an electronic device supporting a speech recognition service may include a communication module communicating with at least one external device, a microphone receiving a voice input according to user speech, a memory storing information about an operation of the speech recognition service, a display outputting a screen associated with the operation of the speech recognition service, and a processor electrically connected to the communication module, the microphone, the memory, and the display.

According to various embodiments, the processor may be configured to calculate a specified numerical value associated with the operation of the speech recognition service, to transmit information about the numerical value to a first external device processing the voice input, and to transmit a request for a function, which corresponds to the calculated numerical value of at least one function associated with the speech recognition service stepwisely provided from the first external device depending on a numerical value, to the first external device to refine a function of the speech recognition service supported by the electronic device.

According to various embodiments, the processor may be further configured to assign a point to at least one of an automatic speech recognition (ASR) module or a natural language understanding (NLU) module included in the first external device in association with function execution of the first external device and to calculate the numerical value based on collection of the assigned point.

According to various embodiments, the processor may be further configured to collect at least one voice input information on which speaker-dependent speech recognition is performed by the ASR module, to accumulate and calculate a user speech time corresponding to the collected at least one voice input information, and to assign the point to the ASR module based on an accumulated amount of the user speech time.

According to various embodiments, the processor may be further configured to assign the point to the ASR module based on generation of a speaker-dependent recognition model with respect to wakeup-command speech associated with the operation of the speech recognition service.

According to various embodiments, the processor may be further configured, in association with speech recognition execution of the ASR module with respect to the voice input, if an error of the speech recognition result is revised, to assign the point to the ASR module based on a speech recognition model update of the ASR module performed in response to the revision of the error.

According to various embodiments, the processor may be further configured, in association with derivation execution of user speech intent of the NLU module with respect to the voice input, if user preference information provided from a user is applied to at least one of a domain, intent, or a parameter associated with the voice input obtained by the NLU module, to assign the point to the NLU module based on application of the user preference information.

According to various embodiments, the processor may be further configured, in association with derivation execution of user speech intent of the NLU module with respect to the voice input, if at least one function response associated with function control of the electronic device or function control of a second external device interacting with the electronic device is set with respect to a specific user speech intent to be derived by the NLU module, to assign the point to the NLU module based on the setting of the at least one function response.

According to various embodiments, the processor may be further configured to assign a point to a third external device receiving and storing at least one of information about the electronic device or information about a user of the electronic device from the electronic device and to calculate the numerical value based on the assigned point.

According to various embodiments, the processor may be further configured to receive and output query information about verification or check of the at least one information stored in the third external device, from the first external device and, if the at least one information is verified or checked by a user feedback associated with the query information, to assign the point to the third external device based on the verification or the check of the at least one information.

According to various embodiments, a speech recognition service operating method of an electronic device may include receiving a voice input according to user speech, calculating a specified numerical value in association with an operation of the speech recognition service, transmitting at least one of information about the voice input or information about the numerical value to a first external device processing the voice input, transmitting a request for a function, which corresponds to the calculated numerical value, of at least one function associated with the speech recognition service stepwisely provided from the first external device depending on a numerical value, to the first external device, and receiving the function corresponding to the calculated numerical value from the first external device to refine a function of the speech recognition service.

According to various embodiments, the calculating may include assigning a point to at least one of an automatic speech recognition (ASR) module or a natural language understanding (NLU) module included in the first external device in association with function execution of the first external device and calculating the numerical value based on collection of the assigned point.

According to various embodiments, the assigning may include collecting at least one voice input information on which speaker-dependent speech recognition is performed by the ASR module, accumulating and calculating a user speech time corresponding to the collected at least one voice input information, and assigning the point to the ASR module based on an accumulated amount of the user speech time.

According to various embodiments, the assigning may include assigning the point to the ASR module based on generation of a speaker-dependent recognition model with respect to wakeup-command speech associated with the operation of the speech recognition service.

According to various embodiments, the assigning may include, if an error of a speech recognition result of the ASR module with respect to the voice input is revised, assigning the point to the ASR module based on a speech recognition model update of the ASR module performed in response to the revision of the error.

According to various embodiments, the assigning may include, if user preference information provided from a user is applied to at least one of a domain, intent, or a parameter associated with the voice input obtained by the NLU module in an operation of deriving user speech intent of the NLU module with respect to the voice input, assigning the point to the NLU module based on application of the user preference information.

According to various embodiments, the assigning may include, if at least one function response associated with function control of the electronic device or function control of a second external device interacting with the electronic device is set with respect to a specific user speech intent to be derived by the NLU module deriving user speech intent associated with the voice input, assigning the point to the NLU module based on the setting of the at least one function response.

According to various embodiments, the calculating may include assigning a point to a third external device storing at least one of information about the electronic device or information about a user of the electronic device and calculating the numerical value based on the assigned point.

According to various embodiments, the assigning may include receiving and outputting query information about verification or check of at least one information stored in the third external device, from the first external device, verifying and checking the at least one information by a user feedback associated with the query information, and assigning the point to the third external device based on the verification or the check of the at least one information.

Figure 10:
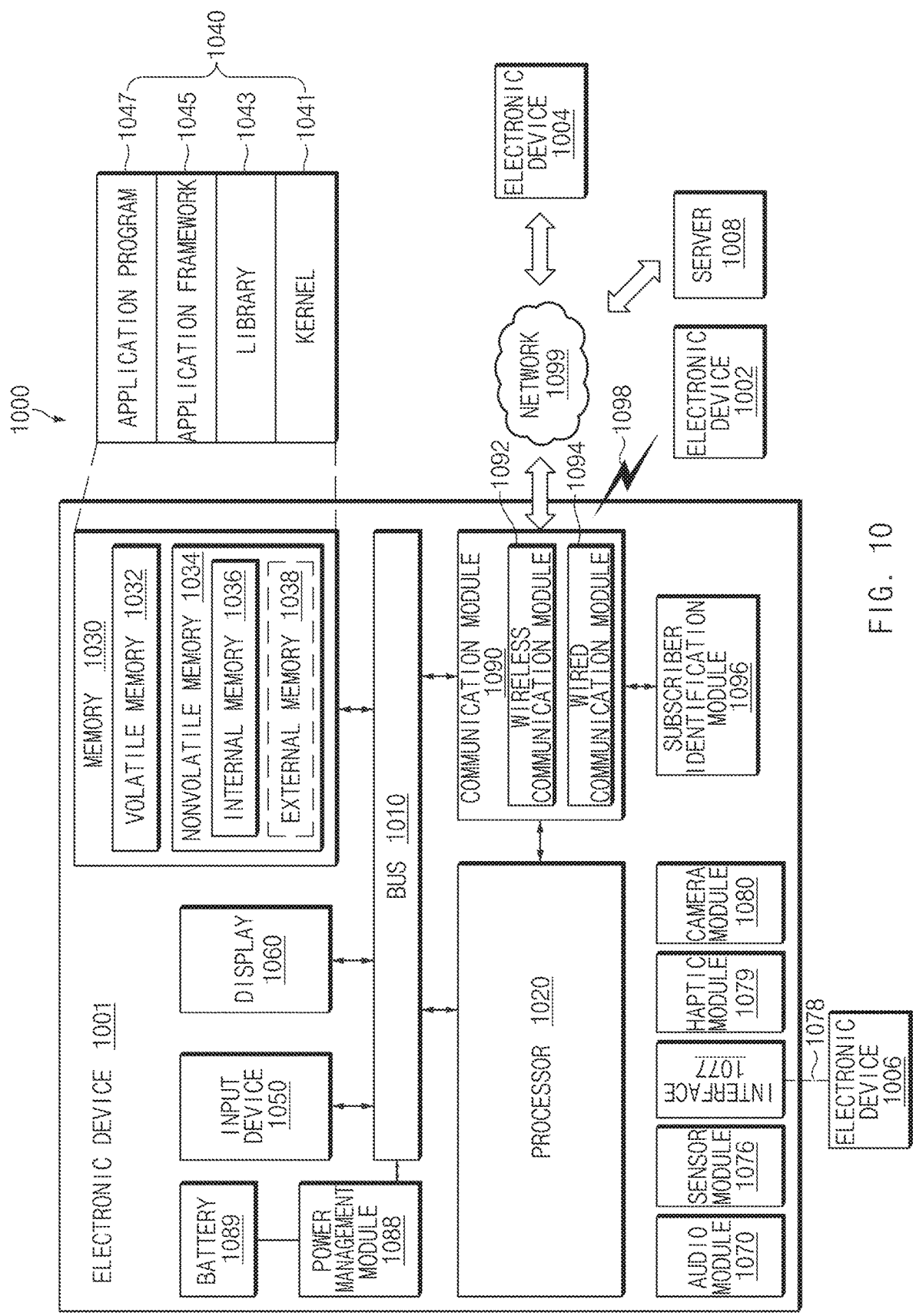
FIG. 10 is a view illustrating an electronic device (or user terminal) in a network environment, according to an embodiment of the disclosure.

FIG. 10 illustrates an electronic device (or user terminal) in a network environment, according to an embodiment of the disclosure.

Referring to FIG. 10, under the network environment 1000, the electronic device 1001 (e.g., the user terminal 100 of FIG. 1B) may communicate with an electronic device 1002 through a first network 1098 (e.g. a wireless local area network such as Bluetooth or infrared data association (IrDA)) or may communicate with an electronic device 1004 or a server 1008 through a second network 1099 (e.g., a wireless wide area network such as a cellular network). According to an embodiment, the electronic device 1001 may communicate with the electronic device 1004 through the server 1008.

According to an embodiment, the electronic device 1001 may include a bus 1010, a processor 1020 (e.g., the processor 150 of FIG. 1B) a memory 1030, an input device 1050 (e.g., a micro-phone or a mouse), a display 1060, an audio module 1070, a sensor module 1076, an interface 1077, a haptic module 1079, a camera module 1080, a power management module 1088, a battery 1089, a communication module 1090, and a subscriber identification module 1096. According to an embodiment, the electronic device 1001 may not include at least one (e.g., the display 1060 or the camera module 1080) of the above-described elements or may further include other element(s).

For example, the bus 1010 may interconnect the above-described elements 1020 to 1090 and may include a circuit for conveying signals (e.g., a control message or data) between the above-described elements. The processor 1020 may include one or more of a central processing unit (CPU), an application processor (AP), a graphic processing unit (GPU), an image signal processor (ISP) of a camera or a communication processor (CP). According to an embodiment, the processor 1020 may be implemented with a system on chip (SoC) or a system in package (SiP). For example, the processor 1020 may drive an operating system (OS) or an application to control at least one of another element (e.g., hardware or software element) connected to the processor 1020 and may process and compute various data. The processor 1020 may load a command or data, which is received from at least one of other elements (e.g., the communication module 1090), into a volatile memory 1032 to process the command or data and may store the process result data into a nonvolatile memory 1034.

The memory 1030 may include, for example, the volatile memory 1032 or the nonvolatile memory 1034. The volatile memory 1032 may include, for example, a random access memory (RAM) (e.g., a dynamic RAM (DRAM), a static RAM (SRAM), or a synchronous dynamic RAM (SDRAM)). The nonvolatile memory 1034 may include, for example, a one-time programmable read-only memory (OTPROM), a programmable read-only memory (PROM), an erasable programmable read-only memory (EPROM), an electrically erasable programmable read-only memory (EEPROM), a mask ROM, a flash ROM, a flash memory, a hard disk drive, or a solid-state drive (SSD). In addition, the nonvolatile memory 1034 may be configured in the form of an internal memory 1036 or the form of an external memory 1038 which is available through connection only if necessary, according to the connection with the electronic device 1001. The external memory 1038 may further include a flash drive such as compact flash (CF), secure digital (SD), micro secure digital (Micro-SD), mini secure digital (Mini-SD), extreme digital (xD), a multimedia card (MMC), or a memory stick. The external memory 1038 may be operatively or physically connected with the electronic device 1001 in a wired manner (e.g., a cable or a universal serial bus (USB)) or a wireless (e.g., Bluetooth) manner.

For example, the memory 1030 may store, for example, at least one different software element, such as an instruction or data associated with the program 1040, of the electronic device 1001. The program 1040 may include, for example, a kernel 1041, a library 1043, an application framework 1045 or an application program (interchangeably, "application") 1047.

The input device 1050 may include a microphone, a mouse, or a keyboard. According to an embodiment, the keyboard may include a keyboard physically connected or a keyboard virtually displayed through the display 1060.

The display 1060 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display.

The hologram device may show a stereoscopic image in a space using interference of light. The projector may project light onto a screen to display an image. The screen may be located inside or outside the electronic device 1001.

The audio module 1070 may convert, for example, from a sound into an electrical signal or from an electrical signal into the sound. According to an embodiment, the audio module 1070 may acquire sound through the input device 1050 (e.g., a microphone) or may output sound through an output device (not illustrated) (e.g., a speaker or a receiver) included in the electronic device 1001, an external electronic device (e.g., the electronic device 1002 (e.g., a wireless speaker or a wireless headphone)) or an electronic device 1006 (e.g., a wired speaker or a wired headphone) connected with the electronic device 1001

The sensor module 1076 may measure or detect, for example, an internal operating state (e.g., power or temperature) or an external environment state (e.g., an altitude, a humidity, or brightness) of the electronic device 1001 to generate an electrical signal or a data value corresponding to the information of the measured state or the detected state. The sensor module 1076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1076 may further include a control circuit for controlling at least one or more sensors included therein. According to an embodiment, the sensor module 1076 may be controlled by using the processor 1020 or a processor (e.g., a sensor hub) separate from the processor 1020. In the case that the separate processor (e.g., a sensor hub) is used, while the processor 1020 is in a sleep state, the separate processor may operate without awakening the processor 1020 to control at least a portion of the operation or the state of the sensor module 1076.

According to an embodiment, the interface 1077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 1078 may physically connect the electronic device 1001 and the electronic device 1006. According to an embodiment, the connector 1078 may include, for example, an USB connector, an SD card/MMC connector, or an audio connector (e.g., a headphone connector).

The haptic module 1079 may convert an electrical signal into mechanical stimulation (e.g., vibration or motion) or into electrical stimulation. For example, the haptic module 1079 may apply tactile or kinesthetic stimulation to a user. The haptic module 1079 may include, for example, a motor, a piezoelectric element, or an electric stimulator.

The camera module 1080 may capture, for example, a still image and a moving picture. According to an embodiment, the camera module 1080 may include at least one lens (e.g., a wide-angle lens and a telephoto lens, or a front lens and a rear lens), an image sensor, an image signal processor, or a flash (e.g., a light emitting diode or a xenon lamp).

The power management module 1088, which is to manage the power of the electronic device 1001, may constitute at least a portion of a power management integrated circuit (PMIC).

The battery 1089 may include a primary cell, a secondary cell, or a fuel cell and may be recharged by an external power source to supply power at least one element of the electronic device 1001.

The communication module 1090 may establish a communication channel between the electronic device 1001 and an external device (e.g., the first external electronic device 1002, the second external electronic device 1004, or the server 1008). The communication module 1090 may support wired communication or wireless communication through the established communication channel. According to an embodiment, the communication module 1090 may include a wireless communication module 1092 or a wired communication module 1094. The communication module 1090 may communicate with the external device (e.g., the first external electronic device 1002, the second external electronic device 1004 or the server 1008) through a first network 1098 (e.g. a wireless local area network such as Bluetooth or infrared data association (IrDA)) or a second network 1099 (e.g., a wireless wide area network such as a cellular network) through a relevant module among the wireless communication module 1092 or the wired communication module 1094.

The wireless communication module 1092 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the disclosure, "GPS" and "GNSS" may be interchangeably used.

According to an embodiment, when the wireless communication module 1092 supports cellar communication, the wireless communication module 1092 may, for example, identify or authenticate the electronic device 1001 within a communication network using the subscriber identification module (e.g., a SIM card) 1096. According to an embodiment, the wireless communication module 1092 may include a communication processor (CP) separate from the processor 2820 (e.g., an application processor (AP). In this case, the communication processor may perform at least a portion of functions associated with at least one of elements 1010 to 1096 of the electronic device 1001 in substitute for the processor 1020 when the processor 1020 is in an inactive (sleep) state, and together with the processor 1020 when the processor 1020 is in an active state. According to an embodiment, the wireless communication module 1092 may include a plurality of communication modules, each supporting only a relevant communication scheme among cellular communication, short-range wireless communication, or a GNSS communication scheme.

The wired communication module 1094 may include, for example, include a local area network (LAN) service, a power line communication, or a plain old telephone service (POTS).

For example, the first network 1098 may employ, for example, Wi-Fi direct or Bluetooth for transmitting or receiving instructions or data through wireless direct connection between the electronic device 1001 and the first external electronic device 1002. The second network 1099 may include a telecommunication network (e.g., a computer network such as a LAN or a WAN, the Internet or a telephone network) for transmitting or receiving instructions or data between the electronic device 1001 and the second electronic device 1004.

According to embodiments, the instructions or the data may be transmitted or received between the electronic device 1001 and the second external electronic device 1004 through the server 1008 connected with the second network. Each of the external first and second external electronic devices 1002 and 1004 may be a device of which the type is different from or the same as that of the electronic device 1001. According to various embodiments, all or a part of operations that the electronic device 1001 will perform may be executed by another or a plurality of electronic devices (e.g., the electronic devices 1002 and 1004 or the server 1008). According to an embodiment, in the case that the electronic device 1001 executes any function or service automatically or in response to a request, the electronic device 1001 may not perform the function or the service internally, but may alternatively or additionally transmit requests for at least a part of a function associated with the electronic device 1001 to any other device (e.g., the electronic device 1002 or 1004 or the server 1008). The other electronic device (e.g., the electronic device 1002 or 1004 or the server 1008) may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 1030).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1030) in the form of a program module. The instruction, when executed by a processor (e.g., a processor 1020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic system, comprising:
    a user device including:
      a display,
      a microphone,
      a speaker,
      a communication circuit,
      a first memory, and
      a first processor electrically connected with the display, the microphone, the speaker, the communication circuit, and the first memory; and
    a first server including:
      a communication interface,
      a second memory, and
      a second processor electrically connected with the communication interface and the second memory,
    wherein the second memory includes an automatic speech recognition (ASR) module and a natural language understanding (NLU) module,
    wherein the first memory stores instructions that, when executed by the first processor, causes the first processor to:
      execute an intelligence application supporting a speech recognition service,
      receive a voice input of a user through the microphone, under the control of the intelligence application, and
      transmit data associated with the voice input to the second processor through the communication circuit, under the control of the intelligence application,
    wherein the second memory stores instructions that, when executed by the second processor, causes the second processor to:
      process the data by using at least one of the ASR module or the NLU module,
      calculate at least one numerical value associated with the at least one of the ASR module or the NLU module by using the data, and
      provide the calculated at least one numerical value to the first processor, and
    wherein the first memory further stores instructions that, when executed by the first processor, causes the first processor to:
      determine a use-experience level of the intelligence application based on the at least one numerical value, and
      provide the determined use-experience level on a user interface.

2. An electronic device supporting a speech recognition service, the electronic device comprising:
    a communication module configured to communicate with at least one external device;
    a microphone configured to receive a voice input according to user speech;
    a memory configured to store information about an operation of the speech recognition service;
    a display configured to output a screen associated with the operation of the speech recognition service; and
    a processor electrically connected with the communication module, the microphone, the memory, and the display,
    wherein the processor is configured to:
      calculate a specified numerical value associated with the operation of the speech recognition service,
      transmit information about the calculated specified numerical value to a first external device processing the voice input, transmit a request for refining at least one function associated with the speech recognition service supported by the electronic device to the first external device, wherein the at least one function associated with the speech recognition service stepwise provided from the first external device depending on a numerical value, and refine the at least one function associated with the speech recognition service supported by the electronic device based on a response to the request.

3. The electronic device of claim 2, wherein the processor is further configured to:

assign a point to at least one of an automatic speech recognition (ASR) module or a natural language understanding (NLU) module included in the first external device in association with function execution of the first external device; and calculate the specified numerical value based on collection of the assigned point.

4. The electronic device of claim 3, wherein the processor is further configured to:

collect at least one voice input information on which speaker-dependent speech recognition is performed by the ASR module;

accumulate and calculate a user speech time corresponding to the collected at least one voice input information; and assign the point to the ASR module based on an accumulated amount of the user speech time.

5. The electronic device of claim 3, wherein the processor is further configured to:

assign the point to the ASR module based on generation of a speaker-dependent recognition model with respect to wakeup-command speech associated with the operation of the speech recognition service.

6. The electronic device of claim 3, wherein the processor is further configured to:

in association with a speech recognition execution of the ASR module with respect to the voice input, if an error of the speech recognition execution is revised, assign the point to the ASR module based on a speech recognition model update of the ASR module performed in response to the revision.

7. The electronic device of claim 3, wherein the processor is further configured to:

in association with derivation execution of user speech intent of the NLU module with respect to the voice input, if user preference information provided from a user is applied to at least one of a domain, an intent, or a parameter associated with the voice input obtained by the NLU module, assign the point to the NLU module based on application of the user preference information.

8. The electronic device of claim 3, wherein the processor is further configured to:

in association with derivation execution of user speech intent of the NLU module with respect to the voice input, if at least one function response associated with function control of the electronic device or function control of a second external device interacting with the electronic device is set with respect to a specific user speech intent to be derived by the NLU module, assign the point to the NLU module based on the setting of the at least one function response.

9. The electronic device of claim 2, wherein the processor is further configured to:

assign a point to a third external device receiving and storing at least one of information about the electronic device or information about a user of the electronic device from the electronic device; and calculate the specified numerical value based on the assigned point.

10. The electronic device of claim 9, wherein the processor is further configured to:

receive and output query information about verification or check of the at least one of the information about the electronic device or the information about the user of the electronic device stored in the third external device, from the first external device.

11. The electronic device of claim 10, wherein the processor is further configured to:

if the at least one of the information about the electronic device or the information about the user of the electronic device is verified or checked by a user feedback associated with the query information, assign the point to the third external device based on the verification or the check of the at least one of the information about the electronic device or the information about the user of the electronic device.

12. A speech recognition service operating method of an electronic device, the method comprising:

receiving a voice input according to user speech;

calculating a specified numerical value associated with an operation of the speech recognition service;

transmitting at least one of information about the voice input or information about the calculated specified numerical value to a first external device processing the voice input;

transmitting a request for refining at least one function associated with the speech recognition service stepwisely provided from the first external device depending on the calculated specified numerical value, to the first external device;

receiving a response to the request from the first external device; and refine the at least one function associated with the speech recognition service based the response.

13. The method of claim 12, wherein the calculating includes:

assigning a point to at least one of an automatic speech recognition (ASR) module or a natural language understanding (NLU) module included in the first external device in association with function execution of the first external device; and calculating the specified numerical value based on collection of the assigned point.

14. The method of claim 13, wherein the assigning includes:

collecting at least one voice input information on which speaker-dependent speech recognition is performed by the ASR module;

accumulating and calculating a user speech time corresponding to the collected at least one voice input information; and assigning the point to the ASR module based on an accumulated amount of the user speech time.

15. The method of claim 13, wherein the assigning includes:

assigning the point to the ASR module based on generation of a speaker-dependent recognition model with respect to wakeup-command speech associated with the operation of the speech recognition service.

16. The method of claim 13, wherein the assigning includes:
if an error of a speech recognition execution of the ASR module with respect to the voice input is revised, assigning the point to the ASR module based on a speech recognition model update of the ASR module performed in response to the revision.

17. The method of claim 13, wherein the assigning includes:
if user preference information provided from a user is applied to at least one of a domain, an intent, or a parameter associated with the voice input obtained by the NLU module in an operation of deriving user speech intent of the NLU module with respect to the voice input, assigning the point to the NLU module based on application of the user preference information.

18. The method of claim 13, wherein the assigning includes:
if at least one function response associated with function control of the electronic device or function control of a second external device interacting with the electronic device is set with respect to a specific user speech intent to be derived by the NLU module deriving user speech intent associated with the voice input, assigning the point to the NLU module based on the setting of the at least one function response.

19. The method of claim 12, wherein the calculating includes:
assigning a point to a third external device storing at least one of information about the electronic device or information about a user of the electronic device; and
calculating the specified numerical value based on the assigned point.

20. The method of claim 19, wherein the assigning includes:
receiving and outputting query information about verification or check of the at least one of the information about the electronic device or the information about the user of the electronic device stored in the third external device, from the first external device;
verifying and checking the at least one of the information about the electronic device or the information about the user of the electronic device by a user feedback associated with the query information; and
assigning the point to the third external device based on the verification or the check of the at least one of the information about the electronic device or the information about the user of the electronic device.

* * * * *